(12) United States Patent
Peng et al.

(10) Patent No.: US 11,797,745 B2
(45) Date of Patent: Oct. 24, 2023

(54) SEMICONDUCTOR DEVICE WITH REDUCED POWER AND METHOD OF MANUFACTURING THE SAME

(71) Applicant: TAIWAN SEMICONDUCTOR MANUFACTURING COMPANY, LTD., Hsinchu (TW)

(72) Inventors: Shih-Wei Peng, Hsinchu (TW); Ching-Yu Huang, Hsinchu (TW); Jiann-Tyng Tzeng, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 91 days.

(21) Appl. No.: 17/578,069

(22) Filed: Jan. 18, 2022

(65) Prior Publication Data
US 2022/0414310 A1 Dec. 29, 2022

Related U.S. Application Data

(60) Provisional application No. 63/215,604, filed on Jun. 28, 2021.

(51) Int. Cl.
*G06F 30/30* (2020.01)
*H01L 27/02* (2006.01)
*G06F 30/392* (2020.01)
*G06F 119/18* (2020.01)

(52) U.S. Cl.
CPC ........ *G06F 30/392* (2020.01); *H01L 27/0207* (2013.01); *G06F 2119/18* (2020.01)

(58) Field of Classification Search
None
See application file for complete search history.

(56) References Cited

U.S. PATENT DOCUMENTS

| | | | |
|---|---|---|---|
| 7,260,442 B2 | 8/2007 | Hwang et al. | |
| 9,256,709 B2 | 2/2016 | Yu et al. | |
| 9,754,661 B2* | 9/2017 | Yamamoto | ............ H10B 10/12 |
| 10,727,835 B2 | 7/2020 | Lupino et al. | |
| 11,632,102 B2* | 4/2023 | Chien | ............ H03K 3/012 |
| | | | 327/202 |
| 2014/0040838 A1 | 2/2014 | Liu et al. | |
| 2015/0278429 A1 | 10/2015 | Chang | |

FOREIGN PATENT DOCUMENTS

| | | |
|---|---|---|
| TW | 201130116 | 9/2011 |
| TW | 202036360 X | 10/2020 |
| TW | 202105464 | 2/2021 |
| TW | 11724621 | 4/2021 |

\* cited by examiner

*Primary Examiner* — Leigh M Garbowski
(74) *Attorney, Agent, or Firm* — Hauptman Ham, LLP

(57) ABSTRACT

A semiconductor device and a method of manufacturing the same are provided. The semiconductor device includes a first conductive pattern disposed within a first region from a top view perspective and extending along a first direction, a first phase shift circuit disposed within the first region, a first transmission circuit disposed within a second region from the top view perspective, and a first gate conductor extending from the first region to the second region along a second direction perpendicular to the first direction. The first phase shift circuit and the first transmission circuit are electrically connected with the first conductive pattern through the first gate conductor.

20 Claims, 27 Drawing Sheets

1

SEMICONDUCTOR DEVICE WITH REDUCED POWER AND METHOD OF MANUFACTURING THE SAME

CROSS REFERENCE TO RELATED APPLICATIONS

This application claims the priority of U.S. Application Ser. No. 63/215,604, filed Jun. 28, 2021, which is herein incorporated by reference in its entirety.

BACKGROUND

The present disclosure relates, in general, to semiconductor devices and methods for manufacturing the same. Specifically, the present disclosure relates to flip-flop devices with reduced power consumption, and methods for manufacturing the same.

Flip-flop electronics are fundamental building blocks for digital applications. Often employed as state storage elements within sequential logic circuits, flip-flop ICs are also used in implementation of common functions such as pulse counting and time synchronization to a reference clock or any time variable signal. A flip-flop device is clock-controlled memory, with clock signals sometimes consuming up to 80% of the total power of the device. As manufacturing technology has evolved, semiconductor sizes are reduced, such that distance between the conductive paths via which the clock signals transmit (i.e., clock paths) also decreases. Interference between adjacent clock paths results in even higher power consumption, especially when different clock signals are transmitted on adjacent clock paths.

BRIEF DESCRIPTION OF THE DRAWINGS

Aspects of the embodiments of the present disclosure are best understood from the following detailed description when read with the accompanying figures. It should be noted that, in accordance with the standard practice in the industry, various structures are not drawn to scale. In fact, the dimensions of the various structures may be arbitrarily increased or reduced for clarity of discussion.

DETAILED DESCRIPTION

Figure 1:
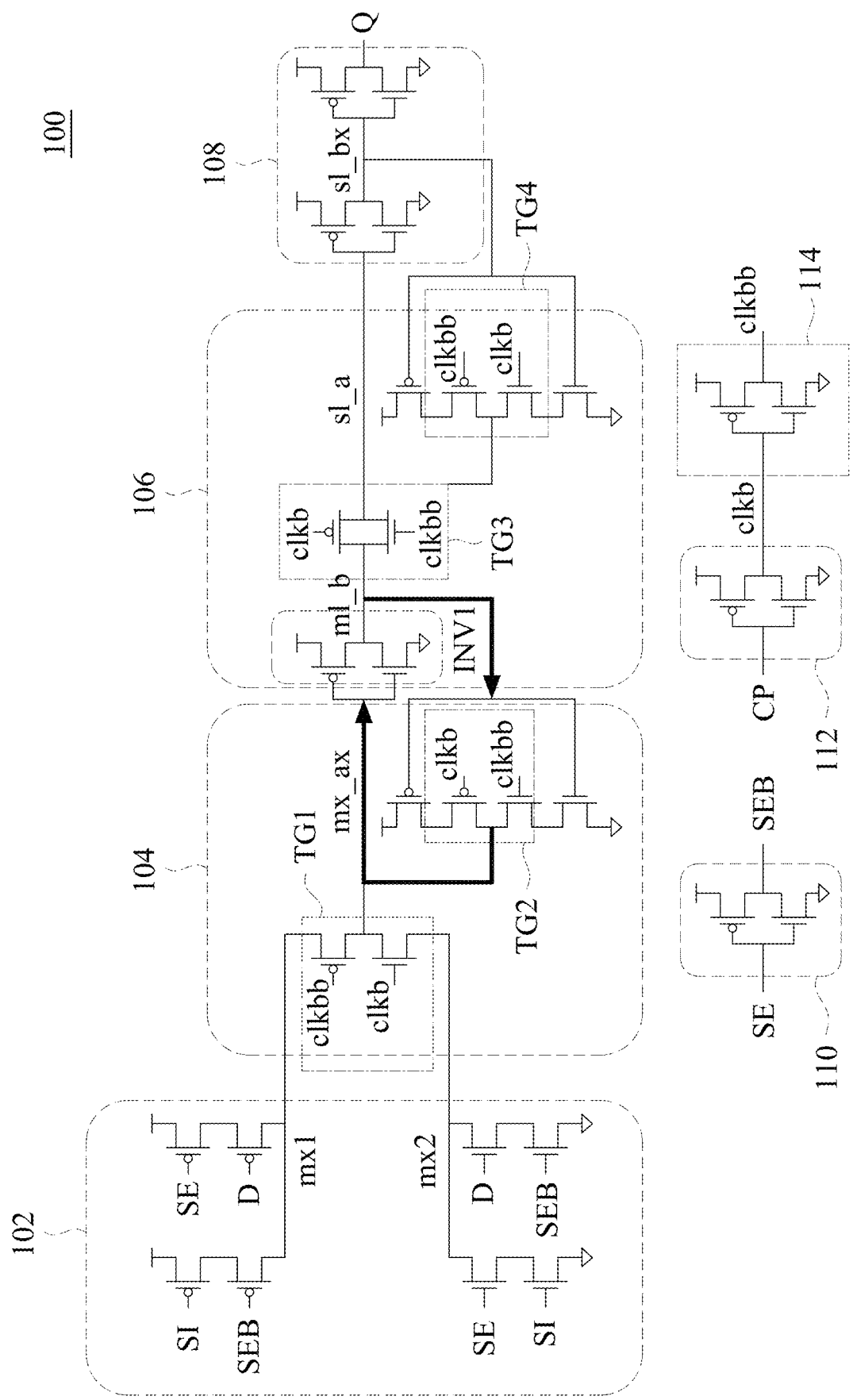
FIG. 1 is a schematic of a semiconductor device, in accordance with some embodiments of the present disclosure.

The following disclosure provides many different embodiments, or examples, for implementing different features of the provided subject matter. Specific examples of elements and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "over," "upper," "on" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, although terms such as "first," "second" and "third" describe various elements, components, regions, layers and/or sections, these elements, components, regions, layers and/or sections should not be limited by these terms. These terms may only be used to distinguish one element, component, region, layer or section from another. Terms such as "first," "second" and "third" when used herein do not imply a sequence or order unless clearly indicated by the context.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the terms "substantially," "approximately" and "about" generally mean within a value or range that can be contemplated by people having ordinary skill in the art. Alternatively, the terms "substantially," "approximately" and "about" mean within an acceptable standard error of the mean when considered by one of ordinary skill in the art. People having ordinary skill in the art can understand that the acceptable standard error may vary according to different technologies. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the terms "substantially," "approximately" or "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

FIG. 1 is a schematic of a semiconductor device, in accordance with some embodiments of the present disclosure.

FIG. 1 shows a semiconductor device 100. The semiconductor device 100 can be a logic device. The semiconductor device 100 can be a system of integrated circuits (IC). The semiconductor device 100 can be a digital device. The semiconductor device 100 can be a state storage device. The semiconductor device 100 can be a flip-flop device.

The semiconductor device 100 includes an input stage 102, a master switching circuit 104, a slave switching circuit 106, and an output stage 108. The semiconductor device 100 further includes phase shift circuits 110, 112, and 114.

The input stage 102 is a multiplexing device. The input stage 102 includes input terminals for receiving signals SE, SI, SEB and D. The input stage 102 is configured to select the signal SI or the signal D based on the signal SE. In some embodiments, the input stage 102 is configured to select the signal SI if the signal SE has a logic high value (for example, "1"), and to select the signal D if the signal SE has a logic low value (for example, "0").

The master switching circuit 104 can also be referred to as a latching circuit. The master switching circuit 104 includes transmission circuits TG1 and TG2. The transmission circuit TG1 is electrically connected to the input stage 102. The transmission circuit TG1 is configured to receive signals mx1 and mx2 from the input stage 102. The transmission circuit TG1 is configured to receive periodic signals clkb and clkbb. In operation, the transmission circuit TG1 is controlled by the periodic signals clkb and clkbb. The periodic signals clkb and clkbb can each be a clock signal.

The transmission circuit TG1 is electrically connected to the transmission circuit TG2. The transmission circuit TG1 is electrically connected to the slave switching circuit 106.

The transmission circuit TG2 is electrically connected to the slave switching circuit 106. The transmission circuit TG2 is configured to receive a feedback signal ml_b from the slave switching circuit 106. The transmission circuit TG2 is configured to provide a feedforward signal mx_ax to the slave switching circuit 106. The transmission circuit TG2 is configured to receive periodic signals clkb and clkbb. In operation, the transmission circuit TG1 is controlled by the periodic signals clkb and clkbb.

The slave switching circuit 106 can also be referred to as a latching circuit. The slave switching circuit 106 includes a phase shift circuit INV1, and transmission circuits TG3 and TG4.

The phase shift circuit INV1 is configured to receive the feedforward signal mx_ax and, provide the feedback signal ml_b. A phase difference exists between the feedback signal ml_b and the feedforward signal mx_ax. A phase-shift quantity exists between the feedback signal ml_b and the feedforward signal mx_ax. In some embodiments, the phase shift circuit INV is an inverter. In some embodiments, the feedback signal ml_b is an inverted version of the feedforward signal mx_ax. If the feedforward signal mx_ax is logic low, the feedback signal ml_b becomes logic high, and vice versa.

The transmission circuit TG3 is electrically connected to the transmission circuit TG2. In operation, the feedback signal ml_b is transmitted from the transmission circuit TG3 to the transmission circuit TG2. The transmission circuit TG3 is electrically connected to the transmission circuit TG4. The transmission circuit TG3 is electrically connected to the output stage 108. The transmission circuit TG3 is configured to provide a feedforward signal sl_a to the output stage 108.

The transmission circuits TG3 and TG4 are configured to receive periodic signals clkb and clkbb. In operation, the transmission circuits TG3 and TG4 are controlled by the periodic signals clkb and clkbb.

The output stage 108 is electrically connected to the slave switching circuit 106. The output stage 108 is configured to provide an output signal Q. The output stage 108 is configured to provide a feedback signal sl_bx to the slave switching circuit 106. The output stage 108 is configured to provide a feedback signal sl_bx to the transmission circuit TG4.

The phase shift circuit 110 is configured to receive the signal SE and, provide the signal SEB. A phase difference exists between the signals SE and SEB. A phase-shift quantity exists between the signals SE and SEB. In some embodiments, the phase shift circuit 110 is an inverter. In some embodiments, the signal SEB is an inverted version of the signal SE. If the signal SE is logic low, the signal SEB becomes logic high, and vice versa.

The phase shift circuit 112 is configured to receive the signal CP and, provide the signal clkb. The signal CP can be a periodic signal. The signal CP can be a clock pulse signal. A phase difference exists between the signals CP and clkb. A phase-shift quantity exists between the signals CP and clkb. In some embodiments, the phase shift circuit 112 is an inverter. In some embodiments, the signal clkb is an inverted version of the signal CP. If the signal CP is logic low, the signal clkb becomes logic high, and vice versa.

The phase shift circuit 114 is configured to receive the signal clkb and, provide the signal clkbb. A phase difference exists between the signals clkb and clkbb. A phase-shift quantity exists between the signals clkb and clkbb. In some embodiments, the phase shift circuit 114 is an inverter. In some embodiments, the signal clkbb is an inverted version of the signal clkb. If the signal clkb is logic low, the signal clkbb becomes logic high, and vice versa.

Figure 2A:
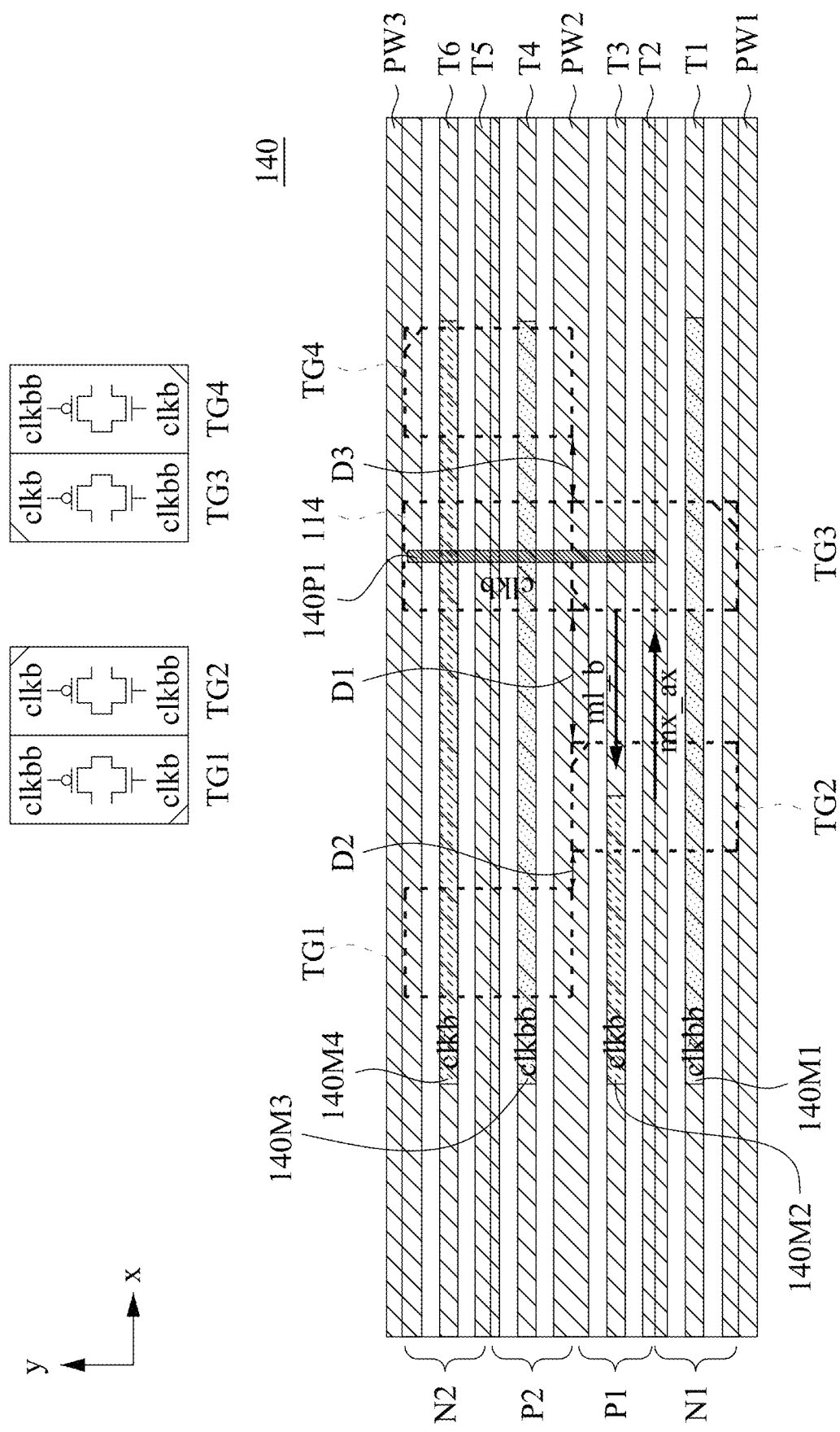
FIG. 2A is a top view of a semiconductor layout, in accordance with some embodiments of the present disclosure.

FIG. 2A is a top view of a semiconductor layout, in accordance with some embodiments of the present disclosure.

FIG. 2A shows a layout 140. The layout 140 can correspond to an electrical device. The layout 140 can correspond to a semiconductor device. The layout 140 can correspond to the semiconductor device 100 of FIG. 1. The layout 140 is shown in a simplified layout diagram, with some of the components/patterns omitted, for simplicity.

An integrated circuit (IC) layout diagram, e.g., layout 140, is usable in a method executed using an IC layout diagram generation system 700 discussed below with respect to FIG. 7 and/or an IC manufacturing flow associated with IC manufacturing system 800 discussed below with respect to FIG. 8, as part of defining one or more features of the corresponding IC device. In some embodiments, an IC layout diagram is stored in an IC design storage medium such as an IC design storage 707 discussed below with respect to FIG. 7.

The layout 140 includes regions N1, N2, P1 and P2. The regions N1, N2, P1 and P2 are categorized from a top view perspective. Transistors of a first type are disposed within the regions N1 and N2, and transistor of a second type different from the first type are disposed within the regions P1 and P2. In some embodiments, transistors of N-type are disposed within the regions N1 and N2. In some embodiments, transistors of P-type are disposed within the regions P1 and P2.

The regions N1, N2, P1 and P2 can be active regions of transistors. The regions N1, N2, P1 and P2 can be doped regions on a semiconductor substrate. Although not shown in the drawings, an isolation region/structure can be disposed between each of the regions N1, N2, P1, and P2.

The layout 140 can be referred to as a layout with a region of "double height." The layout 140 is designed using a "double height" scheme. The regions N1 and P1 constitute regions of "single height." The regions N2 and P2 constitute regions of "single height." The regions N1 and P1 can be referred to as a "row" in the present disclosure, and the regions N2 and P2 can also be referred to as a "row" in the present disclosure.

The layout 140 includes tracks T1, T2, T3, T4, T5, and T6 extending along the x-axis, in which conductive patterns can be located. The conductive pattern 140M1 is located along the track T1. The conductive pattern 140M2 is located along the track T3. The conductive pattern 140M3 is located along the track T4. The conductive pattern 140M4 is located along the track T6.

The conductive patterns 140M1 and 140M3 are configured to transmit the same periodic signal. The conductive patterns 140M1 and 140M3 are configured to transmit the periodic signal clkbb. The conductive patterns 140M2 and 140M4 are configured to transmit the same periodic signal. The conductive patterns 140M2 and 140M4 are configured to transmit the periodic signal clkb. The conductive patterns 140M1, 140M2, 140M3, and 140M4 can each be referred to as a clock path.

The layout 140 further includes tracks PW1, PW2, and PW3 extending along the x-axis. Conductive patterns that are configured to be coupled to a power source are located along the tracks PW1, PW2, and PW3. The conductive patterns disposed along the tracks PW1, PW2, and PW3 can each be referred to as a power rail.

The transmission circuit TG1 includes two transistors of different types. The transmission circuit TG1 is located within the regions N2 and P2. One of the transistors is located within the region N2, and the other within the region P2.

The transmission circuit TG2 includes two transistors of different types. The transmission circuit TG2 is located within the regions N1 and P1. One of the transistors is located within the region N1, and the other within the region P1.

The transmission circuit TG3 includes two transistors of different types. The transmission circuit TG3 is located within the regions N1 and P1. One of the transistors is located within the region N1, and the other within the region P1.

The transmission circuit TG4 includes two transistors of different types. The transmission circuit TG4 is located within the regions N2 and P2. One of the transistors is located within the region N2, and the other within the region P2.

The phase shift circuit 114 includes two transistors of different types. The phase shift circuit 114 is located within the regions N2 and P2. One of the transistors is located within the region N2, and the other within the region P2.

The transmission circuits TG1 and TG2 that belong to the master switching circuit 104 are disposed in different rows of the layout 140. That is, the transmission circuit TG1 is disposed within the regions N2 and P2, while the transmission circuit TG2 is disposed within the regions N1 and P1.

The transmission circuits TG3 and TG4 that belong to the slave switching circuit 106 are disposed in different rows of the layout 140. That is, the transmission circuit TG3 is disposed within the regions N1 and P1, while the transmission circuit TG4 is disposed within the regions N2 and P2.

The transmission circuit TG1 is electrically connected to the conductive patterns 140M3 and 140M4. The transmission circuit TG1 is configured to receive the periodic signal clkbb from the conductive pattern 140M3. The transmission circuit TG1 is configured to receive the periodic signal clkb from the conductive pattern 140M4.

The transmission circuit TG2 is electrically connected to the conductive patterns 140M1 and 140M2. The transmission circuit TG2 is configured to receive the periodic signal clkbb from the conductive pattern 140M1. The transmission circuit TG2 is configured to receive the periodic signal clkb from the conductive pattern 140M2.

The phase shift circuit 114 is electrically connected to the conductive patterns 140M3 and 140M4. The phase shift circuit 114 is configured to receive the periodic signal clkbb from the conductive pattern 140M3. The phase shift circuit 114 is configured to receive the periodic signal clkb from the conductive pattern 140M4. The phase shift circuit 114 is electrically connected to a gate conductor 140P1. The phase shift circuit 114 is configured to receive the periodic signal clkb from the gate conductor 140P1.

In some embodiments, a gate conductor, e.g., gate conductor 140P1, includes polysilicon materials (such as doped polysilicon), poly-germanium materials (such as doped poly-germanium), poly-silicon-germanium materials (such as doped poly-silicon-germanium) with n-type dopants, such as phosphorus (P) or arsenic (As). In some embodiments, a gate conductor includes polysilicon materials (such as doped polysilicon), poly-germanium materials (such as doped poly-germanium), poly-silicon-germanium materials (such as doped poly-silicon-germanium) with p-type dopants, such as boron (B) or BF2 or n-type dopants, such as phosphorus (P) or arsenic (As). In some embodiments, a gate conductor includes one or more metal materials, e.g., copper, aluminum, titanium, and/or one or more work function or other suitable materials.

The transmission circuit TG4 is electrically connected to the conductive patterns 140M3 and 140M4. The transmission circuit TG4 is configured to receive the periodic signal clkbb from the conductive pattern 140M3. The transmission circuit TG4 is configured to receive the periodic signal clkb from the conductive pattern 140M4.

The transmission circuit TG3 is electrically connected to the conductive patterns 140M1 and 140M4. The transmission circuit TG3 is electrically connected to the conductive pattern 140M4 through a gate conductor 140P1. The gate conductor 140P1 extends along the y-axis, from the region N2 to the region P1. The gate conductor 140P1 is substantially perpendicular to the conductive patterns 140M1, 140M2, 140M3, and 140M4.

The transmission circuit TG3 is configured to receive the periodic signal clkbb from the conductive pattern 140M1. The transmission circuit TG3 is configured to receive the periodic signal clkb from the conductive pattern 140M4, through the gate conductor 140P1. The gate conductor 140P1 is shared by the phase shift circuit 114 and the transmission circuit TG3.

Compared to other approaches, by utilizing the gate conductor 140P1 for transmitting the periodic signal clkb, fewer clock paths extending along the x-axis (i.e., horizontal direction) can be used. Fewer horizontal clock paths in use can facilitate feasible space therebetween. Referring to FIG. 2A, the conductive patterns 140M1, 140M2, 140M3, and 140M4 are respectively spaced apart from each other by a track. For example, the conductive pattern 140M1 is spaced apart from the conductive pattern 140M2 by the track T2. The conductive pattern 140M2 is spaced apart from the conductive pattern 140M3 by the track PW2. The conductive pattern 140M3 is spaced apart from the conductive pattern 140M4 by the track T5.

Compared to other approaches, feasible space between the horizontal clock paths can reduce the Miller capacitances therebetween. Feasible space between the horizontal clock paths can reduce the interference therebetween, especially when different clock signals are transmitted on adjacent clock paths. Feasible space between the horizontal clock paths can reduce the power consumption of the semiconductor device manufactured in accordance with the layout 140. Simulated results show an overall 7% to 11% power reduction by utilizing the arrangement of layout 140, compared to existing layout techniques.

The transmission circuit TG2 is spaced apart from the transmission circuit TG3 by a distance D1. The distance D1 equals or exceeds 2*CPP. CPP, the abbreviation for "contacted poly pitch," refers to the pitch between adjacent gate conductors. The CPP can be utilized as a scale in the layout design.

The transmission circuit TG1 is spaced apart from the transmission circuit TG2 along a horizontal axis, by a distance D2. In some embodiments, the distance D2 is 0*CPP. In some embodiments, the distance D2 is greater than 0*CPP. The transmission circuit TG4 is spaced apart from the transmission circuit TG3 along a horizontal axis, by a distance D3. In some embodiments, the distance D3 is 0*CPP. In some embodiments, the distance D3 is greater than 0*CPP.

The transmission circuit TG3 is configured to provide the feedback signal ml_b to the transmission circuit TG2, along conductive patterns extending along the x-axis. The transmission circuit TG2 is configured to provide the feedforward signal mx_ax to the transmission circuit TG3, along conductive patterns extending along the x-axis. The conductive patterns for transmitting the feedforward signal mx_ax and the feedback signal ml_b are not depicted in FIG. 2A for the sake of simplicity.

Figure 2B:
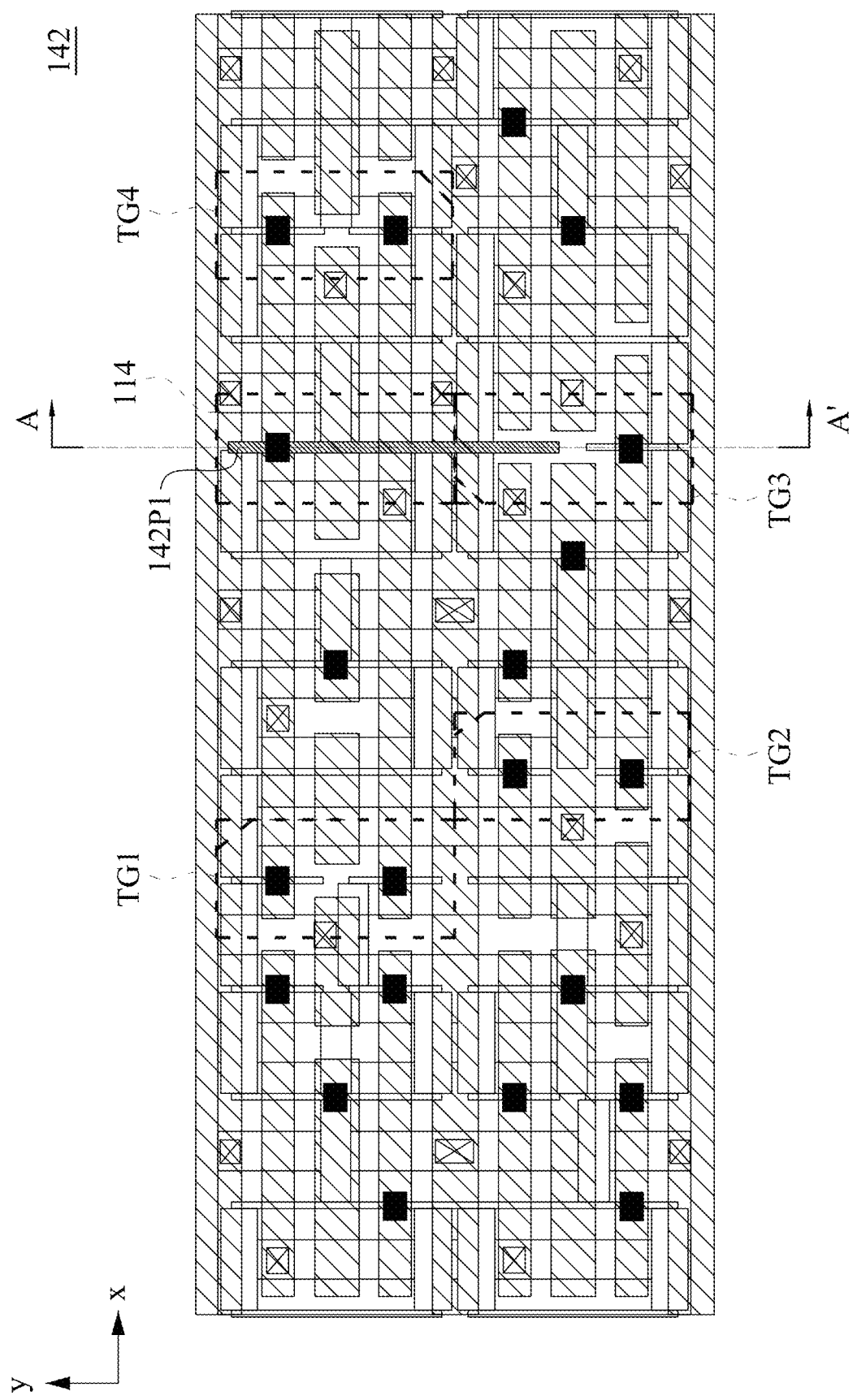
FIG. 2B is a top view of a semiconductor layout, in accordance with some embodiments of the present disclosure.

FIG. 2B is a top view of a semiconductor layout, in accordance with some embodiments of the present disclosure.

FIG. 2B shows a layout 142. The layout 142 corresponds to the layout 140 of FIG. 2A, the difference lies in that the layout 142 includes further details. For example, the layout 142 includes a plurality of gate conductors extending along the y-axis, a plurality of conductive patterns extending along the y-axis, and a plurality of conductive patterns extending along the x-axis. The layout 142 further includes a plurality of conductive vias for connecting intersected conductive patterns. The layout 142 further includes a plurality of conductive vias for connecting conductive patterns intersected with gate conductors.

The transmission circuits TG1, TG2, TG3 and TG4 and the phase shift circuit 114 of the layout 142 are disposed at positions similar to those shown in FIG. 2A. The gate conductor 142P1 is shared by the transmission circuit TG3 and the phase shift circuit 114. In operation periodic signals (e.g., clkb) is transmitted on the gate conductor 142P1. The transmission circuit TG3 and the phase shift circuit 114 receive an identical periodic signal through the gate conductor 142P1.

Figure 2C:
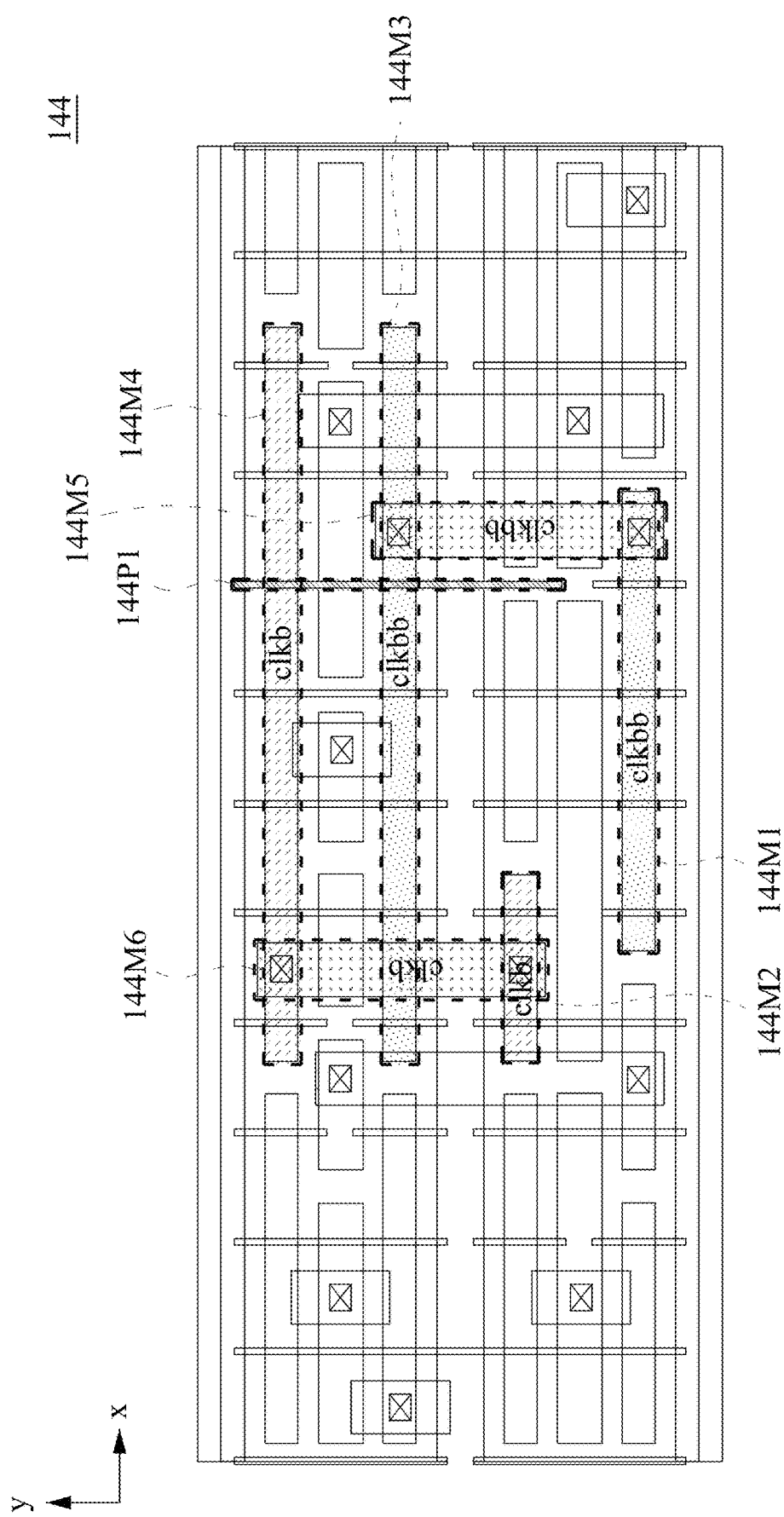
FIG. 2C is a top view of a semiconductor layout, in accordance with some embodiments of the present disclosure.

FIG. 2C is a top view of a semiconductor layout, in accordance with some embodiments of the present disclosure.

FIG. 2C shows a layout 144. The layout 144 corresponds to the layout 140 of FIG. 2A and the layout 142 of FIG. 2B, the difference lies in that the layout 144 clearly shows the conductive patterns used for transmitting periodic signals, while some other details are omitted for the purpose of simplicity. The layout 142 of FIG. 2B and the layout 144 of FIG. 2C can correspond to structures of different layers of an identical flip-flop device.

The layout 144 includes conductive patterns 144M1, 144M2, 144M3 and 144M4 that extend along the x-axis, and conductive patterns 144M5 and 144M6 that extend along the y-axis. The layout further includes a gate conductor 144P1 extending along the y-axis. In operation, periodic signal clkb is transmitted on the conductive patterns 144M2, 144M4, 144M6, and the gate conductor 144P1. Periodic signal clkbb is transmitted on the conductive patterns 144M1, 144M3, and 144M5.

Referring to FIG. 2C, by utilizing the techniques disclosed in the present disclosure, the number of horizontal clock paths (i.e., the conductive patterns 144M1, 144M2, 144M3, and 144M4) can be reduced to four or fewer, and the number of vertical clock paths (i.e., the conductive patterns 144M5 and 144M6) can be reduced to two or fewer.

Fewer horizontal clock paths in use can facilitate reduction of the power consumption of the semiconductor device manufactured in accordance with the layout 144. Fewer vertical clock paths in use can facilitate reduction of the power consumption of the semiconductor device manufactured in accordance with the layout 144.

Figure 2D:
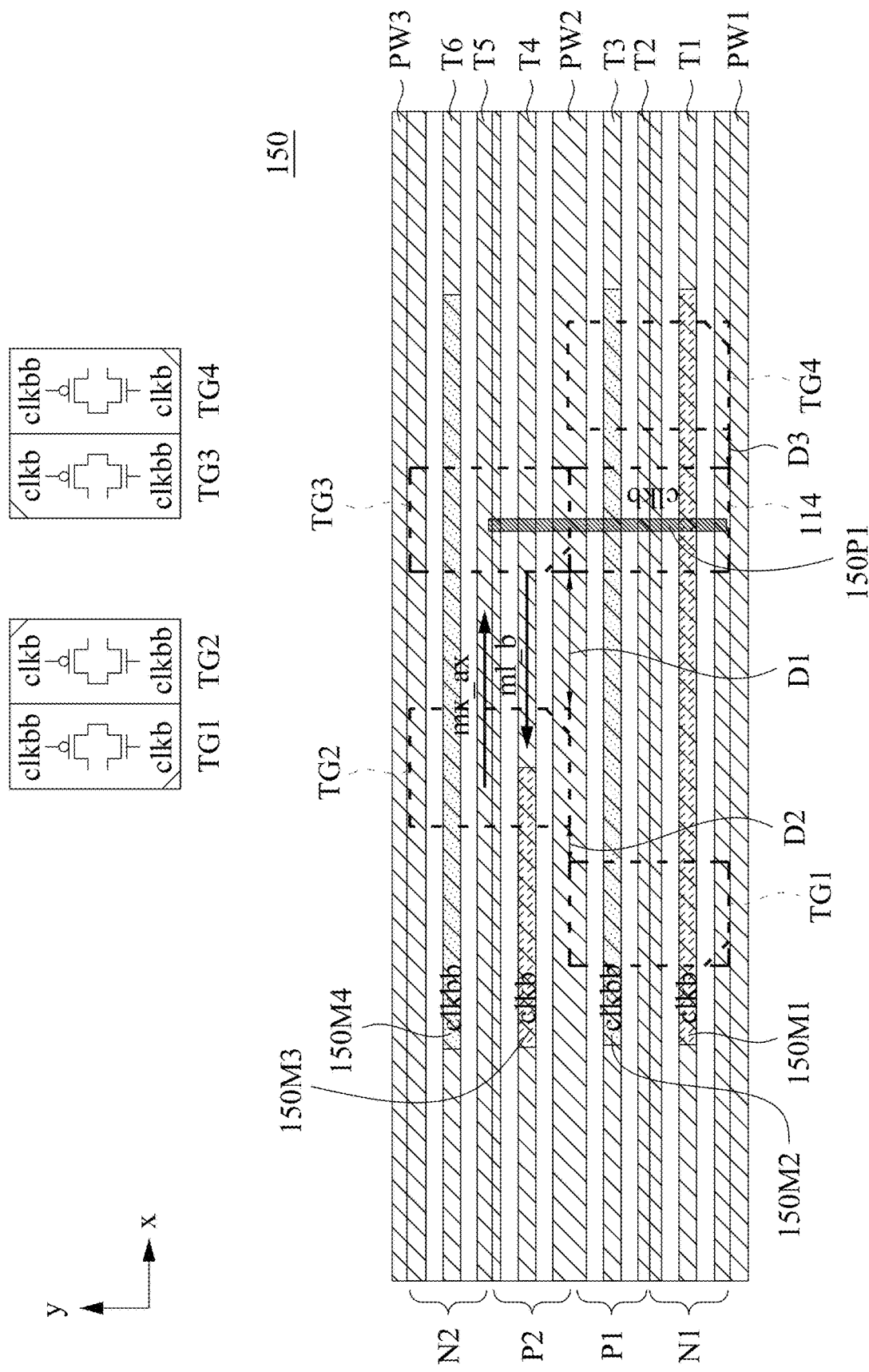
FIG. 2D is a top view of a semiconductor layout, in accordance with some embodiments of the present disclosure.

FIG. 2D is a top view of a semiconductor layout, in accordance with some embodiments of the present disclosure.

FIG. 2D shows a layout 150. The layout 150 can correspond to an electrical device. The layout 150 can correspond to a semiconductor device. The layout 150 can correspond to the semiconductor device 100 of FIG. 1. The layout 150 is shown in a simplified layout diagram, with some of the components/patterns omitted, for simplicity.

The layout 150 includes regions N1, N2, P1 and P2. Transistors of a first type are disposed within the regions N1 and N2, and transistors of a second type different from the first type are disposed within the regions P1 and P2. In some embodiments, transistors of N-type are disposed within the regions N1 and N2. In some embodiments, transistors of P-type are disposed within the regions P1 and P2.

The layout 150 can be referred to as a layout with a region of "double height." The layout 150 is designed using a "double height" scheme. The regions N1 and P1 constitute regions of "single height." The regions N2 and P2 constitute regions of "single height." The regions N1 and P1 can be referred to as a "row" in the present disclosure, and the regions N2 and P2 can also be referred to as a "row" in the present disclosure.

The layout 150 includes tracks T1, T2, T3, T4, T5, and T6 extending along the x-axis, in which conductive patterns can be located. The conductive pattern 150M1 is located along the track T1. The conductive pattern 150M2 is located along the track T3. The conductive pattern 150M3 is located along the track T4. The conductive pattern 150M4 is located along the track T6.

The conductive patterns 150M1 and 150M3 are configured to transmit the same periodic signal. The conductive patterns 150M1 and 150M3 are configured to transmit the periodic signal clkb. The conductive patterns 150M2 and 150M4 are configured to transmit the same periodic signal. The conductive patterns 150M2 and 150M4 are configured to transmit the periodic signal clkbb. The conductive patterns 150M1, 150M2, 150M3, and 150M4 can each be referred to as a clock path.

The layout 150 further includes tracks PW1, PW2, and PW3 extending along the x-axis. Conductive patterns that are configured to be coupled to a power source are located along the tracks PW1, PW2, and PW3. The conductive patterns disposed along the tracks PW1, PW2, and PW3 can each be referred to as a power rail.

The transmission circuit TG1 includes two transistors of different types. The transmission circuit TG1 is located within the regions N1 and P1. One of the transistors is located within the region N1, and the other within the region P1.

The transmission circuit TG2 includes two transistors of different types. The transmission circuit TG2 is located within the regions N2 and P2. One of the transistors is located within the region N2, and the other within the region P2.

The transmission circuit TG3 includes two transistors of different types. The transmission circuit TG3 is located within the regions N2 and P2. One of the transistors is located within the region N2, and the other within the region P2.

The transmission circuit TG4 includes two transistors of different types. The transmission circuit TG4 is located within the regions N1 and P1. One of the transistors is located within the region N1, and the other within the region P1.

The phase shift circuit 114 includes two transistors of different types. The phase shift circuit 114 is located within the regions N1 and P1. One of the transistors is located within the region N1, and the other within the region P1.

The transmission circuits TG1 and TG2 that belong to the master switching circuit 104 are disposed in different rows of the layout 150. That is, the transmission circuit TG1 is disposed within the regions N1 and P1, while the transmission circuit TG2 is disposed within the regions N2 and P2.

The transmission circuits TG3 and TG4 that belong to the slave switching circuit 106 are disposed in different rows of the layout 150. That is, the transmission circuit TG3 is disposed within the regions N2 and P2, while the transmission circuit TG4 is disposed within the regions N1 and P1.

The transmission circuit TG1 is electrically connected to the conductive patterns 150M1 and 150M2. The transmission circuit TG1 is configured to receive the periodic signal clkb from the conductive pattern 150M1. The transmission circuit TG1 is configured to receive the periodic signal clkbb from the conductive pattern 150M2.

The transmission circuit TG2 is electrically connected to the conductive patterns 150M3 and 150M4. The transmission circuit TG2 is configured to receive the periodic signal clkb from the conductive pattern 150M3. The transmission circuit TG2 is configured to receive the periodic signal clkbb from the conductive pattern 150M4.

The phase shift circuit 114 is electrically connected to the conductive patterns 150M1 and 150M2. The phase shift circuit 114 is configured to receive the periodic signal clkb from the conductive pattern 150M1. The phase shift circuit 114 is configured to receive the periodic signal clkbb from the conductive pattern 150M2. The phase shift circuit 114 is electrically connected to a gate conductor 150P1. The phase shift circuit 114 is configured to receive the periodic signal clkb from the gate conductor 150P1.

The transmission circuit TG4 is electrically connected to the conductive patterns 150M1 and 150M2. The transmission circuit TG4 is configured to receive the periodic signal clkb from the conductive pattern 150M1. The transmission circuit TG4 is configured to receive the periodic signal clkbb from the conductive pattern 150M2.

The transmission circuit TG3 is electrically connected to the conductive patterns 150M1 and 150M4. The transmission circuit TG3 is electrically connected to the conductive pattern 150M1 through a gate conductor 150P1. The gate conductor 150P1 extends along the y-axis, from the region N1 to the region P2. The gate conductor 150P1 is substantially perpendicular to the conductive patterns 150M1, 150M2, 150M3, and 150M4.

The transmission circuit TG3 is configured to receive the periodic signal clkbb from the conductive pattern 150M4. The transmission circuit TG3 is configured to receive the periodic signal clkb from the conductive pattern 150M1, through the gate conductor 150P1. The gate conductor 150P1 is shared by the phase shift circuit 114 and the transmission circuit TG3.

Compared to other approaches, by utilizing the gate conductor 150P1 for transmitting the periodic signal clkb, fewer clock paths extending along the x-axis (i.e., horizontal direction) can be used. Fewer horizontal clock paths in use can facilitate feasible space therebetween. Referring to FIG. 2D, the conductive patterns 150M1, 150M2, 150M3, and 150M4 are respectively spaced apart from each other by a track. For example, the conductive pattern 150M1 is spaced apart from the conductive pattern 150M2 by the track T2. The conductive pattern 150M2 is spaced apart from the conductive pattern 150M3 by the track PW2. The conductive pattern 150M3 is spaced apart from the conductive pattern 150M4 by the track T5.

Compared to other approaches, feasible space between the horizontal clock paths can reduce the Miller capacitances therebetween. Feasible space between the horizontal clock paths can reduce the interference therebetween, especially when different clock signals are transmitted on adjacent clock paths. Feasible space between the horizontal clock paths can reduce the power consumption of the semiconductor device manufactured in accordance with the layout 150. Simulated results show an overall 7% to 11% power reduction by utilizing the arrangement of layout 150, compared to existing layout techniques.

The transmission circuit TG2 is spaced apart from the transmission circuit TG3 by a distance D1. The distance D1 equals or exceeds 2*CPP. The transmission circuit TG1 is spaced apart from the transmission circuit TG2 along a horizontal axis, by a distance D2. In some embodiments, the distance D2 is 0*CPP. In some embodiments, the distance D2 is greater than 0*CPP. The transmission circuit TG4 is spaced apart from the transmission circuit TG3 along a horizontal axis, by a distance D3. In some embodiments, the distance D3 is 0*CPP. In some embodiments, the distance D3 is greater than 0*CPP.

The transmission circuit TG3 is configured to provide the feedback signal ml_b to the transmission circuit TG2, along conductive patterns extending along the x-axis. The transmission circuit TG2 is configured to provide the feedforward signal mx_ax to the transmission circuit TG3, along conductive patterns extending along the x-axis. The conductive patterns for transmitting the feedforward signal mx_ax and the feedback signal ml_b are not depicted in FIG. 2D for the sake of simplicity.

Figure 2E:
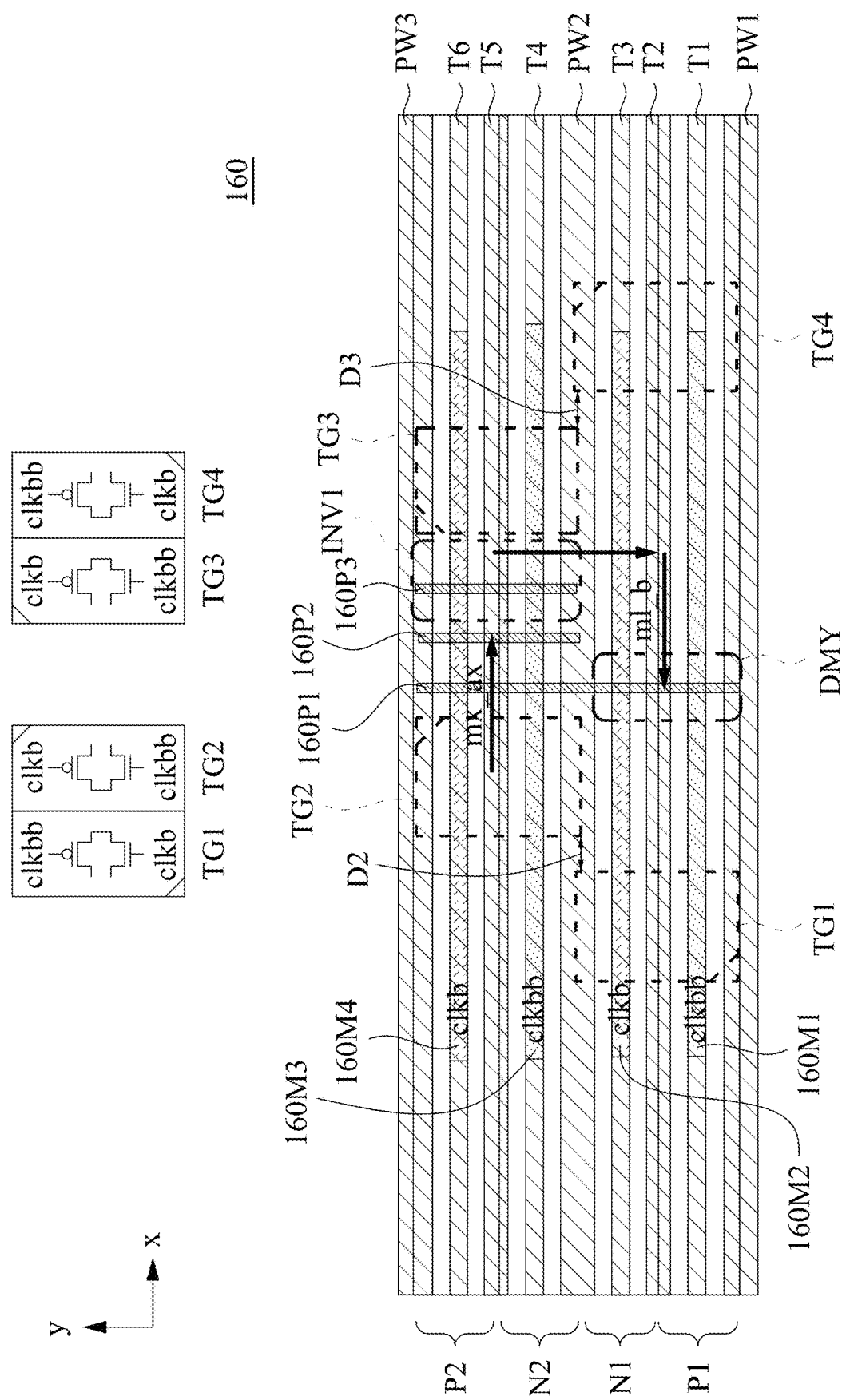
FIG. 2E is a top view of a semiconductor layout, in accordance with some embodiments of the present disclosure.

FIG. 2E is a top view of a semiconductor layout, in accordance with some embodiments of the present disclosure.

FIG. 2E shows a layout 160. The layout 160 can correspond to an electrical device. The layout 160 can correspond to a semiconductor device. The layout 160 can correspond to the semiconductor device 100 of FIG. 1. The layout 160 is shown in a simplified layout diagram, with some of the components/patterns omitted, for simplicity.

The layout 160 includes regions N1, N2, P1 and P2. Transistors of a first type are disposed within the regions N1 and N2, and transistors of a second type different from the first type are disposed within the regions P1 and P2. In some embodiments, transistors of N-type are disposed within the regions N1 and N2. In some embodiments, transistors of P-type are disposed within the regions P1 and P2.

The layout 160 can be referred to as a layout with a region of "double height." The layout 160 is designed using a "double height" scheme. The regions N1 and P1 constitute regions of "single height." The regions N2 and P2 constitute regions of "single height." The regions N1 and P1 can be referred to as a "row" in the present disclosure, and the regions N2 and P2 can also be referred to as a "row" in the present disclosure.

The layout 160 includes tracks T1, T2, T3, T4, T5, and T6 extending along the x-axis, in which conductive patterns can be located. The conductive pattern 160M1 is located along the track T1. The conductive pattern 160M2 is located along the track T3. The conductive pattern 160M3 is located along the track T4. The conductive pattern 160M4 is located along the track T6.

The conductive patterns 160M1 and 160M3 are configured to transmit the same periodic signal. The conductive patterns 160M1 and 160M3 are configured to transmit the periodic signal clkbb. The conductive patterns 160M2 and 160M4 are configured to transmit the same periodic signal. The conductive patterns 160M2 and 160M4 are configured to transmit the periodic signal clkb. The conductive patterns 160M1, 160M2, 160M3, and 160M4 can each be referred to as a clock path.

The layout 160 further includes tracks PW1, PW2, and PW3 extending along the x-axis. Conductive patterns that are configured to be coupled to a power source are located along the tracks PW1, PW2, and PW3. The conductive patterns disposed along the tracks PW1, PW2, and PW3 can each be referred to as a power rail.

The transmission circuit TG1 includes two transistors of different types. The transmission circuit TG1 is located within the regions N1 and P1. One of the transistors is located within the region N1, and the other within the region P1.

The transmission circuit TG2 includes two transistors of different types. The transmission circuit TG2 is located within the regions N2 and P2. One of the transistors is located within the region N2, and the other within the region P2.

The transmission circuit TG3 includes two transistors of different types. The transmission circuit TG3 is located within the regions N2 and P2. One of the transistors is located within the region N2, and the other within the region P2.

The transmission circuit TG4 includes two transistors of different types. The transmission circuit TG4 is located within the regions N1 and P1. One of the transistors is located within the region N1, and the other within the region P1.

The transmission circuits TG1 and TG2 that belong to the master switching circuit 104 are disposed in different rows of the layout 160. That is, the transmission circuit TG1 is disposed within the regions N1 and P1, while the transmission circuit TG2 is disposed within the regions N2 and P2.

The transmission circuits TG3 and TG4 that belong to the slave switching circuit 106 are disposed in different rows of the layout 160. That is, the transmission circuit TG3 is disposed within the regions N2 and P2, while the transmission circuit TG4 is disposed within the regions N1 and P1.

The transmission circuit TG1 is electrically connected to the conductive patterns 160M1 and 160M2. The transmission circuit TG1 is configured to receive the periodic signal clkbb from the conductive pattern 160M1. The transmission circuit TG1 is configured to receive the periodic signal clkb from the conductive pattern 160M2.

The transmission circuit TG2 is electrically connected to the conductive patterns 160M3 and 160M4. The transmission circuit TG2 is configured to receive the periodic signal clkbb from the conductive pattern 160M3. The transmission circuit TG2 is configured to receive the periodic signal clkb from the conductive pattern 160M4.

The transmission circuit TG3 is electrically connected to the conductive patterns 160M3 and 160M4. The transmission circuit TG3 is configured to receive the periodic signal clkbb from the conductive pattern 160M3. The transmission circuit TG3 is configured to receive the periodic signal clkb from the conductive pattern 160M4.

The transmission circuit TG4 is electrically connected to the conductive patterns 160M1 and 160M2. The transmission circuit TG4 is configured to receive the periodic signal clkbb from the conductive pattern 160M1. The transmission circuit TG4 is configured to receive the periodic signal clkb from the conductive pattern 160M2.

The layout 160 further includes gate conductors 160P1, 160P2, and 160P3. The gate conductors 160P1, 160P2, and 160P3 are substantially perpendicular to the conductive patterns 160M1, 160M2, 160M3, and 160M4.

The transmission circuit TG2 is configured to transmit the feedforward signal mx_ax to the transmission circuit TG3, through a horizontal conductive pattern and the gate conductor 160P2. The transmission circuit TG3 is configured to transmit the feedback signal ml_b to the transmission circuit TG2, through a vertical conductive pattern, a horizontal conductive pattern, and the gate conductor 160P1. The phase shift circuit INV1 is disposed adjacent to the transmission circuit TG3.

The horizontal conductive pattern for transmitting the feedforward signal mx_ax is not depicted in FIG. 2E for the sake of simplicity. The vertical and horizontal conductive pattern for transmitting the feedback signal ml_b is not depicted in FIG. 2E for the sake of simplicity.

A dummy device DMY is disposed within the regions N1 and P1, adjacent to the gate conductor 160P1. The dummy device DMY is formed by electrically connecting the drain/source electrodes of its transistors together. The dummy device DMY is formed because the gate conductor 160P1 is used as a conductive path for signal transmission.

Compared to other approaches, by utilizing the gate conductors 160P1 and 160P2 for transmitting signals mx_ax and ml_b, fewer conductive patterns extending along the x-axis (i.e., horizontal direction) can be used. Fewer horizontal conductive patterns used can facilitate feasible space therebetween. Feasible space between the horizontal conductive patterns can reduce the Miller capacitances therebetween. Feasible space between the horizontal conductive patterns can reduce the interference therebetween, especially when different signals are transmitted on adjacent conductive patterns. Feasible space between the horizontal conductive patterns can reduce the power consumption of the semiconductor device manufactured in accordance with the layout 160. Simulated results show an overall 7% to 11% power reduction by utilizing the arrangement of layout 160, compared to existing layout techniques.

The transmission circuit TG2 is spaced apart from the transmission circuit TG3 by a distance D1. The distance D1 equals or exceeds 2*CPP. The transmission circuit TG1 is spaced apart from the transmission circuit TG2 along a horizontal axis, by a distance D2. In some embodiments, the distance D2 is 0*CPP. In some embodiments, the distance D2 is greater than 0*CPP. The transmission circuit TG4 is spaced apart from the transmission circuit TG3 along a horizontal axis, by a distance D3. In some embodiments, the distance D3 is 0*CPP. In some embodiments, the distance D3 is greater than 0*CPP.

Figure 2F:
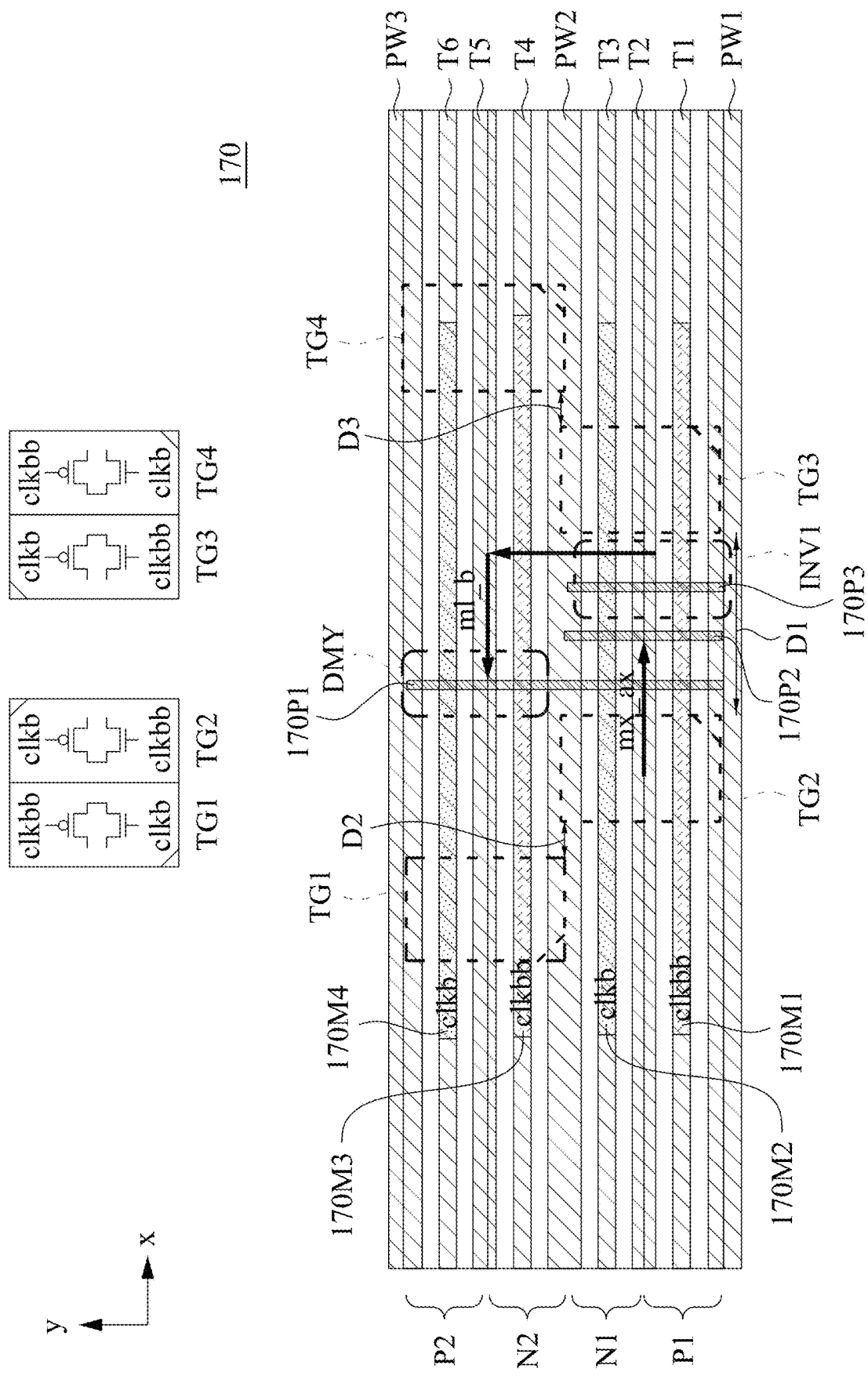
FIG. 2F is a top view of a semiconductor layout, in accordance with some embodiments of the present disclosure.

FIG. 2F is a top view of a semiconductor layout, in accordance with some embodiments of the present disclosure.

FIG. 2F shows a layout 170. The layout 170 can correspond to an electrical device. The layout 170 can correspond to a semiconductor device. The layout 170 can correspond to the semiconductor device 100 of FIG. 1. The layout 170 is shown in a simplified layout diagram, with some of the components/patterns omitted, for simplicity.

The layout 170 includes regions N1, N2, P1 and P2. Transistors of a first type are disposed within the regions N1 and N2, and transistors of a second type different from the first type are disposed within the regions P1 and P2. In some embodiments, transistors of N-type are disposed within the regions N1 and N2. In some embodiments, transistors of P-type are disposed within the regions P1 and P2.

The layout 170 can be referred to as a layout with a region of "double height." The layout 170 is designed using a "double height" scheme. The regions N1 and P1 constitute regions of "single height." The regions N2 and P2 constitute regions of "single height." The regions N1 and P1 can be referred to as a "row" in the present disclosure, and the regions N2 and P2 can also be referred to as a "row" in the present disclosure.

The layout 170 includes tracks T1, T2, T3, T4, T5, and T6 extending along the x-axis, in which conductive patterns can be located. The conductive pattern 170M1 is located along the track T1. The conductive pattern 170M2 is located along the track T3. The conductive pattern 170M3 is located along the track T4. The conductive pattern 170M4 is located along the track T6.

The conductive patterns 170M1 and 170M3 are configured to transmit the same periodic signal. The conductive patterns 170M1 and 170M3 are configured to transmit the periodic signal clkb. The conductive patterns 170M2 and 170M4 are configured to transmit the same periodic signal. The conductive patterns 170M2 and 170M4 are configured to transmit the periodic signal clkbb. The conductive patterns 170M1, 170M2, 170M3, and 170M4 can each be referred to as a clock path.

The layout 170 further includes tracks PW1, PW2, and PW3 extending along the x-axis. Conductive patterns that are configured to be coupled to a power source are located along the tracks PW1, PW2, and PW3. The conductive patterns disposed along the tracks PW1, PW2, and PW3 can each be referred to as a power rail.

The transmission circuit TG1 includes two transistors of different types. The transmission circuit TG1 is located within the regions N2 and P2. One of the transistors is located within the region N2, and the other within the region P2.

The transmission circuit TG2 includes two transistors of different types. The transmission circuit TG2 is located within the regions N1 and P1. One of the transistors is located within the region N1, and the other within the region P1.

The transmission circuit TG3 includes two transistors of different types. The transmission circuit TG3 is located within the regions N1 and P1. One of the transistors is located within the region N1, and the other within the region P1.

The transmission circuit TG4 includes two transistors of different types. The transmission circuit TG4 is located within the regions N2 and P2. One of the transistors is located within the region N2, and the other within the region P2.

The transmission circuits TG1 and TG2 that belong to the master switching circuit 104 are disposed in different rows of the layout 170. That is, the transmission circuit TG1 is disposed within the regions N2 and P2, while the transmission circuit TG2 is disposed within the regions N1 and P1.

The transmission circuits TG3 and TG4 that belong to the slave switching circuit 106 are disposed in different rows of the layout 170. That is, the transmission circuit TG3 is disposed within the regions N1 and P1, while the transmission circuit TG4 is disposed within the regions N2 and P2.

The transmission circuit TG1 is electrically connected to the conductive patterns 170M3 and 170M4. The transmission circuit TG1 is configured to receive the periodic signal clkb from the conductive pattern 170M3. The transmission circuit TG1 is configured to receive the periodic signal clkbb from the conductive pattern 170M4.

The transmission circuit TG2 is electrically connected to the conductive patterns 170M1 and 170M2. The transmission circuit TG2 is configured to receive the periodic signal clkb from the conductive pattern 170M1. The transmission circuit TG2 is configured to receive the periodic signal clkbb from the conductive pattern 170M2.

The transmission circuit TG3 is electrically connected to the conductive patterns 170M1 and 170M2. The transmission circuit TG3 is configured to receive the periodic signal clkb from the conductive pattern 170M1. The transmission circuit TG3 is configured to receive the periodic signal clkbb from the conductive pattern 170M2.

The transmission circuit TG4 is electrically connected to the conductive patterns 170M3 and 170M4. The transmission circuit TG4 is configured to receive the periodic signal clkb from the conductive pattern 170M3. The transmission circuit TG4 is configured to receive the periodic signal clkbb from the conductive pattern 170M4.

The layout 170 further includes gate conductors 170P1, 170P2, and 170P3. The gate conductors 170P1, 170P2, and 170P3 is substantially perpendicular to the conductive patterns 170M1, 170M2, 170M3, and 170M4.

The transmission circuit TG2 is configured to transmit the feedforward signal mx_ax to the transmission circuit TG3, through a horizontal conductive pattern and the gate conductor 170P2. The transmission circuit TG3 is configured to transmit the feedback signal ml_b to the transmission circuit TG2, through a vertical conductive pattern, a horizontal conductive pattern, and the gate conductor 170P1. The phase shift circuit INV1 is disposed adjacent to the transmission circuit TG3.

The horizontal conductive pattern for transmitting the feedforward signal mx_ax is not depicted in FIG. 2F for the sake of simplicity. The vertical and horizontal conductive pattern for transmitting the feedback signal ml_b is not depicted in FIG. 2F for the sake of simplicity.

A dummy device DMY is disposed within the regions N2 and P2, adjacent to the gate conductor 170P1. The dummy device DMY is formed by electrically connecting the drain/source electrodes of its transistors. The dummy device DMY is formed because the gate conductor 170P1 is used as a conductive path for signal transmission.

Compared to other approaches, by utilizing the gate conductors 170P1 and 170P2 for transmitting signals mx_ax and ml_b, fewer conductive patterns extending along the x-axis (i.e., horizontal direction) can be used. Fewer horizontal conductive patterns used can facilitate feasible space therebetween. Feasible space between the horizontal conductive patterns can reduce the Miller capacitances therebetween. Feasible space between the horizontal conductive patterns can reduce the interference therebetween, especially when different signals are transmitted on adjacent conductive patterns. Feasible space between the horizontal conductive patterns can reduce the power consumption of the semiconductor device manufactured in accordance with the layout 170. Simulated results show an overall 7% to 11% power reduction by utilizing the arrangement of layout 170, compared to existing layout techniques.

The transmission circuit TG2 is spaced apart from the transmission circuit TG3 by a distance D1. The distance D1 equals or exceeds 2*CPP. The transmission circuit TG1 is spaced apart from the transmission circuit TG2 along a horizontal axis, by a distance D2. In some embodiments, the distance D2 is 0*CPP. In some embodiments, the distance D2 is greater than 0*CPP. The transmission circuit TG4 is spaced apart from the transmission circuit TG3 along a horizontal axis, by a distance D3. In some embodiments, the distance D3 is 0*CPP. In some embodiments, the distance D3 is greater than 0*CPP.

Figure 2G:
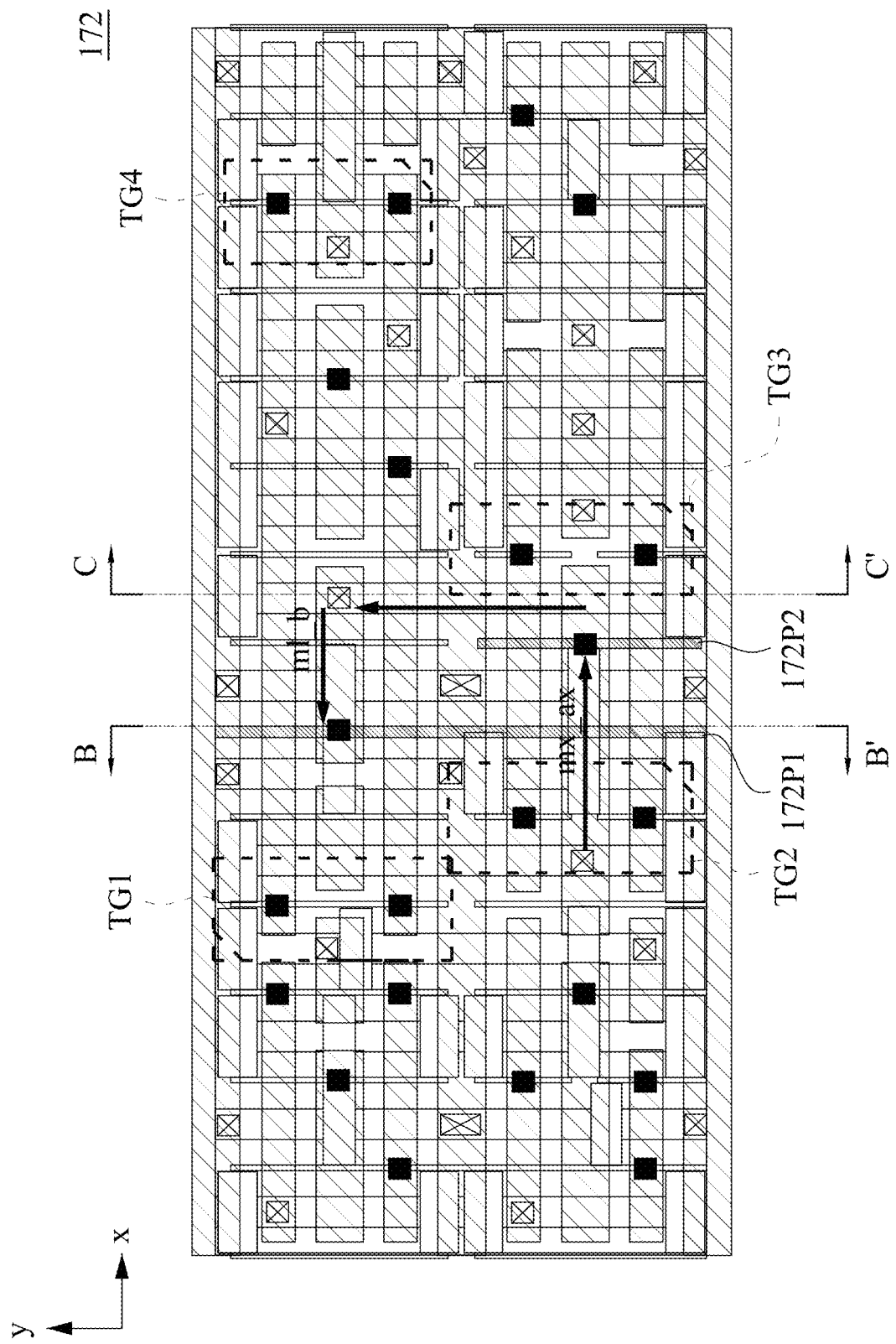
FIG. 2G is a top view of a semiconductor layout, in accordance with some embodiments of the present disclosure.

FIG. 2G is a top view of a semiconductor layout, in accordance with some embodiments of the present disclosure.

FIG. 2G shows a layout 172. The layout 172 corresponds to the layout 170 of FIG. 2F, the difference lies in that the layout 172 includes further details. For example, the layout 172 includes a plurality of gate conductors extending along the y-axis, a plurality of conductive patterns extending along the y-axis, and a plurality of conductive patterns extending along the x-axis. The layout 172 further includes a plurality of conductive vias for connecting intersected conductive patterns. The layout 172 further includes a plurality of conductive vias for connecting conductive patterns intersected with gate conductors.

The transmission circuits TG1, TG2, TG3 and TG4 of the layout 172 are disposed at positions similar to those shown in FIG. 2F. In operation, the gate conductor 172P1 is utilized to transmit the feedback signal ml_b, and the gate conductor 172P2 is utilized to transmit the feedforward signal mx_ax.

Figure 2H:
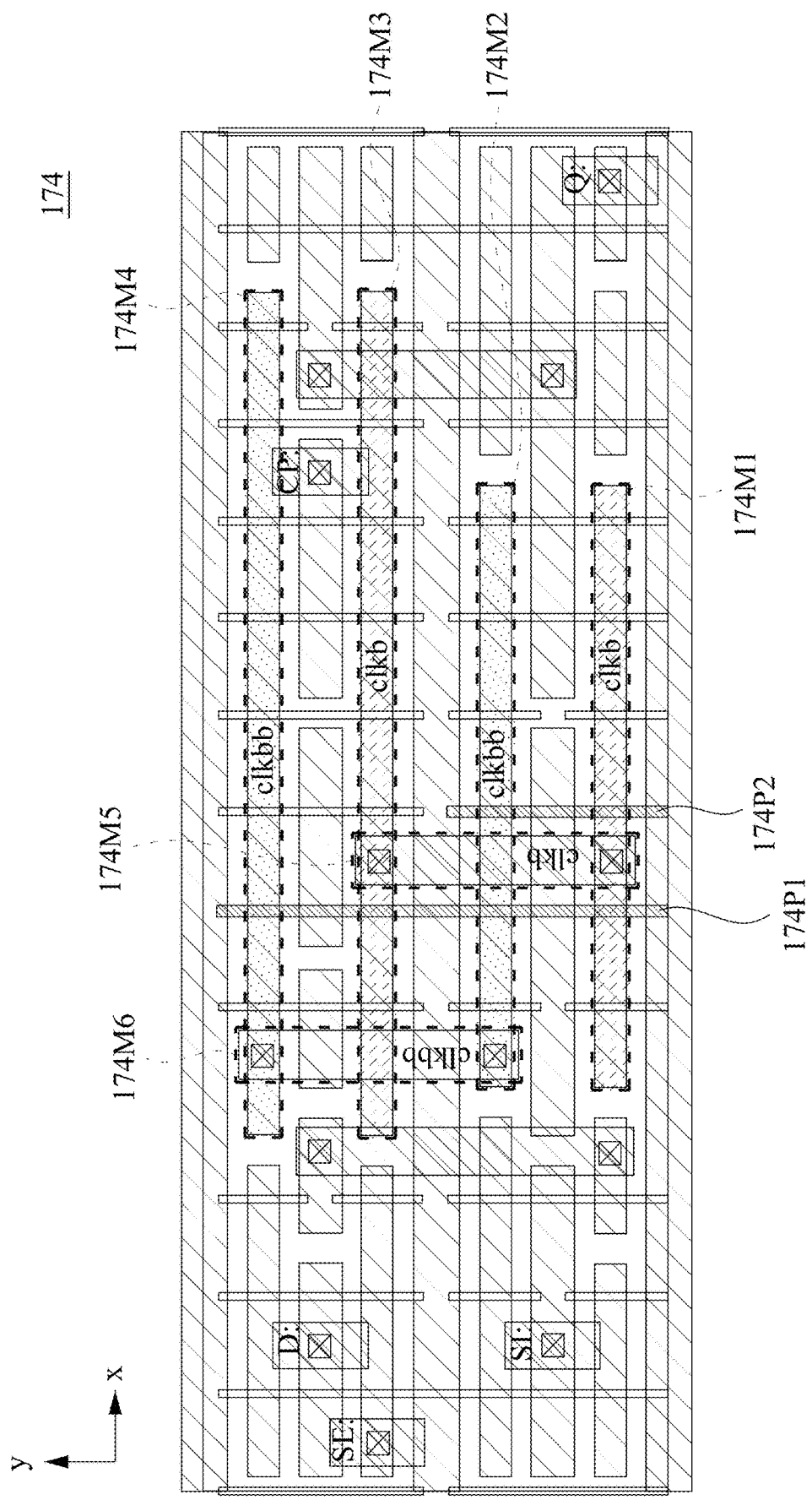
FIG. 2H is a top view of a semiconductor layout, in accordance with some embodiments of the present disclosure.

FIG. 2H is a top view of a semiconductor layout, in accordance with some embodiments of the present disclosure.

FIG. 2H shows a layout 174. The layout 174 corresponds to the layout 170 of FIG. 2F and the layout 172 of FIG. 2G, the difference lies in that the layout 174 clearly shows the conductive patterns used for transmitting periodic signals, while some other details are omitted for the purpose of simplicity. The layout 172 of FIG. 2G and the layout 174 of FIG. 2H can correspond to structures of different layers of an identical flip-flop device.

The layout 174 includes conductive patterns 174M1, 174M2, 174M3 and 174M4 that extend along the x-axis, and conductive patterns 174M5 and 174M6 that extend along the y-axis. The layout further includes gate conductors 174P1 and 174P2 extending along the y-axis. In operation, periodic signal clkb is transmitted on the conductive patterns 174M1, 174M3, and 174M5. Periodic signal clkbb is transmitted on the conductive patterns 174M2, 174M4, and 174M6.

Referring to FIG. 2H, by utilizing the techniques disclosed in the present disclosure, the number of horizontal clock paths (i.e., the conductive patterns 174M1, 174M2, 174M3, and 174M4) is four or fewer, and the number of vertical clock paths (i.e., the conductive patterns 174M5 and 174M6) is two or fewer.

Compared to other approaches, fewer horizontal clock paths in use can facilitate reduction of the power consumption of the semiconductor device manufactured in accordance with the layout 174. Fewer vertical clock paths in use can facilitate reduction of the power consumption of the semiconductor device manufactured in accordance with the layout 174.

Figure 2I:
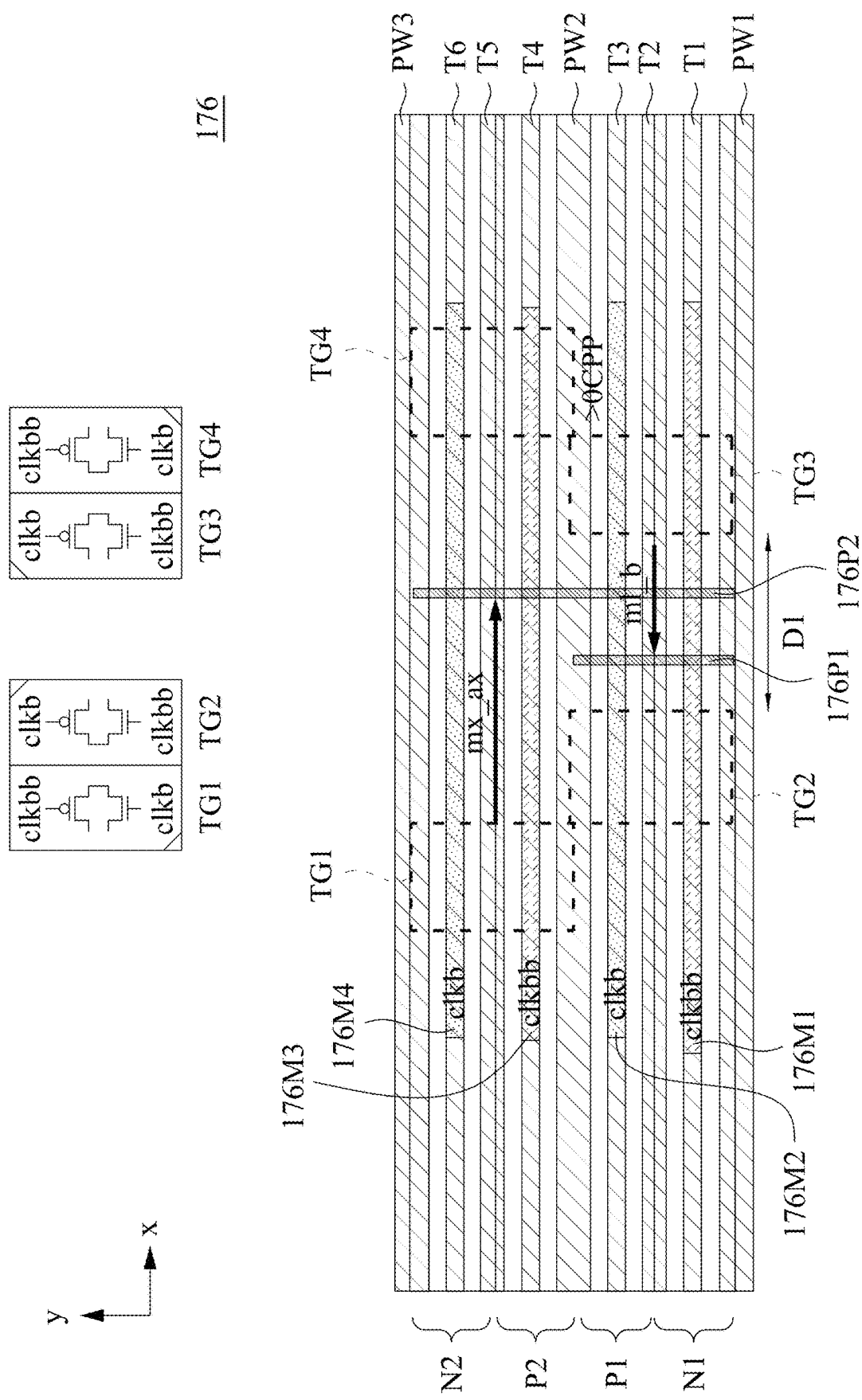
FIG. 2I is a top view of a semiconductor layout, in accordance with some embodiments of the present disclosure.

FIG. 2I is a top view of a semiconductor layout, in accordance with some embodiments of the present disclosure.

FIG. 2I shows a layout 176. The layout 176 can correspond to an electrical device. The layout 176 can correspond to a semiconductor device. The layout 176 can correspond to the semiconductor device 100 of FIG. 1. The layout 176 is shown in a simplified layout diagram, with some of the components/patterns omitted, for simplicity.

The layout 176 includes regions N1, N2, P1 and P2. Transistors of a first type are disposed within the regions N1 and N2, and transistors of a second type different from the first type are disposed within the regions P1 and P2. In some embodiments, transistors of N-type are disposed within the regions N1 and N2. In some embodiments, transistors of P-type are disposed within the regions P1 and P2.

The layout 176 can be referred to as a layout with a region of "double height." The layout 176 is designed using a "double height" scheme. The regions N1 and P1 constitute regions of "single height." The regions N2 and P2 constitute regions of "single height." The regions N1 and P1 can be referred to as a "row" in the present disclosure, and the regions N2 and P2 can also be referred to as a "row" in the present disclosure.

The layout 176 includes tracks T1, T2, T3, T4, T5, and T6 extending along the x-axis, in which conductive patterns can be located. The conductive pattern 176M1 is located along the track T1. The conductive pattern 176M2 is located along the track T3. The conductive pattern 176M3 is located along the track T4. The conductive pattern 176M4 is located along the track T6.

The conductive patterns 176M1 and 176M3 are configured to transmit the same periodic signal. The conductive patterns 176M1 and 176M3 are configured to transmit the periodic signal clkb. The conductive patterns 176M2 and 176M4 are configured to transmit the same periodic signal. The conductive patterns 176M2 and 176M4 are configured to transmit the periodic signal clkbb. The conductive patterns 176M1, 176M2, 176M3, and 176M4 can each be referred to as a clock path.

The layout 176 further includes tracks PW1, PW2, and PW3 extending along the x-axis. Conductive patterns that are configured to be coupled to a power source are located along the tracks PW1, PW2, and PW3. The conductive patterns disposed along the tracks PW1, PW2, and PW3 can each be referred to as a power rail.

The transmission circuit TG1 includes two transistors of different types. The transmission circuit TG1 is located within the regions N2 and P2. One of the transistors is located within the region N2, and the other within the region P2.

The transmission circuit TG2 includes two transistors of different types. The transmission circuit TG2 is located within the regions N1 and P1. One of the transistors is located within the region N1, and the other within the region P1.

The transmission circuit TG3 includes two transistors of different types. The transmission circuit TG3 is located within the regions N1 and P1. One of the transistors is located within the region N1, and the other within the region P1.

The transmission circuit TG4 includes two transistors of different types. The transmission circuit TG4 is located within the regions N2 and P2. One of the transistors is located within the region N2, and the other within the region P2.

The transmission circuits TG1 and TG2 that belong to the master switching circuit 104 are disposed in different rows of the layout 176. That is, the transmission circuit TG1 is disposed within the regions N2 and P2, while the transmission circuit TG2 is disposed within the regions N1 and P1.

The transmission circuits TG3 and TG4 that belong to the slave switching circuit 106 are disposed in different rows of the layout 176. That is, the transmission circuit TG3 is disposed within the regions N1 and P1, while the transmission circuit TG4 is disposed within the regions N2 and P2.

The transmission circuit TG1 is electrically connected to the conductive patterns 176M3 and 176M4. The transmission circuit TG1 is configured to receive the periodic signal clkb from the conductive pattern 176M3. The transmission circuit TG1 is configured to receive the periodic signal clkbb from the conductive pattern 176M4.

The transmission circuit TG2 is electrically connected to the conductive patterns 176M1 and 176M2. The transmission circuit TG2 is configured to receive the periodic signal clkb from the conductive pattern 176M1. The transmission circuit TG2 is configured to receive the periodic signal clkbb from the conductive pattern 176M2.

The transmission circuit TG3 is electrically connected to the conductive patterns 176M1 and 176M2. The transmission circuit TG3 is configured to receive the periodic signal clkb from the conductive pattern 176M1. The transmission circuit TG3 is configured to receive the periodic signal clkbb from the conductive pattern 176M2.

The transmission circuit TG4 is electrically connected to the conductive patterns 176M3 and 176M4. The transmission circuit TG4 is configured to receive the periodic signal clkb from the conductive pattern 176M3. The transmission circuit TG4 is configured to receive the periodic signal clkbb from the conductive pattern 176M4.

The layout 176 further includes gate conductors 176P1 and 176P2. The gate conductors 176P1 and 176P2 are substantially perpendicular to the conductive patterns 176M1, 176M2, 176M3, and 176M4.

The transmission circuit TG1 is configured to transmit the feedforward signal mx_ax to the transmission circuit TG3, through a horizontal conductive pattern and the gate conductor 176P2. The transmission circuit TG3 is configured to transmit the feedback signal ml_b to the transmission circuit TG2, through a horizontal conductive pattern and the gate conductor 176P1.

The horizontal conductive pattern for transmitting the feedforward signal mx_ax is not depicted in FIG. 2I for the sake of simplicity. The horizontal conductive pattern for transmitting the feedback signal ml_b is not depicted in FIG. 2I for the sake of simplicity.

Compared to other approaches, by utilizing the gate conductors 176P1 and 176P2 for transmitting signals mx_ax and ml_b, fewer conductive patterns extending along the x-axis (i.e., horizontal direction) can be used. Fewer horizontal conductive patterns used can facilitate feasible space therebetween. Feasible space between the horizontal conductive patterns can reduce the Miller capacitances therebetween. Feasible space between the horizontal conductive patterns can reduce the interference therebetween, especially when different signals are transmitted on adjacent conductive patterns. Feasible space between the horizontal conductive patterns can reduce the power consumption of the semiconductor device manufactured in accordance with the layout 176. Simulated results show an overall 7% to 11% power reduction by utilizing the arrangement of layout 176, compared to existing layout techniques.

The transmission circuit TG2 is spaced apart from the transmission circuit TG3 by a distance D1. The distance D1 equals or exceeds 2*CPP. The transmission circuit TG1 is spaced apart from the transmission circuit TG2 along a horizontal axis, by a distance D2 (not shown). In some embodiments, the distance D2 is 0*CPP. In some embodiments, the distance D2 is greater than 0*CPP. The transmission circuit TG4 is spaced apart from the transmission circuit TG3 along a horizontal axis, by a distance D3 (not shown). In some embodiments, the distance D3 is 0*CPP. In some embodiments, the distance D3 is greater than 0*CPP.

Figure 2J:
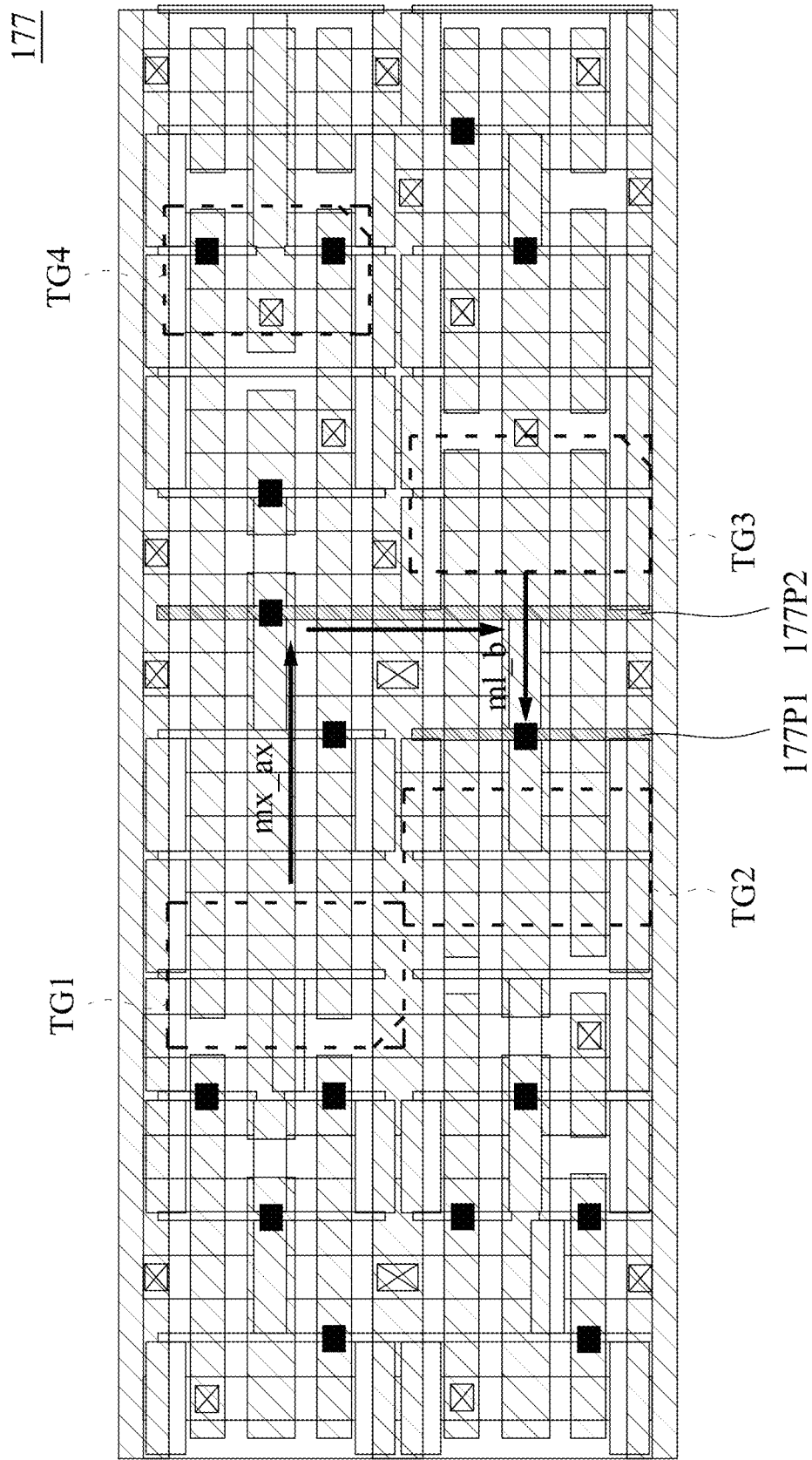
FIG. 2J is a top view of a semiconductor layout, in accordance with some embodiments of the present disclosure.

FIG. 2J is a top view of a semiconductor layout, in accordance with some embodiments of the present disclosure.

FIG. 2J shows a layout 177. The layout 177 corresponds to the layout 176 of FIG. 2I, the difference lies in that the layout 177 includes further details. For example, the layout 177 includes a plurality of gate conductors extending along the y-axis (e.g., gate conductors 177P1 and 177P2), a plurality of conductive patterns extending along the y-axis, and a plurality of conductive patterns extending along the x-axis. The layout 177 further includes a plurality of conductive vias for connecting intersected conductive patterns. The layout 177 further includes a plurality of conductive vias for connecting conductive patterns intersected with gate conductors.

The transmission circuits TG1, TG2, TG3 and TG4 of the layout 177 are disposed at positions similar to those shown in FIG. 2I. In operation the gate conductor 177P1 is utilized to transmit the feedback signal ml_b, and the gate conductor 177P2 is utilized to transmit the feedforward signal mx_ax.

Figure 2K:
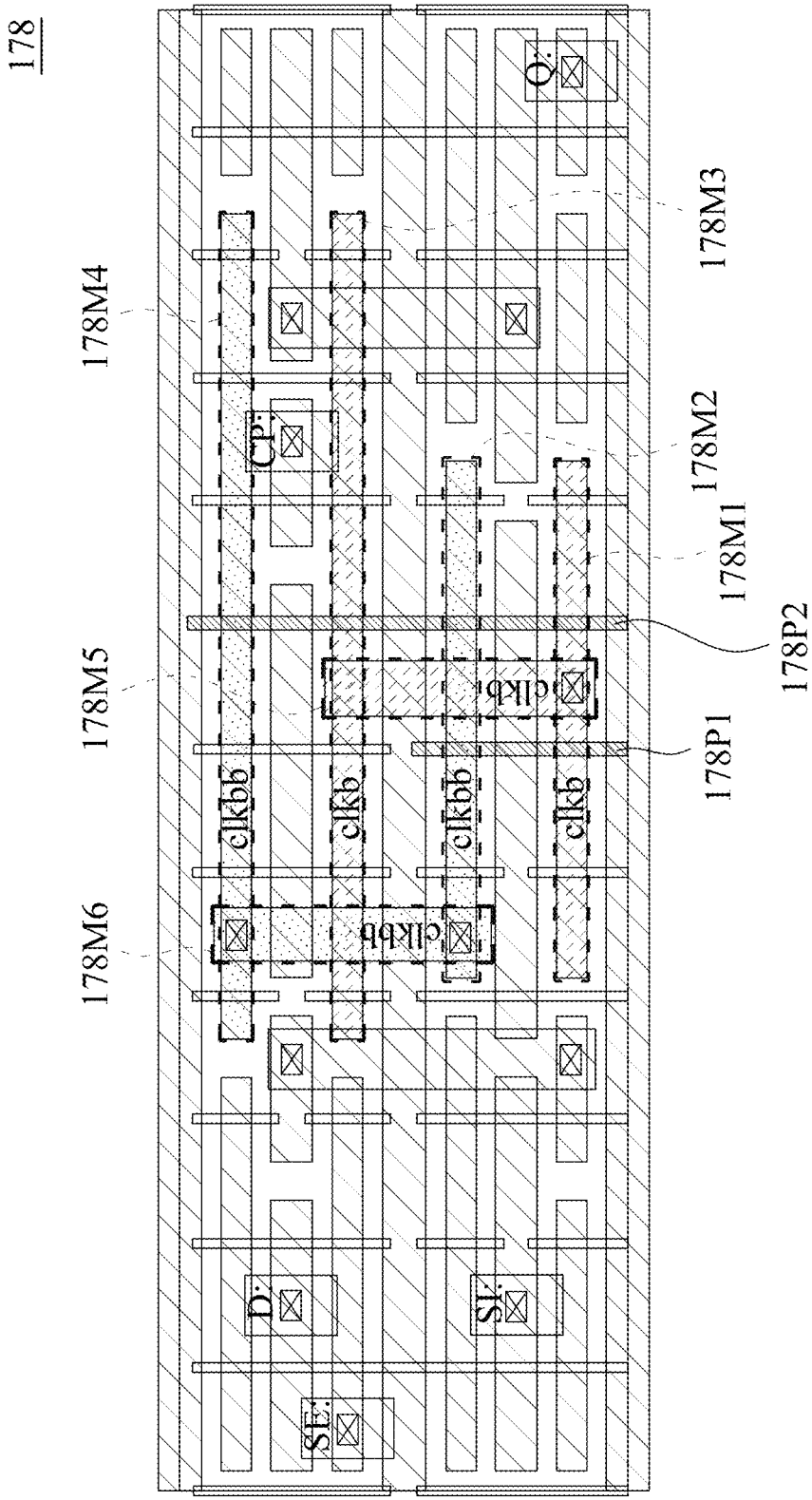
FIG. 2K is a top view of a semiconductor layout, in accordance with some embodiments of the present disclosure.

FIG. 2K is a top view of a semiconductor layout, in accordance with some embodiments of the present disclosure.

FIG. 2K shows a layout 178. The layout 178 corresponds to the layout 176 of FIG. 2I and the layout 177 of FIG. 2J, the difference lies in that the layout 178 clearly shows the conductive patterns used for transmitting periodic signals, while some other details are omitted for the purpose of simplicity. The layout 177 of FIG. 2J and the layout 178 of FIG. 2K can correspond to structures of different layers of an identical flip-flop device.

The layout 178 includes conductive patterns 178M1, 178M2, 178M3 and 178M4 that extend along the x-axis, and conductive patterns 178M5 and 178M6 that extend along the y-axis. The layout further includes gate conductors 178P1 and 178P2 extending along the y-axis. In operation, periodic signal clkb is transmitted on the conductive patterns 178M1, 178M3, and 178M5. Periodic signal clkbb is transmitted on the conductive patterns 178M2, 178M4, and 178M6.

Referring to FIG. 2K, by utilizing the techniques disclosed in the present disclosure, the number of horizontal clock paths (i.e., the conductive patterns 178M1, 178M2, 178M3, and 178M4) is four or fewer, and the number of vertical clock paths (i.e., the conductive patterns 178M5 and 178M6) is two or fewer.

Compared to other approaches, fewer horizontal clock paths in use can facilitate reduction of the power consumption of the semiconductor device manufactured in accordance with the layout 178. Fewer vertical clock paths in use can facilitate reduction of the power consumption of the semiconductor device manufactured in accordance with the layout 178.

Figure 2L:
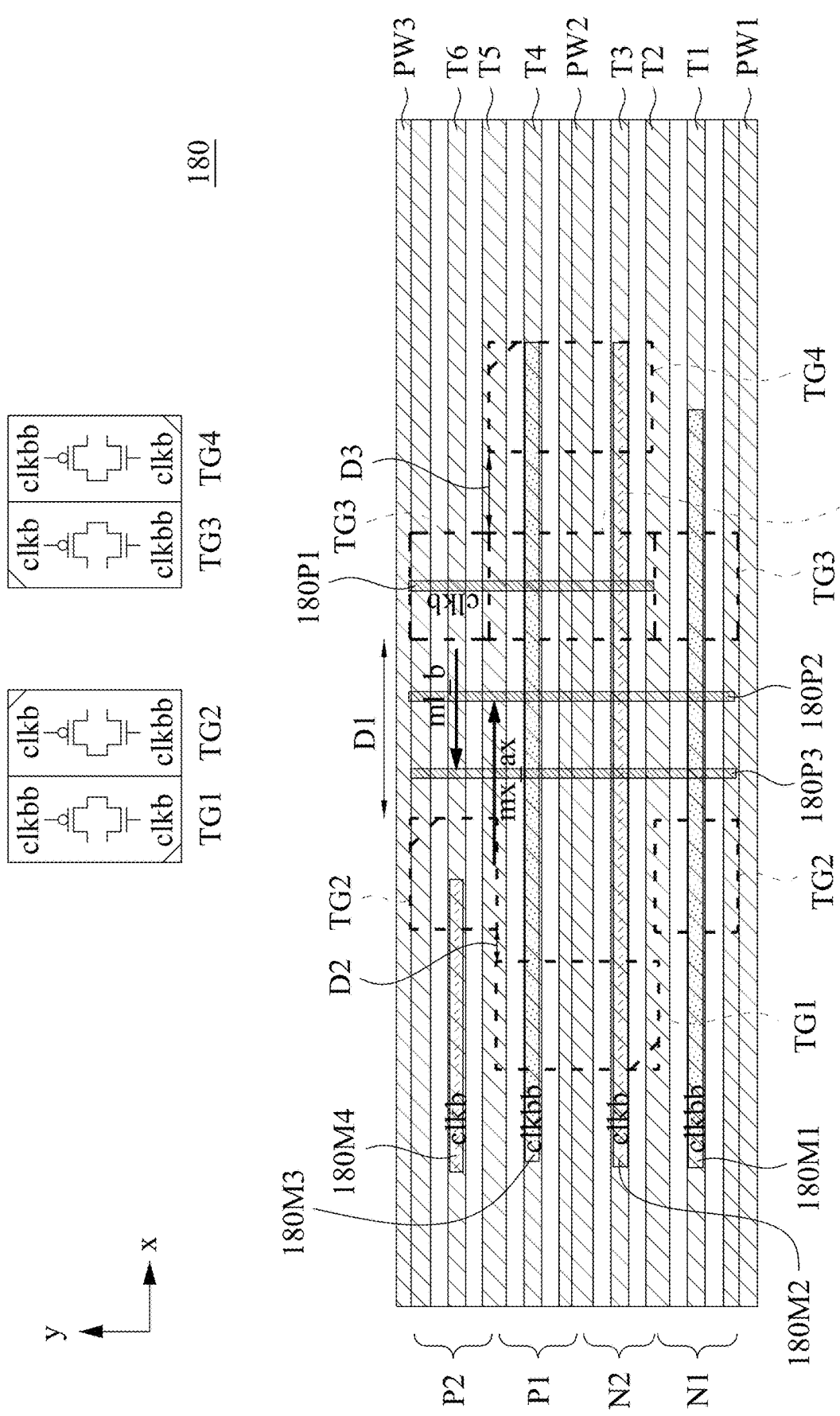
FIG. 2L is a top view of a semiconductor layout, in accordance with some embodiments of the present disclosure.

FIG. 2L is a top view of a semiconductor layout, in accordance with some embodiments of the present disclosure.

FIG. 2L shows a layout 180. The layout 180 can correspond to an electrical device. The layout 180 can correspond to a semiconductor device. The layout 180 can correspond to the semiconductor device 100 of FIG. 1. The layout 180 is shown in a simplified layout diagram, with some of the components/patterns omitted, for simplicity.

The layout 180 includes regions N1, N2, P1 and P2. Transistors of a first type are disposed within the regions N1 and N2, and transistors of a second type different from the first type are disposed within the regions P1 and P2. In some embodiments, transistors of N-type are disposed within the regions N1 and N2. In some embodiments, transistors of P-type are disposed within the regions P1 and P2.

The layout 180 can be referred to as a layout with a region of "double height." The layout 180 is designed using a "double height" scheme. The regions N1 and N2 constitute regions of "single height." The regions P1 and P2 constitute regions of "single height." The regions N1 and N2 can be referred to as a "row" in the present disclosure, and the regions P1 and P2 can also be referred to as a "row" in the present disclosure.

The layout 180 includes tracks T1, T2, T3, T4, T5, and T6 extending along the x-axis, in which conductive patterns can be located. The conductive pattern 180M1 is located along the track T1. The conductive pattern 180M2 is located along the track T3. The conductive pattern 180M3 is located along the track T4. The conductive pattern 180M4 is located along the track T6.

The conductive patterns 180M1 and 180M3 are configured to transmit the same periodic signal. The conductive patterns 180M1 and 180M3 are configured to transmit the periodic signal clkbb. The conductive patterns 180M2 and 180M4 are configured to transmit the same periodic signal. The conductive patterns 180M2 and 180M4 are configured to transmit the periodic signal clkb. The conductive patterns 180M1, 180M2, 180M3, and 180M4 can each be referred to as a clock path.

The layout 180 further includes tracks PW1, PW2, and PW3 extending along the x-axis. Conductive patterns that are configured to be coupled to a power source are located along the tracks PW1, PW2, and PW3. The conductive patterns disposed along the tracks PW1, PW2, and PW3 can each be referred to as a power rail.

The transmission circuit TG1 includes two transistors of different types. The transmission circuit TG1 is located within the regions N2 and P1. One of the transistors is located within the region N2, and the other within the region P1.

A first portion of the transmission circuit TG2 is located within the region N1, and a second portion of the transmission circuit TG2 is located within the region P2. The transmission circuit TG2 includes two transistors of different types. One of the transistors is located within the region N1, and the other within the region P2.

A first portion of the transmission circuit TG3 is located within the region N1, and a second portion of the transmission circuit TG3 is located within the region P2. The transmission circuit TG3 includes two transistors of different types. One of the transistors is located within the region N1, and the other within the region P2.

The transmission circuit TG4 includes two transistors of different types. The transmission circuit TG4 is located within the regions N2 and P1. One of the transistors is located within the region N2, and the other within the region P1.

The phase shift circuit 114 includes two transistors of different types. The phase shift circuit 114 is located within the regions N2 and P1. One of the transistors is located within the region N2, and the other within the region P1.

The transmission circuit TG1 is electrically connected to the conductive patterns 180M2 and 180M3. The transmission circuit TG1 is configured to receive the periodic signal clkb from the conductive pattern 180M2. The transmission circuit TG1 is configured to receive the periodic signal clkbb from the conductive pattern 180M3.

The transmission circuit TG2 is electrically connected to the conductive patterns 180M1 and 180M4. The transmission circuit TG2 is configured to receive the periodic signal clkbb from the conductive pattern 180M1. The transmission circuit TG2 is configured to receive the periodic signal clkb from the conductive pattern 180M4.

The phase shift circuit 114 is electrically connected to the conductive patterns 180M2 and 180M3. The phase shift circuit 114 is configured to receive the periodic signal clkb from the conductive pattern 180M2. The phase shift circuit 114 is configured to receive the periodic signal clkbb from the conductive pattern 180M3. The phase shift circuit 114 is electrically connected to a gate conductor 180P1. The phase shift circuit 114 is configured to receive the periodic signal clkb from the gate conductor 180P1.

The transmission circuit TG4 is electrically connected to the conductive patterns 180M2 and 180M3. The transmission circuit TG4 is configured to receive the periodic signal clkb from the conductive pattern 180M2. The transmission circuit TG4 is configured to receive the periodic signal clkbb from the conductive pattern 180M3.

The transmission circuit TG3 is electrically connected to the conductive patterns 180M1 and 180M2. The transmission circuit TG3 is electrically connected to the conductive pattern 180M2 through a gate conductor 180P1. The gate conductor 180P1 extends along the y-axis, from the region N2 to the region P2. The gate conductor 180P1 is substantially perpendicular to the conductive patterns 180M1, 180M2, 180M3, and 180M4.

The transmission circuit TG3 is configured to receive the periodic signal clkbb from the conductive pattern 180M1. The transmission circuit TG3 is configured to receive the periodic signal clkb from the conductive pattern 180M2, through the gate conductor 180P1. The gate conductor 180P1 is shared by the phase shift circuit 114 and the transmission circuit TG3.

Compared to other approaches, by utilizing the gate conductor 180P1 to transmit the periodic signal clkb, fewer clock paths extending along the x-axis (i.e., horizontal direction) can be used. Fewer horizontal clock paths in use can facilitate feasible space therebetween. Referring to FIG. 2L, the conductive patterns 180M1, 180M2, 180M3, and 180M4 are respectively spaced apart from each other by a track. For example, the conductive pattern 180M1 is spaced apart from the conductive pattern 180M2 by the track T2. The conductive pattern 180M2 is spaced apart from the conductive pattern 180M3 by the track PW2. The conductive pattern 180M3 is spaced apart from the conductive pattern 180M4 by the track T5.

Compared to other approaches, feasible space between the horizontal clock paths can reduce the Miller capacitances therebetween. Feasible space between the horizontal clock paths can reduce the interference therebetween, especially when different clock signals are transmitted on adjacent clock paths. Feasible space between the horizontal clock paths can reduce the power consumption of the semiconductor device manufactured in accordance with the layout 180. Simulated results show an overall 7% to 11% power reduction by utilizing the arrangement of layout 180, compared to existing layout techniques.

The transmission circuit TG3 is configured to provide the feedback signal ml_b to the transmission circuit TG2, through conductive patterns extending along the x-axis and a gate conductor 180P3. The transmission circuit TG2 is configured to provide the feedforward signal mx_ax to the transmission circuit TG3, through conductive patterns extending along the x-axis and a gate conductor 180P2. The conductive patterns for transmitting the feedforward signal mx_ax and the feedback signal ml_b are not depicted in FIG. 2L for the sake of simplicity.

Compared to other approaches, by utilizing the gate conductors 180P2 and 180P3 for transmitting signals mx_ax and ml_b, fewer conductive patterns extending along the x-axis (i.e., horizontal direction) can be used. Fewer horizontal conductive patterns used can facilitate feasible space therebetween. Feasible space between the horizontal conductive patterns can reduce the Miller capacitances therebetween. Feasible space between the horizontal conductive patterns can reduce the interference therebetween, especially when different signals are transmitted on adjacent conductive patterns. Feasible space between the horizontal conductive patterns can reduce the power consumption of the semiconductor device manufactured in accordance with the layout 180. Simulated results show an overall 7% to 11% power reduction by utilizing the arrangement of layout 180, compared to existing layout techniques.

The transmission circuit TG2 is spaced apart from the transmission circuit TG3 by a distance D1. The distance D1 equals or exceeds 2*CPP. The transmission circuit TG1 is spaced apart from the transmission circuit TG2 along a horizontal axis, by a distance D2. In some embodiments, the distance D2 is 0*CPP. In some embodiments, the distance D2 is greater than 0*CPP. The transmission circuit TG4 is spaced apart from the transmission circuit TG3 along a horizontal axis, by a distance D3. In some embodiments, the distance D3 is 0*CPP. In some embodiments, the distance D3 is greater than 0*CPP.

Figure 2M:
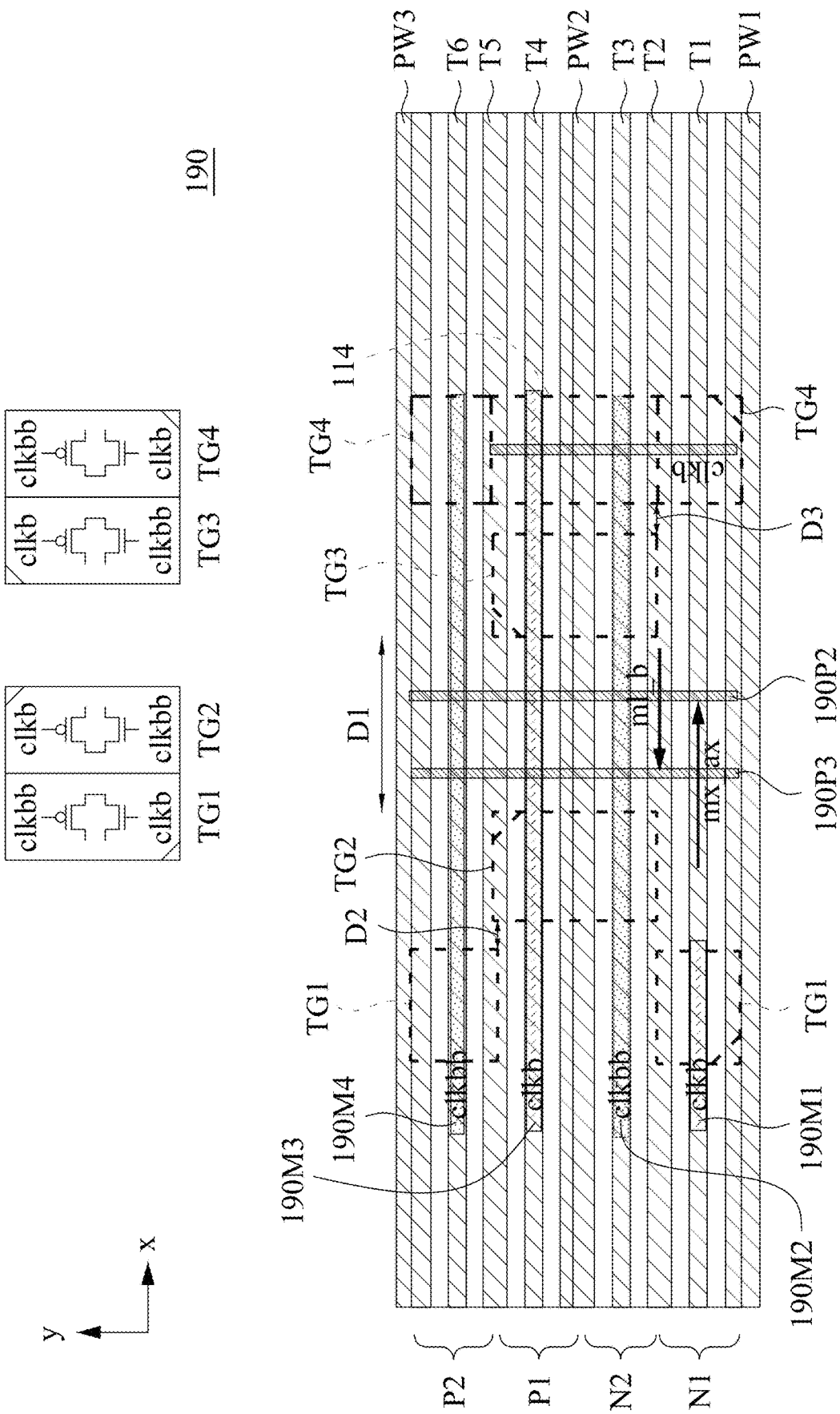
FIG. 2M is a top view of a semiconductor layout, in accordance with some embodiments of the present disclosure.

FIG. 2M is a top view of a semiconductor layout, in accordance with some embodiments of the present disclosure.

FIG. 2M shows a layout 190. The layout 190 can correspond to an electrical device. The layout 190 can correspond to a semiconductor device. The layout 190 can correspond to the semiconductor device 100 of FIG. 1. The layout 190 is shown in a simplified layout diagram, with some of the components/patterns omitted, for simplicity.

The layout 190 includes regions N1, N2, P1 and P2. Transistors of a first type are disposed within the regions N1 and N2, and transistors of a second type different from the first type are disposed within the regions P1 and P2. In some embodiments, transistors of N-type are disposed within the regions N1 and N2. In some embodiments, transistors of P-type are disposed within the regions P1 and P2.

The layout 190 can be referred to as a layout with a region of "double height." The layout 190 is designed using a "double height" scheme. The regions N1 and N2 constitute regions of "single height." The regions P1 and P2 constitute regions of "single height." The regions N1 and N2 can be referred to as a "row" in the present disclosure, and the regions P1 and P2 can also be referred to as a "row" in the present disclosure.

The layout 190 includes tracks T1, T2, T3, T4, T5, and T6 extending along the x-axis, in which conductive patterns can be located. The conductive pattern 190M1 is located along the track T1. The conductive pattern 190M2 is located along the track T3. The conductive pattern 190M3 is located along the track T4. The conductive pattern 190M4 is located along the track T6.

The conductive patterns 190M1 and 190M3 are configured to transmit the same periodic signal. The conductive patterns 190M1 and 190M3 are configured to transmit the periodic signal clkb. The conductive patterns 190M2 and 190M4 are configured to transmit the same periodic signal. The conductive patterns 190M2 and 190M4 are configured to transmit the periodic signal clkbb. The conductive patterns 190M1, 190M2, 190M3, and 190M4 can each be referred to as a clock path.

The layout 190 further includes tracks PW1, PW2, and PW3 extending along the x-axis. Conductive patterns that are configured to be coupled to a power source are located along the tracks PW1, PW2, and PW3. The conductive patterns disposed along the tracks PW1, PW2, and PW3 can each be referred to as a power rail.

A first portion of the transmission circuit TG1 is located within the region N1, and a second portion of the transmission circuit TG1 is located within the region P2. The transmission circuit TG1 includes two transistors of different types. One of the transistors is located within the region N1, and the other within the region P2.

The transmission circuit TG2 includes two transistors of different types. The transmission circuit TG2 is located within the regions N2 and P1. One of the transistors is located within the region N2, and the other within the region P1.

The transmission circuit TG3 includes two transistors of different types. The transmission circuit TG3 is located within the regions N2 and P1. One of the transistors is located within the region N2, and the other within the region P1.

A first portion of the transmission circuit TG4 is located within the region N1, and a second portion of the transmission circuit TG4 is located within the region P2. The transmission circuit TG4 includes two transistors of different types. One of the transistors is located within the region N1, and the other within the region P2.

The phase shift circuit 114 includes two transistors of different types. The phase shift circuit 114 is located within the regions N2 and P1. One of the transistors is located within the region N2, and the other within the region P1.

The transmission circuit TG1 is electrically connected to the conductive patterns 190M2 and 190M4. The transmission circuit TG1 is configured to receive the periodic signal clkb from the conductive pattern 190M1. The transmission circuit TG1 is configured to receive the periodic signal clkbb from the conductive pattern 190M4.

The transmission circuit TG2 is electrically connected to the conductive patterns 190M2 and 190M3. The transmission circuit TG2 is configured to receive the periodic signal clkbb from the conductive pattern 190M2. The transmission circuit TG2 is configured to receive the periodic signal clkb from the conductive pattern 190M3.

The transmission circuit TG3 is electrically connected to the conductive patterns 190M2 and 190M3. The transmission circuit TG3 is configured to receive the periodic signal clkbb from the conductive pattern 190M2. The transmission circuit TG3 is configured to receive the periodic signal clkb from the conductive pattern 190M3.

The phase shift circuit 114 is electrically connected to the conductive patterns 190M2 and 190M3. The phase shift circuit 114 is configured to receive the periodic signal clkbb from the conductive pattern 190M2. The phase shift circuit 114 is configured to receive the periodic signal clkb from the conductive pattern 190M3. The phase shift circuit 114 is electrically connected to a gate conductor 190P1. The phase shift circuit 114 is configured to receive the periodic signal clkb from the gate conductor 190P1.

The transmission circuit TG4 is electrically connected to the conductive patterns 190M3 and 190M4. The transmission circuit TG4 is electrically connected to the conductive pattern 190M3 through a gate conductor 190P1. The gate conductor 190P1 extends along the y-axis, from the region N1 to the region P1. The gate conductor 190P1 is substantially perpendicular to the conductive patterns 190M1, 190M2, 190M3, and 190M4.

The transmission circuit TG4 is configured to receive the periodic signal clkbb from the conductive pattern 190M4. The transmission circuit TG4 is configured to receive the periodic signal clkb from the conductive pattern 190M3, through the gate conductor 190P1. The gate conductor 190P1 is shared by the phase shift circuit 114 and the transmission circuit TG4.

Compared to other approaches, by utilizing the gate conductor 190P1 for transmitting the periodic signal clkb, fewer clock paths extending along the x-axis (i.e., horizontal direction) can be used. Fewer horizontal clock paths in use can facilitate feasible space therebetween. Referring to FIG. 2M, the conductive patterns 190M1, 190M2, 190M3, and 190M4 are respectively spaced apart from each other by a track. For example, the conductive pattern 190M1 is spaced apart from the conductive pattern 190M2 by the track T2. The conductive pattern 190M2 is spaced apart from the conductive pattern 190M3 by the track PW2. The conductive pattern 190M3 is spaced apart from the conductive pattern 190M4 by the track T5.

Compared to other approaches, feasible space between the horizontal clock paths can reduce the Miller capacitances therebetween. Feasible space between the horizontal clock paths can reduce the interference therebetween, especially when different clock signals are transmitted on adjacent clock paths. Feasible space between the horizontal clock paths can reduce the power consumption of the semiconductor device manufactured in accordance with the layout 190. Simulated results show an overall 7% to 11% power reduction by utilizing the arrangement of layout 190, compared to existing layout techniques.

The transmission circuit TG3 is configured to provide the feedback signal ml_b to the transmission circuit TG2, through conductive patterns extending along the x-axis and a gate conductor 190P3. The transmission circuit TG2 is configured to provide the feedforward signal mx_ax to the transmission circuit TG3, through conductive patterns extending along the x-axis and a gate conductor 190P2. The conductive patterns for transmitting the feedforward signal mx_ax and the feedback signal ml_b are not depicted in FIG. 2M for the sake of simplicity.

Compared to other approaches, by utilizing the gate conductors 190P2 and 190P3 for transmitting signals mx_ax and ml_b, fewer conductive patterns extending along the x-axis (i.e., horizontal direction) can be used. Fewer horizontal conductive patterns used can facilitate feasible space therebetween. Feasible space between the horizontal conductive patterns can reduce the Miller capacitances therebetween. Feasible space between the horizontal conductive patterns can reduce the interference therebetween, especially when different signals are transmitted on adjacent conductive patterns. Feasible space between the horizontal conductive patterns can reduce the power consumption of the semiconductor device manufactured in accordance with the layout 190. Simulated results show an overall 7% to 11% power reduction by utilizing the arrangement of layout 190, compared to existing layout techniques.

The transmission circuit TG2 is spaced apart from the transmission circuit TG3 by a distance D1. The distance D1 equals or exceeds 2*CPP. The transmission circuit TG1 is spaced apart from the transmission circuit TG2 along a horizontal axis, by a distance D2. In some embodiments, the distance D2 is 0*CPP. In some embodiments, the distance D2 is greater than 0*CPP. The transmission circuit TG4 is spaced apart from the transmission circuit TG3 along a horizontal axis, by a distance D3. In some embodiments, the distance D3 is 0*CPP. In some embodiments, the distance D3 is greater than 0*CPP.

Figure 2N:
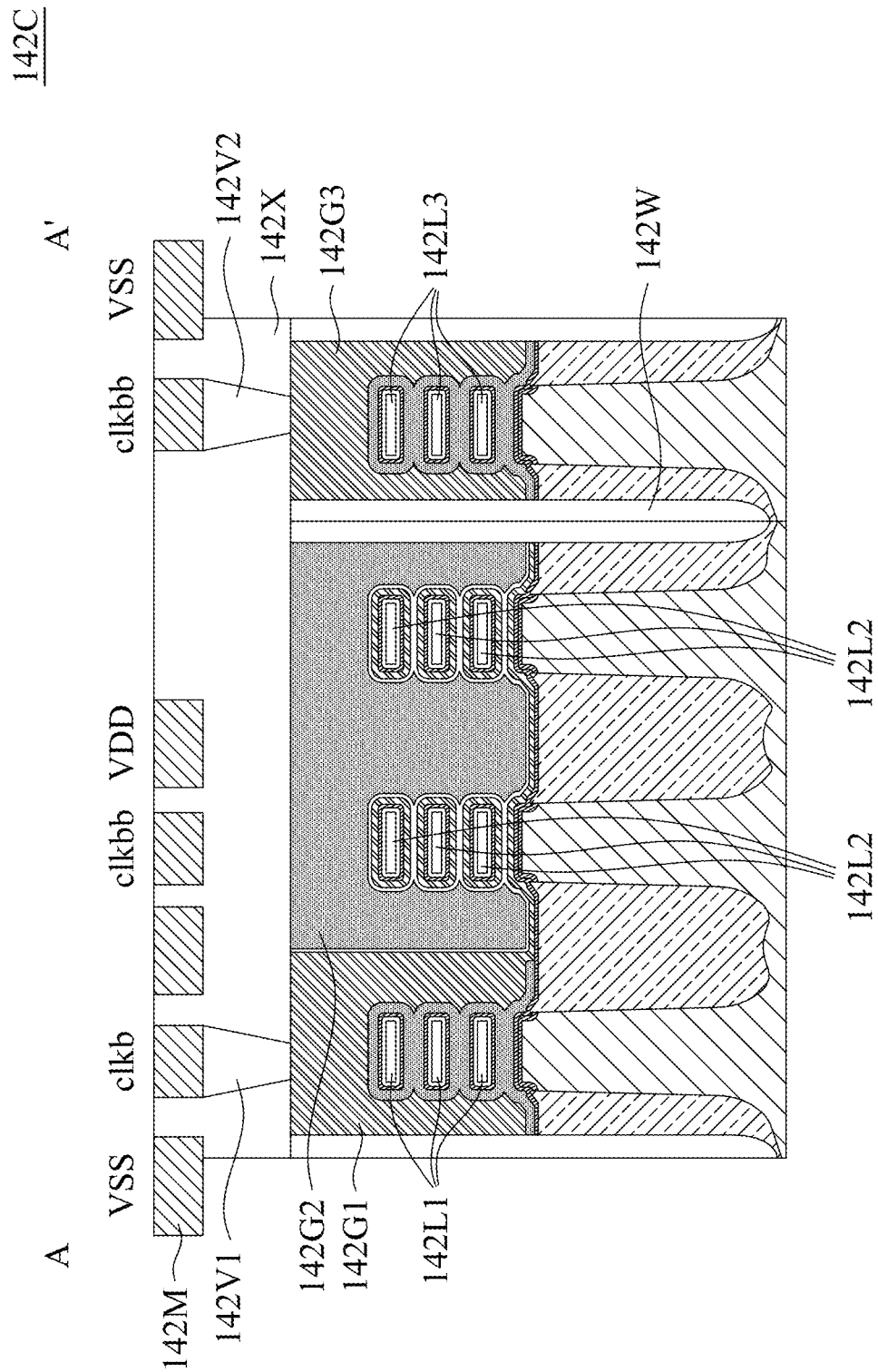
FIG. 2N is a cross-sectional view of a semiconductor layout, along the dashed line A-A' of FIG. 2B, in accordance with some embodiments of the present disclosure.

FIG. 2N is a cross-sectional view of a semiconductor layout, along the dashed line A-A' of FIG. 2B, in accordance with some embodiments of the present disclosure.

FIG. 2N shows a cross-sectional view 142C. The cross-sectional view 142C includes a conductive layer 142M, conductive vias 142V1 and 142V2, oxide layer 142X, gate portions 142G1, 142G2, and 142G3, and channel portions 142L1, 142L2, and 142L3. The cross-sectional view 142C further includes an isolation structure 142 W separating the gate portions 142G2 and 142G3. In the embodiment of FIG. 2N, transistors are implemented using a nanosheet structure. In other embodiments, transistors can be implemented using different techniques, such as planar FET or FinFET. The gate portions 142G1, 142G2, and 142G3 can include gate conductor materials previously discussed.

The conductive layer 142M includes a plurality of conductive paths. In the embodiment of FIG. 2N, the conductive layer 142M includes conductive paths on which signals VSS, clkb, clkbb or VDD can transmit. The conductive via 142V1 can electrically connect a portion of the conductive layer 142M to the gate portion 142G1. The conductive via 142V2 can electrically connect a portion of the conductive layer 142M to the gate portion 142G3. The periodic signal clkb can be transmitted from the conductive layer 142M to the gate portions 142G1 and 142G2, through the conductive via 142V1. The periodic signal clkbb can be transmitted from the conductive layer 142M to the gate portion 142G3, through the conductive via 142V2.

The channel portion 142L1 is surrounded by the gate portion 142G1. The channel portion 142L2 is surrounded by the gate portion 142G2. The channel portion 142L3 is surrounded by the gate portion 142G3.

Figure 2O:
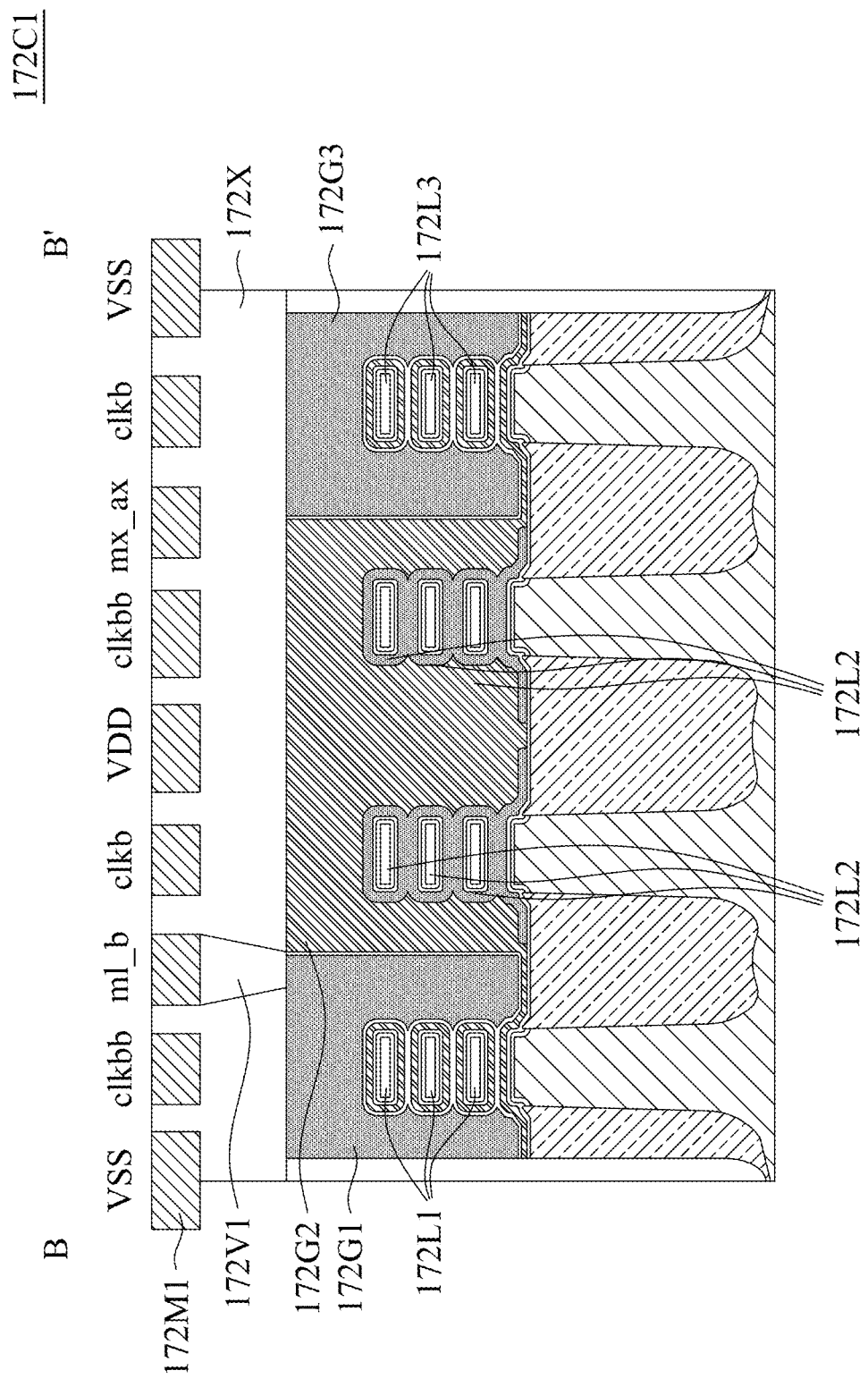
FIG. 2O is a cross-sectional view of a semiconductor layout, along the dashed line B-B' of FIG. 2G, in accordance with some embodiments of the present disclosure.

FIG. 2O is a cross-sectional view of a semiconductor layout, along the dashed line B-B' of FIG. 2G, in accordance with some embodiments of the present disclosure.

FIG. 2O shows a cross-sectional view 172C1. The cross-sectional view 172C1 includes a conductive layer 172M1, a conductive via 172V1, an oxide layer 172X, gate portions 172G1, 172G2, and 172G3, and channel portions 172L1, 172L2, and 172L3. In the embodiment of FIG. 2O, transistors are implemented using a nanosheet structure. In other embodiments, transistors can be implemented using different techniques, such as planar FET or FinFET. The gate portions 172G1, 172G2, and 172G3 can include gate conductor materials previously discussed.

The conductive layer 172M1 includes a plurality of conductive paths. In the embodiment of FIG. 2O, the conductive layer 172M1 includes conductive paths on which signals VSS, clkb, clkbb, ml_b, mx_ax, or VDD can transmit. The conductive via 172V1 can electrically connect a portion of the conductive layer 172M1 to the gate portion 172G1. The feedback signal ml_b can be transmitted from the conductive layer 172M1 to the gate portions 172G1, 172G2, and 172G3, through the conductive via 172V1.

The channel portion 172L1 is surrounded by the gate portion 172G1. The channel portion 172L2 is surrounded by the gate portion 172G2. The channel portion 172L3 is surrounded by the gate portion 172G3.

Figure 2P:
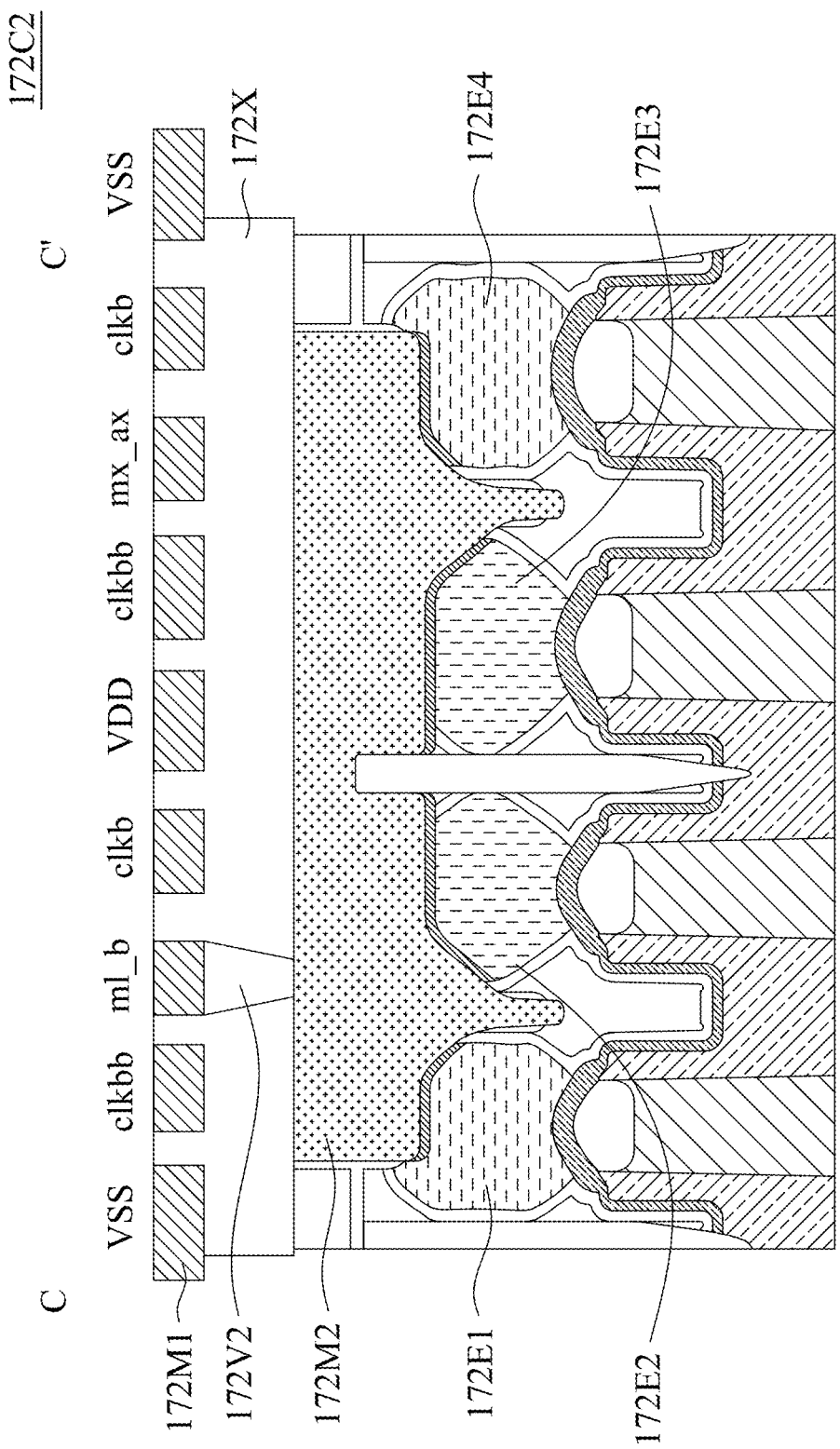
FIG. 2P is a cross-sectional view of a semiconductor layout, along the dashed line C-C' of FIG. 2G, in accordance with some embodiments of the present disclosure.

FIG. 2P is a cross-sectional view of a semiconductor layout, along the dashed line C-C' of FIG. 2G, in accordance with some embodiments of the present disclosure.

FIG. 2P shows a cross-sectional view 172C2. The cross-sectional view 172C2 includes a conductive layer 172M1, a conductive via 172V2, an oxide layer 172X, a conductive portion 172M2, and electrodes 172E1, 172E2, 172E3, and 172E4. In the embodiment of FIG. 2P, transistors are implemented using a nanosheet structure. In other embodiments, transistors can be implemented using different techniques, such as planar FET or FinFET.

The conductive layer 172M1 includes a plurality of conductive paths. In the embodiment of FIG. 2P, the conductive layer 172M1 includes conductive paths on which signals VSS, clkb, clkbb, ml_b, mx_ax, or VDD can transmit. The conductive via 172V2 can electrically connect a portion of the conductive layer 172M1 to the conductive portion 172M2. The feedback signal ml_b can be transmitted from the conductive layer 172M1 to the conductive portion 172M2, through the conductive via 172V2. The conductive portion 172M2 is electrically connected to the electrodes 172E1, 172E2, 172E3, and 172E4.

Figure 3:
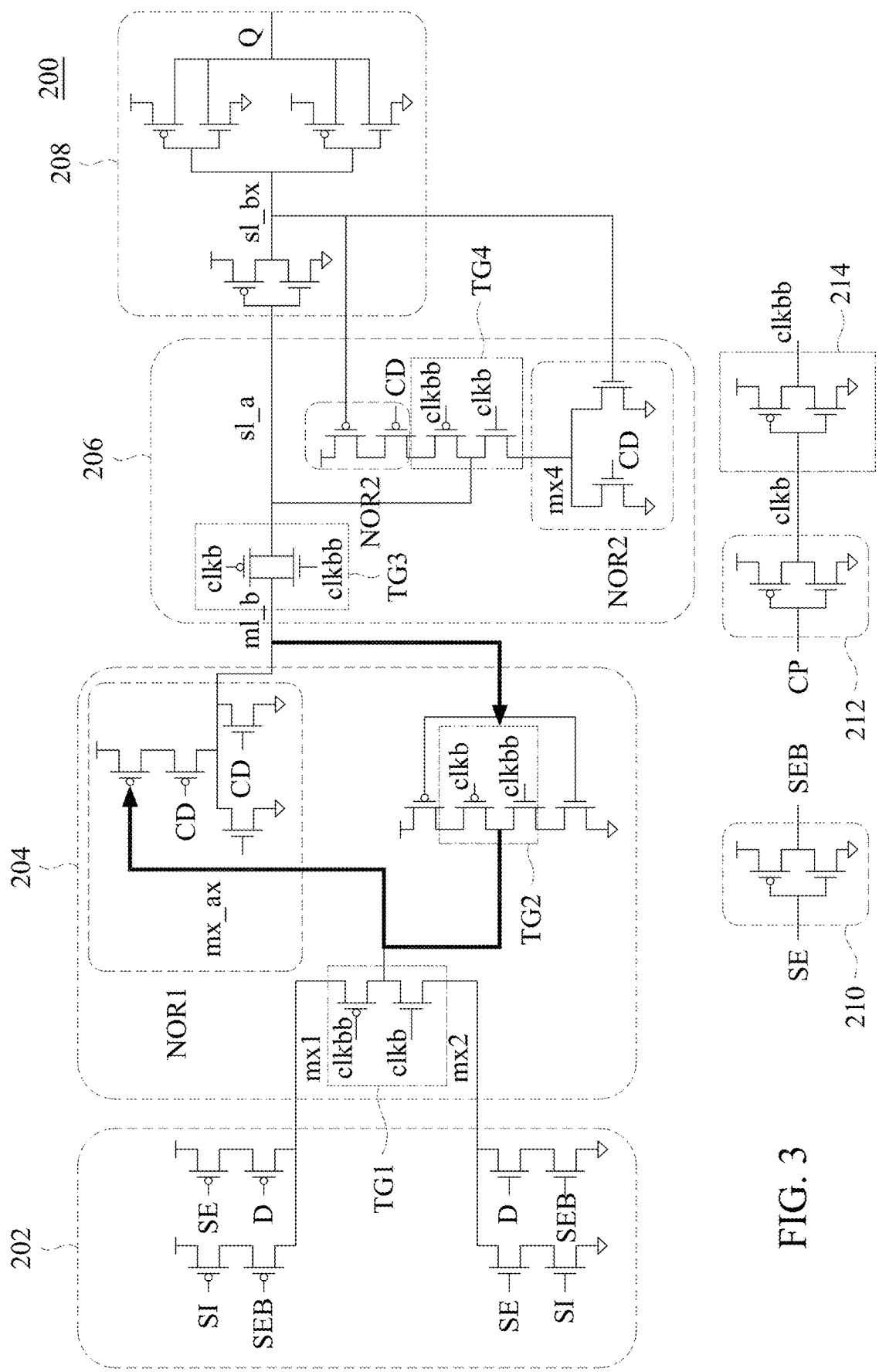
FIG. 3 is a schematic of a semiconductor device, in accordance with some embodiments of the present disclosure.

FIG. 3 is a schematic of a semiconductor device, in accordance with some embodiments of the present disclosure.

FIG. 3 shows a semiconductor device 200. The semiconductor device 200 can be a logic device. The semiconductor device 200 can be a system of integrated circuits (IC). The semiconductor device 200 can be a digital device. The semiconductor device 200 can be a state storage device. The semiconductor device 200 can be a flip-flop device. The semiconductor device 200 can be a flip-flop device with a "clear" function.

The semiconductor device 200 includes an input stage 202, a master switching circuit 204, a slave switching circuit 206, and an output stage 208. The semiconductor device 200 further includes phase shift circuits 210, 212, and 214.

The input stage 202 is a multiplexing device. The input stage 202 includes input terminals for receiving signals SE, SI, SEB and D. The input stage 202 is configured to select between the signal SI or the signal D based on the signal SE. In some embodiments, the input stage 202 is configured to select the signal SI if the signal SE has a logic high value (for example, "1"), and to select the signal D if the signal SE has a logic low value (for example, "0").

The master switching circuit 204 can also be referred to as a latching circuit. The master switching circuit 204 includes transmission circuits TG1 and TG2. The master switching circuit 204 further includes a logic device NOR1.

The transmission circuit TG1 is electrically connected to the input stage 202. The transmission circuit TG1 is configured to receive signals mx1 and mx2 from the input stage 202. The transmission circuit TG1 is configured to receive periodic signals clkb and clkbb. In operation, the transmission circuit TG1 is controlled by the periodic signals clkb and clkbb. The periodic signals clkb and clkbb can each be a clock signal.

The transmission circuit TG1 is electrically connected to the transmission circuit TG2. The transmission circuit TG1 is electrically connected to the logic device NOR1.

The transmission circuit TG2 is electrically connected to the slave switching circuit 206. The transmission circuit TG2 is electrically connected to the logic device NOR1. The transmission circuit TG2 is configured to receive a feedback signal ml_b from the slave switching circuit 206. The transmission circuit TG2 is configured to provide a feedforward signal mx_ax to the logic device NOR1. The transmission circuit TG2 is configured to receive periodic signals clkb and clkbb. In operation, the transmission circuit TG1 is controlled by the periodic signals clkb and clkbb.

The logic device NOR1 includes input terminals for receiving signals mx_ax and CD. In operation, once the signal CD having a logic high value (for example, "1") is provided to the logic device NOR1, an output signal Q having a logic high value (for example, "1") is provided by the output stage 208 of the semiconductor device 200.

The slave switching circuit 206 can also be referred to as a latching circuit. The slave switching circuit 206 includes transmission circuits TG3 and TG4. The slave switching circuit 206 further includes a logic device NOR2.

The transmission circuit TG3 is electrically connected to the transmission circuit TG2. The transmission circuit TG3 is electrically connected to the logic device NOR1. In operation, the feedback signal ml_b is transmitted from the transmission circuit TG3 to the transmission circuit TG2. The transmission circuit TG3 is electrically connected to the transmission circuit TG4. The transmission circuit TG3 is electrically connected to the output stage 208. The transmission circuit TG3 is configured to provide a feedforward signal sl_a to the output stage 208.

The transmission circuits TG3 and TG4 are configured to receive periodic signals clkb and clkbb. In operation, the transmission circuits TG3 and TG4 are controlled by the periodic signals clkb and clkbb.

The logic device NOR2 includes input terminals for receiving the signal CD. In operation, once the signal CD having a logic high value (for example, "1") is provided to the logic device NOR2, an output signal Q having a logic high value (for example, "1") is provided by the output stage 208 of the semiconductor device 200.

The output stage 208 is electrically connected to the slave switching circuit 206. The output stage 208 is configured to provide an output signal Q. The output stage 208 is configured to provide a feedback signal sl_bx to the slave switching circuit 206. The output stage 208 is configured to provide a feedback signal sl_bx to the logic device NOR2.

The phase shift circuit 210 is configured to receive the signal SE and, provide the signal SEB. A phase difference exists between the signals SE and SEB. A phase-shift quantity exists between the signals SE and SEB. In some embodiments, the phase shift circuit 210 is an inverter. In some embodiments, the signal SEB is an inverted version of the signal SE. If the signal SE is logic low, the signal SEB becomes logic high, and vice versa.

The phase shift circuit 212 is configured to receive the signal CP and, provide the signal clkb. The signal CP can be a periodic signal. The signal CP can be a clock pulse signal. A phase difference exists between the signals CP and clkb. A phase-shift quantity exists between the signals CP and clkb. In some embodiments, the phase shift circuit 212 is an inverter. In some embodiments, the signal clkb is an inverted version of the signal CP. If the signal CP is logic low, the signal clkb becomes logic high, and vice versa.

The phase shift circuit 214 is configured to receive the signal clkb and, provide the signal clkbb. A phase difference exists between the signals clkb and clkbb. A phase-shift quantity exists between the signals clkb and clkbb. In some embodiments, the phase shift circuit 214 is an inverter. In some embodiments, the signal clkbb is an inverted version of the signal clkb. If the signal clkb is logic low, the signal clkbb becomes logic high, and vice versa.

Figure 4:
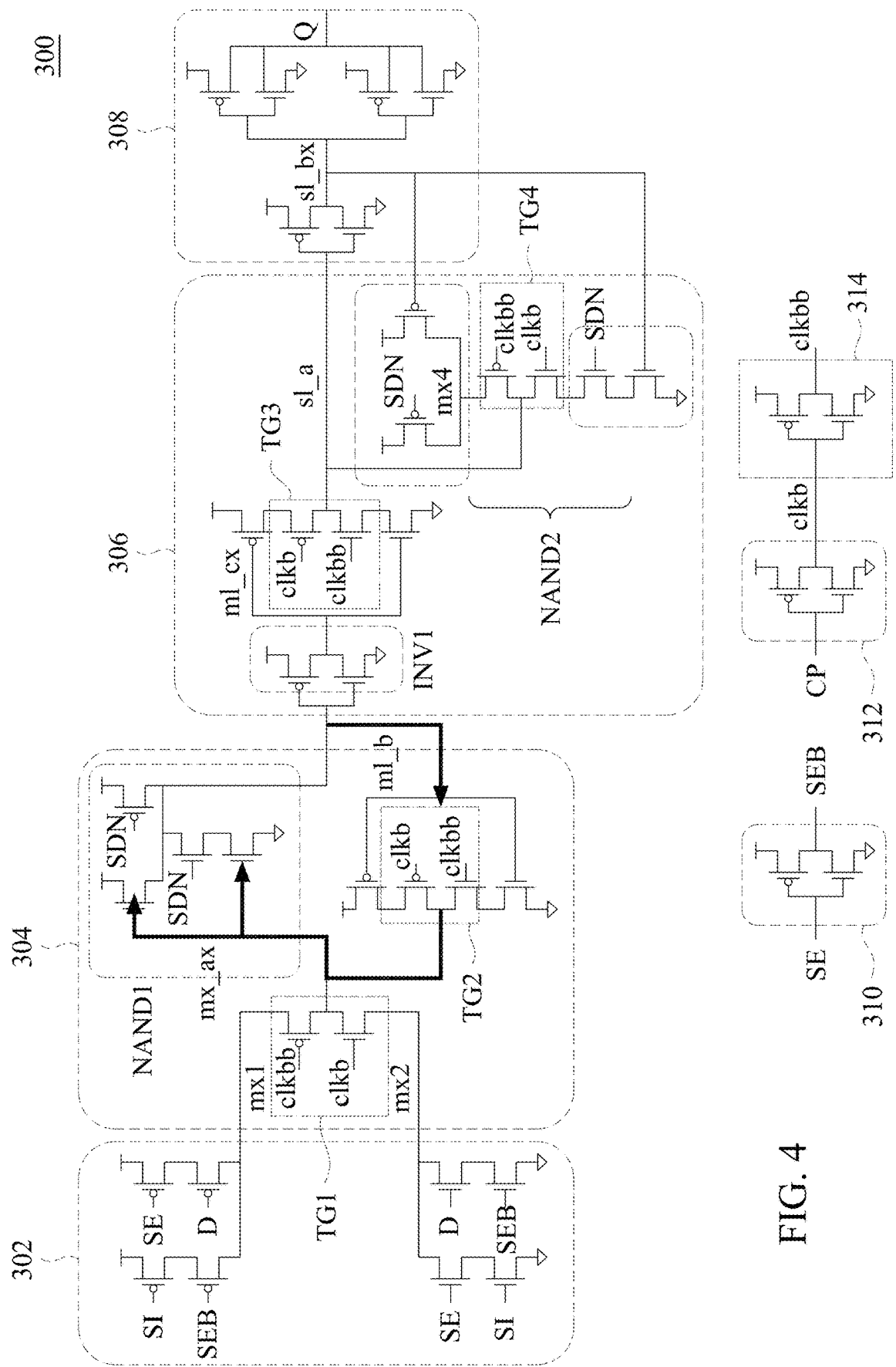
FIG. 4 is a schematic of a semiconductor device, in accordance with some embodiments of the present disclosure.

FIG. 4 is a schematic of a semiconductor device, in accordance with some embodiments of the present disclosure.

FIG. 4 shows a semiconductor device 300. The semiconductor device 300 can be a logic device. The semiconductor device 300 can be a system of integrated circuits (IC). The semiconductor device 300 can be a digital device. The semiconductor device 300 can be a state storage device. The semiconductor device 300 can be a flip-flop device. The semiconductor device 300 can be a flip-flop device with a "reset" function.

The semiconductor device 300 includes an input stage 302, a master switching circuit 304, a slave switching circuit 306, and an output stage 308. The semiconductor device 300 further includes phase shift circuits 310, 312, and 314.

The input stage 302 is a multiplexing device. The input stage 302 includes input terminals for receiving signals SE, SI, SEB and D. The input stage 302 is configured to select between the signal SI or the signal D based on the signal SE. In some embodiments, the input stage 302 is configured to select the signal SI if the signal SE has a logic high value (for example, "1"), and to select the signal D if the signal SE has a logic low value (for example, "0").

The master switching circuit 304 can also be referred to as a latching circuit. The master switching circuit 304 includes transmission circuits TG1 and TG2. The master switching circuit 304 further includes a logic device NAND1.

The transmission circuit TG1 is electrically connected to the input stage 302. The transmission circuit TG1 is configured to receive signals mx1 and mx2 from the input stage 302. The transmission circuit TG1 is configured to receive periodic signals clkb and clkbb. In operation, the transmission circuit TG1 is controlled by the periodic signals clkb and clkbb. The periodic signals clkb and clkbb can each be a clock signal.

The transmission circuit TG1 is electrically connected to the transmission circuit TG2. The transmission circuit TG1 is electrically connected to the logic device NAND1.

The transmission circuit TG2 is electrically connected to the slave switching circuit 306. The transmission circuit TG2 is electrically connected to the logic device NAND1. The transmission circuit TG2 is configured to receive a feedback signal ml_b from the slave switching circuit 306. The transmission circuit TG2 is configured to provide a feedforward signal mx_ax to the logic device NAND1. The transmission circuit TG2 is configured to receive periodic signals clkb and clkbb. In operation, the transmission circuit TG1 is controlled by the periodic signals clkb and clkbb.

The logic device NAND1 includes input terminals for receiving signals mx_ax and SDN. In operation, once the signal SDN having a logic high value (for example, "1") is provided to the logic device NAND1, an output signal Q having a logic low value (for example, "0") is provided by the output stage 308 of the semiconductor device 300.

The slave switching circuit 306 can also be referred to as a latching circuit. The slave switching circuit 306 includes transmission circuits TG3 and TG4. The slave switching circuit 306 further includes a logic device NAND2.

The transmission circuit TG3 is electrically connected to the transmission circuit TG2. In operation, the feedback signal ml_b is transmitted from the transmission circuit TG3, through a phase shift circuit INV1, to the transmission circuit TG2. The transmission circuit TG3 is electrically connected to the transmission circuit TG4. The transmission circuit TG3 is electrically connected to the output stage 308. The transmission circuit TG3 is configured to provide a feedforward signal sl_a to the output stage 308.

The transmission circuits TG3 and TG4 are configured to receive periodic signals clkb and clkbb. In operation, the transmission circuits TG3 and TG4 are controlled by the periodic signals clkb and clkbb.

The logic device NAND2 includes input terminals for receiving the signal SDN. In operation, once the signal SDN having a logic high value (for example, "1") is provided to the logic device NAND2, an output signal Q having a logic low value (for example, "0") is provided by the output stage 308 of the semiconductor device 300.

The output stage 308 is electrically connected to the slave switching circuit 306. The output stage 308 is configured to provide an output signal Q. The output stage 308 is configured to provide a feedback signal sl_bx to the slave switching circuit 306. The output stage 308 is configured to provide a feedback signal sl_bx to the logic device NAND2.

The phase shift circuit 310 is configured to receive the signal SE and, provide the signal SEB. A phase difference exists between the signals SE and SEB. A phase-shift quantity exists between the signals SE and SEB. In some embodiments, the phase shift circuit 310 is an inverter. In some embodiments, the signal SEB is an inverted version of the signal SE. If the signal SE is logic low, the signal SEB becomes logic high, and vice versa.

The phase shift circuit 312 is configured to receive the signal CP and, provide the signal clkb. The signal CP can be a periodic signal. The signal CP can be a clock pulse signal. A phase difference exists between the signals CP and clkb. A phase-shift quantity exists between the signals CP and clkb. In some embodiments, the phase shift circuit 312 is an inverter. In some embodiments, the signal clkb is an inverted version of the signal CP. If the signal CP is logic low, the signal clkb becomes logic high, and vice versa.

The phase shift circuit 314 is configured to receive the signal clkb and, provide the signal clkbb. A phase difference exists between the signals clkb and clkbb. A phase-shift quantity exists between the signals clkb and clkbb. In some embodiments, the phase shift circuit 314 is an inverter. In some embodiments, the signal clkbb is an inverted version of the signal clkb. If the signal clkb is logic low, the signal clkbb becomes logic high, and vice versa.

Figure 5A:
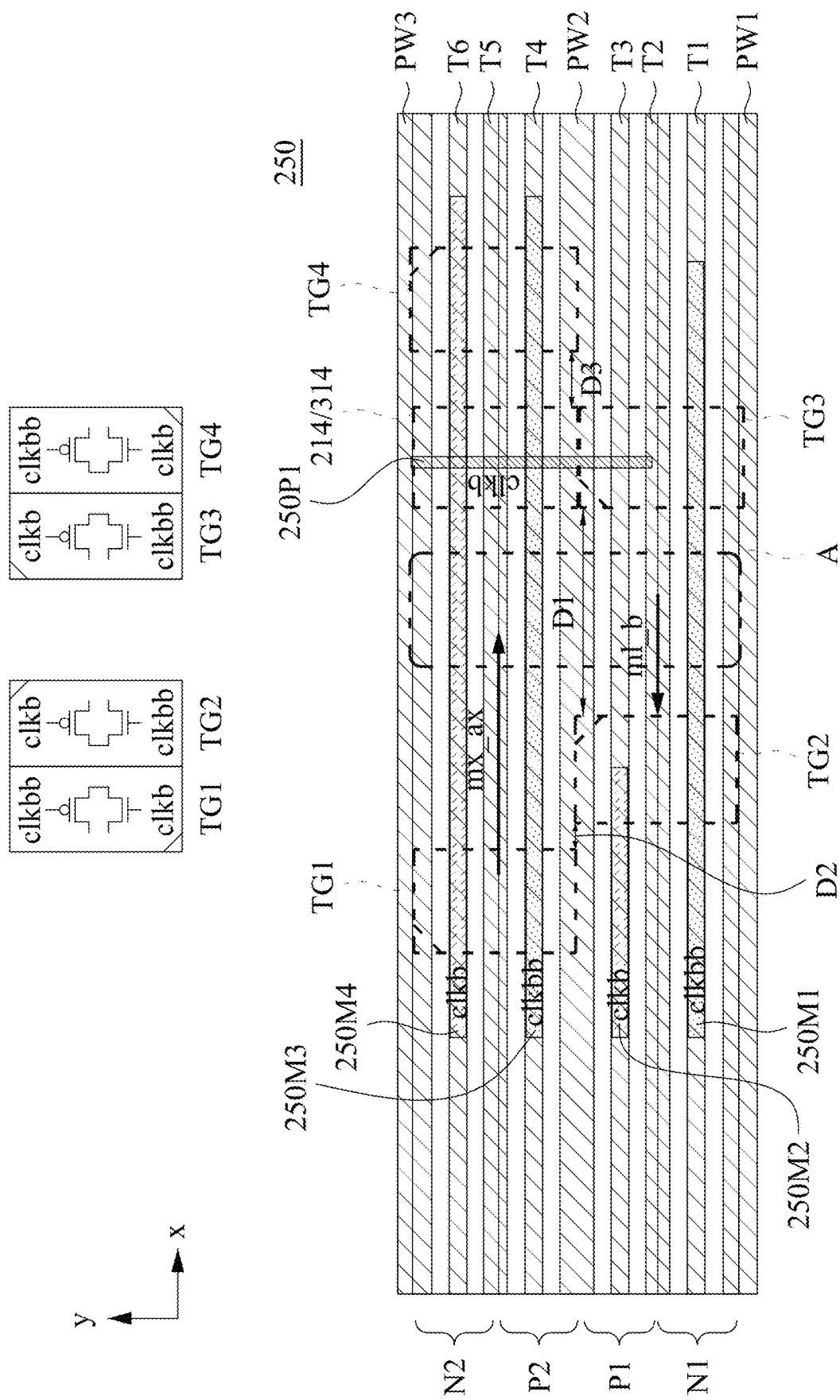
FIG. 5A is a top view of a semiconductor layout, in accordance with some embodiments of the present disclosure.

FIG. 5A is a top view of a semiconductor layout, in accordance with some embodiments of the present disclosure.

FIG. 5A shows a layout 250. The layout 250 can correspond to an electrical device. The layout 250 can correspond to a semiconductor device. The layout 250 can correspond to the semiconductor device 200 of FIG. 3 or the semiconductor device 300 of FIG. 4. The layout 250 is shown in a simplified layout diagram, with some of the components/patterns omitted, for simplicity.

The layout 250 includes regions N1, N2, P1 and P2. Transistors of a first type are disposed within the regions N1 and N2, and transistors of a second type different from the first type are disposed within the regions P1 and P2. In some embodiments, transistors of N-type are disposed within the regions N1 and N2. In some embodiments, transistors of P-type are disposed within the regions P1 and P2.

The layout 250 can be referred to as a layout with a region of "double height." The layout 250 is designed using a "double height" scheme. The regions N1 and P1 constitute regions of "single height." The regions N2 and P2 constitute regions of "single height." The regions N1 and P1 can be referred to as a "row" in the present disclosure, and the regions N2 and P2 can also be referred to as a "row" in the present disclosure.

The layout 250 includes tracks T1, T2, T3, T4, T5, and T6 extending along the x-axis, in which conductive patterns can be located. The conductive pattern 250M1 is located along the track T1. The conductive pattern 250M2 is located along the track T3. The conductive pattern 250M3 is located along the track T4. The conductive pattern 250M4 is located along the track T6.

The conductive patterns 250M1 and 250M3 are configured to transmit the same periodic signal. The conductive patterns 250M1 and 250M3 are configured to transmit the periodic signal clkbb. The conductive patterns 250M2 and 250M4 are configured to transmit the same periodic signal. The conductive patterns 250M2 and 250M4 are configured to transmit the periodic signal clkb. The conductive patterns 250M1, 250M2, 250M3, and 250M4 can each be referred to as a clock path.

The layout 250 further includes tracks PW1, PW2, and PW3 extending along the x-axis. Conductive patterns that are configured to be coupled to a power source are located along the tracks PW1, PW2, and PW3. The conductive patterns disposed along the tracks PW1, PW2, and PW3 can each be referred to as a power rail.

The transmission circuit TG1 includes two transistors of different types. The transmission circuit TG1 is located within the regions N2 and P2. One of the transistors is located within the region N2, and the other within the region P2.

The transmission circuit TG2 includes two transistors of different types. The transmission circuit TG2 is located within the regions N1 and P1. One of the transistors is located within the region N1, and the other within the region P1.

The transmission circuit TG3 includes two transistors of different types. The transmission circuit TG3 is located within the regions N1 and P1. One of the transistors is located within the region N1, and the other within the region P1.

The transmission circuit TG4 includes two transistors of different types. The transmission circuit TG4 is located within the regions N2 and P2. One of the transistors is located within the region N2, and the other within the region P2.

The phase shift circuit 214/314 includes two transistors of different types. The phase shift circuit 214/314 is located within the regions N2 and P2. One of the transistors is located within the region N2, and the other within the region P2.

The transmission circuits TG1 and TG2 that belong to the master switching circuit 204/304 are disposed in different rows of the layout 250. That is, the transmission circuit TG1 is disposed within the regions N2 and P2, while the transmission circuit TG2 is disposed within the regions N1 and P1.

The transmission circuits TG3 and TG4 that belong to the slave switching circuit 206/306 are disposed in different rows of the layout 250. That is, the transmission circuit TG3 is disposed within the regions N1 and P1, while the transmission circuit TG4 is disposed within the regions N2 and P2.

The transmission circuit TG1 is electrically connected to the conductive patterns 250M3 and 250M4. The transmission circuit TG1 is configured to receive the periodic signal clkbb from the conductive pattern 250M3. The transmission circuit TG1 is configured to receive the periodic signal clkb from the conductive pattern 250M4.

The transmission circuit TG2 is electrically connected to the conductive patterns 250M1 and 250M2. The transmission circuit TG2 is configured to receive the periodic signal clkbb from the conductive pattern 250M1. The transmission circuit TG2 is configured to receive the periodic signal clkb from the conductive pattern 250M2.

The phase shift circuit 214/314 is electrically connected to the conductive patterns 250M3 and 250M4. The phase shift circuit 214/314 is configured to receive the periodic signal clkbb from the conductive pattern 250M3. The phase shift circuit 214/314 is configured to receive the periodic signal clkb from the conductive pattern 250M4.

The transmission circuit TG4 is electrically connected to the conductive patterns 250M3 and 250M4. The transmission circuit TG4 is configured to receive the periodic signal clkbb from the conductive pattern 250M3. The transmission circuit TG4 is configured to receive the periodic signal clkb from the conductive pattern 250M4.

The transmission circuit TG3 is electrically connected to the conductive patterns 250M1 and 250M4. The transmission circuit TG3 is electrically connected to the conductive pattern 250M4 through a gate conductor 250P1. The gate conductor 250P1 extends along the y-axis, from the region N2 to the region P1. The gate conductor 250P1 is substantially perpendicular to the conductive patterns 250M1, 250M2, 250M3, and 250M4.

The transmission circuit TG3 is configured to receive the periodic signal clkbb from the conductive pattern 250M1. The transmission circuit TG3 is configured to receive the periodic signal clkb from the conductive pattern 250M4, through the gate conductor 250P1. The gate conductor 250P1 is shared by the phase shift circuit 214/314 and the transmission circuit TG3.

Compared to other approaches, by utilizing the gate conductor 250P1 for transmitting the periodic signal clkb, fewer clock paths extending along the x-axis (i.e., horizontal direction) can be used. Fewer horizontal clock paths in use can facilitate feasible space therebetween. Referring to FIG. 5A, the conductive patterns 250M1, 250M2, 250M3, and 250M4 are respectively spaced apart from each other by a track. For example, the conductive pattern 250M1 is spaced apart from the conductive pattern 250M2 by the track T2. The conductive pattern 250M2 is spaced apart from the conductive pattern 250M3 by the track PW2. The conductive pattern 250M3 is spaced apart from the conductive pattern 250M4 by the track T5.

Compared to other approaches, feasible space between the horizontal clock paths can reduce the Miller capacitances therebetween. Feasible space between the horizontal clock paths can reduce the interference therebetween, especially when different clock signals are transmitted on adjacent clock paths. Feasible space between the horizontal clock paths can reduce the power consumption of the semiconductor device manufactured in accordance with the layout 250. Simulated results show an overall 7% to 11% power reduction by utilizing the arrangement of layout 250, compared to existing layout techniques.

Logic device NOR1 of the semiconductor device 200, or the logic device NAND1 of the semiconductor device 300, is disposed between the transmission circuits TG2 and TG3. Logic device NOR1 of the semiconductor device 200, or the logic device NAND1 of the semiconductor device 300, is located within the dotted-rectangle A of the layout 250.

The transmission circuit TG2 is spaced apart from the transmission circuit TG3 by a distance D1. The distance D1 equals or exceeds 4*CPP. The transmission circuit TG1 is spaced apart from the transmission circuit TG2 along a horizontal axis, by a distance D2. In some embodiments, the distance D2 is 0*CPP. In some embodiments, the distance D2 is greater than 0*CPP. The transmission circuit TG4 is spaced apart from the transmission circuit TG3 along a horizontal axis, by a distance D3. In some embodiments, the distance D3 is 0*CPP. In some embodiments, the distance D3 is greater than 0*CPP.

The logic device NOR1 or NAND1 is configured to provide the feedback signal ml_b to the transmission circuit TG2, along conductive patterns extending along the x-axis. The transmission circuit TG1 is configured to provide the feedforward signal mx_ax to the logic device NOR1 or NAND1, along conductive patterns extending along the x-axis. The conductive patterns for transmitting the feedforward signal mx_ax and the feedback signal ml_b are not depicted in FIG. 5A for the sake of simplicity.

Figure 5B:
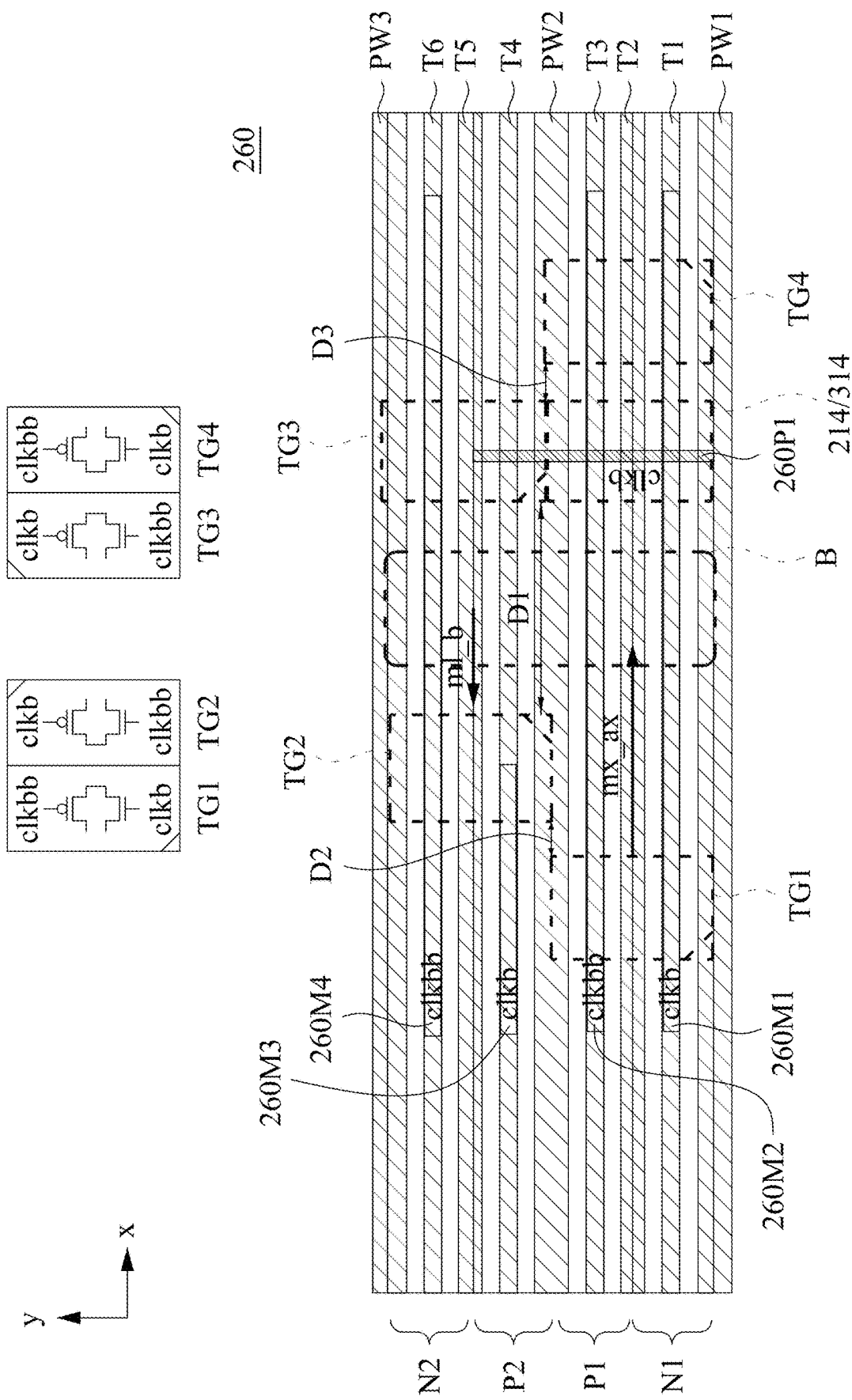
FIG. 5B is a top view of a semiconductor layout, in accordance with some embodiments of the present disclosure.

FIG. 5B is a top view of a semiconductor layout, in accordance with some embodiments of the present disclosure.

FIG. 5B shows a layout 260. The layout 260 can correspond to an electrical device. The layout 260 can correspond to a semiconductor device. The layout 260 can correspond to the semiconductor device 200 of FIG. 3 or the semiconductor device 300 of FIG. 4. The layout 260 is shown in a simplified layout diagram, with some of the components/patterns omitted, for simplicity.

The layout 260 includes regions N1, N2, P1 and P2. Transistors of a first type are disposed within the regions N1 and N2, and transistor of a second type different from the first type are disposed within the regions P1 and P2. In some embodiments, transistors of N-type are disposed within the regions N1 and N2. In some embodiments, transistors of P-type are disposed within the regions P1 and P2.

The layout 260 can be referred to as a layout with a region of "double height." The layout 260 is designed using a "double height" scheme. The regions N1 and P1 constitute regions of "single height." The regions N2 and P2 constitute regions of "single height." The regions N1 and P1 can be referred to as a "row" in the present disclosure, and the regions N2 and P2 can also be referred to as a "row" in the present disclosure.

The layout 260 includes tracks T1, T2, T3, T4, T5, and T6 extending along the x-axis, in which conductive patterns can be located. The conductive pattern 260M1 is located along the track T1. The conductive pattern 260M2 can be located along the track T3. The conductive pattern 260M3 is located along the track T4. The conductive pattern 260M4 is located along the track T6.

The conductive patterns 260M1 and 260M3 are configured to transmit the same periodic signal. The conductive patterns 260M1 and 260M3 are configured to transmit the periodic signal clkb. The conductive patterns 260M2 and 260M4 are configured to transmit the same periodic signal. The conductive patterns 260M2 and 260M4 are configured to transmit the periodic signal clkbb. The conductive patterns 260M1, 260M2, 260M3, and 260M4 can each be referred to as a clock path.

The layout 260 further includes tracks PW1, PW2, and PW3 extending along the x-axis. Conductive patterns that are configured to be coupled to a power source are located along the tracks PW1, PW2, and PW3. The conductive patterns disposed along the tracks PW1, PW2, and PW3 can each be referred to as a power rail.

The transmission circuit TG1 includes two transistors of different types. The transmission circuit TG1 is located within the regions N1 and P1. One of the transistors is located within the region N1, and the other within the region P1.

The transmission circuit TG2 includes two transistors of different types. The transmission circuit TG2 is located within the regions N2 and P2. One of the transistors is located within the region N2, and the other within the region P2.

The transmission circuit TG3 includes two transistors of different types. The transmission circuit TG3 is located within the regions N2 and P2. One of the transistors is located within the region N2, and the other within the region P2.

The transmission circuit TG4 includes two transistors of different types. The transmission circuit TG4 is located within the regions N1 and P1. One of the transistors is located within the region N1, and the other within the region P1.

The phase shift circuit 214/314 includes two transistors of different types. The phase shift circuit 214/314 is located within the regions N1 and P1. One of the transistors is located within the region N1, and the other within the region P1.

The transmission circuits TG1 and TG2 that belong to the master switching circuit 204/304 are disposed in different rows of the layout 260. That is, the transmission circuit TG1 is disposed within the regions N1 and P1, while the transmission circuit TG2 is disposed within the regions N2 and P2.

The transmission circuits TG3 and TG4 that belong to the slave switching circuit 206/306 are disposed in different rows of the layout 260. That is, the transmission circuit TG3 is disposed within the regions N2 and P2, while the transmission circuit TG4 is disposed within the regions N1 and P1.

The transmission circuit TG1 is electrically connected to the conductive patterns 260M1 and 260M2. The transmission circuit TG1 is configured to receive the periodic signal clkb from the conductive pattern 260M1. The transmission circuit TG1 is configured to receive the periodic signal clkbb from the conductive pattern 260M2.

The transmission circuit TG2 is electrically connected to the conductive patterns 260M3 and 260M4. The transmission circuit TG2 is configured to receive the periodic signal clkb from the conductive pattern 260M3. The transmission circuit TG2 is configured to receive the periodic signal clkbb from the conductive pattern 260M4.

The phase shift circuit 214/314 is electrically connected to the conductive patterns 260M1 and 260M2. The phase shift circuit 214/314 is configured to receive the periodic signal clkb from the conductive pattern 260M1. The phase shift circuit 214/314 is configured to receive the periodic signal clkbb from the conductive pattern 260M2.

The transmission circuit TG4 is electrically connected to the conductive patterns 260M1 and 260M2. The transmission circuit TG4 is configured to receive the periodic signal clkb from the conductive pattern 260M1. The transmission circuit TG4 is configured to receive the periodic signal clkbb from the conductive pattern 260M2.

The transmission circuit TG3 is electrically connected to the conductive patterns 260M1 and 260M4. The transmission circuit TG3 is electrically connected to the conductive pattern 260M1 through a gate conductor 260P1. The gate conductor 260P1 extends along the y-axis, from the region N1 to the region P2. The gate conductor 260P1 is substantially perpendicular to the conductive patterns 260M1, 260M2, 260M3, and 260M4.

The transmission circuit TG3 is configured to receive the periodic signal clkbb from the conductive pattern 260M4. The transmission circuit TG3 is configured to receive the periodic signal clkb from the conductive pattern 260M1, through the gate conductor 260P1. The gate conductor 260P1 is shared by the phase shift circuit 214/314 and the transmission circuit TG3.

Compared to other approaches, by utilizing the gate conductor 260P1 for transmitting the periodic signal clkb, fewer clock paths extending along the x-axis (i.e., horizontal direction) can be used. Fewer horizontal clock paths in use can facilitate feasible space therebetween. Referring to FIG. 5B, the conductive patterns 260M1, 260M2, 260M3, and 260M4 are respectively spaced apart from each other by a track. For example, the conductive pattern 260M1 is spaced apart from the conductive pattern 260M2 by the track T2. The conductive pattern 260M2 is spaced apart from the conductive pattern 260M3 by the track PW2. The conductive pattern 260M3 is spaced apart from the conductive pattern 260M4 by the track T5.

Compared to other approaches, feasible space between the horizontal clock paths can reduce the Miller capacitances therebetween. Feasible space between the horizontal clock paths can reduce the interference therebetween, especially when different clock signals are transmitted on adjacent clock paths. Feasible space between the horizontal clock paths can reduce the power consumption of the semiconductor device manufactured in accordance with the layout 260. Simulated results show an overall 7% to 11% power reduction by utilizing the arrangement of layout 260, compared to existing layout techniques.

Logic device NOR1 of the semiconductor device 200, or the logic device NAND1 of the semiconductor device 300, is disposed between the transmission circuits TG2 and TG3. Logic device NOR1 of the semiconductor device 200, or the logic device NAND1 of the semiconductor device 300, is located within the dotted-rectangle B of the layout 260.

The transmission circuit TG2 is spaced apart from the transmission circuit TG3 by a distance D1. The distance D1 equals or exceeds 4*CPP. The transmission circuit TG1 is spaced apart from the transmission circuit TG2 along a horizontal axis, by a distance D2. In some embodiments, the distance D2 is 0*CPP. In some embodiments, the distance D2 is greater than 0*CPP. The transmission circuit TG4 is spaced apart from the transmission circuit TG3 along a horizontal axis, by a distance D3. In some embodiments, the distance D3 is 0*CPP. In some embodiments, the distance D3 is greater than 0*CPP.

The logic device NOR1 or NAND1 is configured to provide the feedback signal ml_b to the transmission circuit TG2, along conductive patterns extending along the x-axis. The transmission circuit TG1 is configured to provide the feedforward signal mx_ax to the logic device NOR1 or NAND1, along conductive patterns extending along the x-axis. The conductive patterns for transmitting the feedforward signal mx_ax and the feedback signal ml_b are not depicted in FIG. 5B for the sake of simplicity.

Figure 5C:
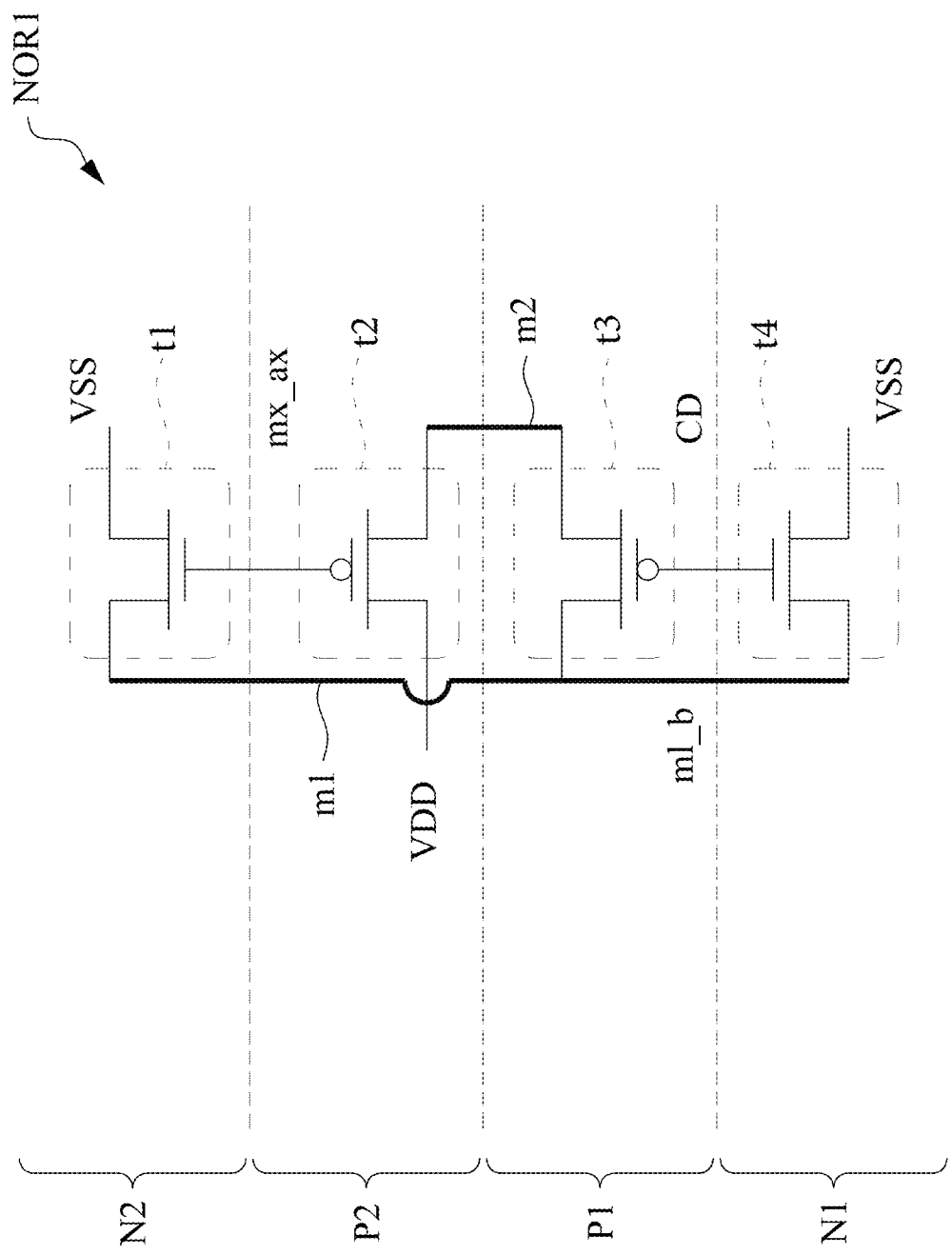
FIG. 5C is a schematic diagram of a logic device NOR1, in accordance with some embodiments of the present disclosure.

FIG. 5C is a schematic diagram of a logic device NOR1, in accordance with some embodiments of the present disclosure.

The logic device NOR1 shown in FIG. 5C can be disposed within the dotted-rectangle A of the layout 250. The logic device NOR1 shown in FIG. 5C can be disposed within the dotted-rectangle B of the layout 260.

The logic device NOR1 includes transistors t1, t2, t3, and t4. The transistor t1 is disposed within the region N2. The transistor t2 is disposed within the region P2. The transistor t3 is disposed within the region P1. The transistor t4 is disposed within the region N1. A vertical connective pattern m1 is disposed across the regions N2 to N1. The vertical connective pattern m1 electrically connects the transistors t1, t3, and t4. A vertical connective pattern m2 is disposed across the regions P1 to P2. The vertical connective pattern m2 electrically connects the transistors t2 and t3.

In some embodiments, the vertical connective pattern m1 and the vertical connective pattern m2 is implemented using conductive patterns of different layers of the layout 250/260. In some embodiments, the vertical connective pattern m1 and the vertical connective pattern m2 are implemented using conductive patterns of the same layer of the layout 250/260.

Figure 5D:
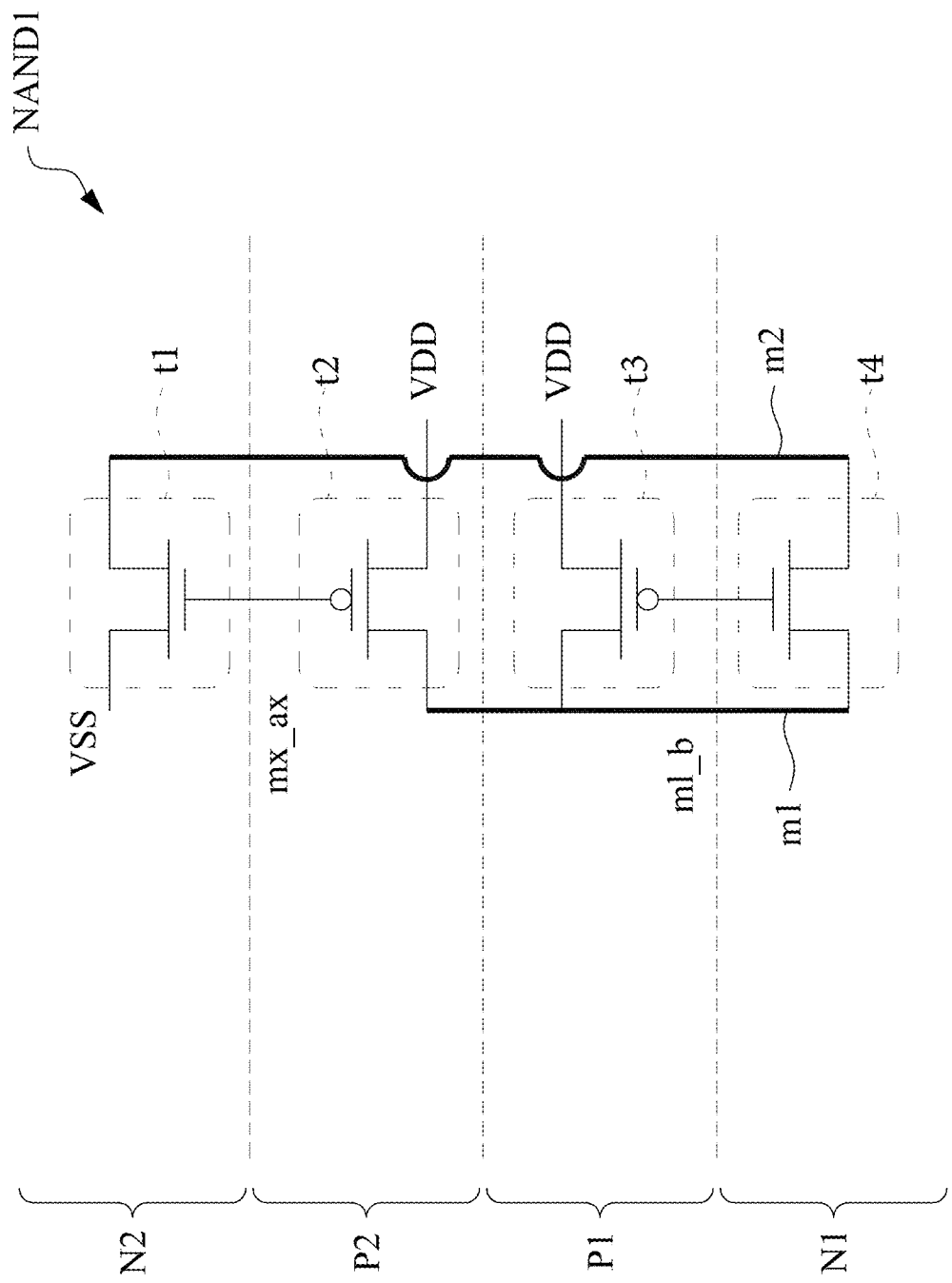
FIG. 5D is a schematic diagram of a logic device NAND1, in accordance with some embodiments of the present disclosure.

FIG. 5D is a schematic diagram of a logic device NAND1, in accordance with some embodiments of the present disclosure.

The logic device NAND1 shown in FIG. 5D can be disposed within the dotted-rectangle A of the layout 250. The logic device NAND1 shown in FIG. 5D can be disposed within the dotted-rectangle B of the layout 260.

The logic device NAND1 includes transistors t1, t2, t3, and t4. The transistor t1 is disposed within the region N2. The transistor t2 is disposed within the region P2. The transistor t3 is disposed within the region P1. The transistor t4 is disposed within the region N1. A vertical connective pattern m1 is disposed across the regions P2 to N1. The vertical connective pattern m1 electrically connects the transistors t2, t3, and t4. A vertical connective pattern m2 is disposed across the regions N1 to N2. The vertical connective pattern m2 electrically connects the transistors t1 and t4.

In some embodiments, the vertical connective pattern m1 and the vertical connective pattern m2 are implemented using conductive patterns of different layers of the layout 250/260. In some embodiments, the vertical connective pattern m1 and the vertical connective pattern m2 are implemented using conductive patterns of the same layer of the layout 250/260.

Figure 6A:
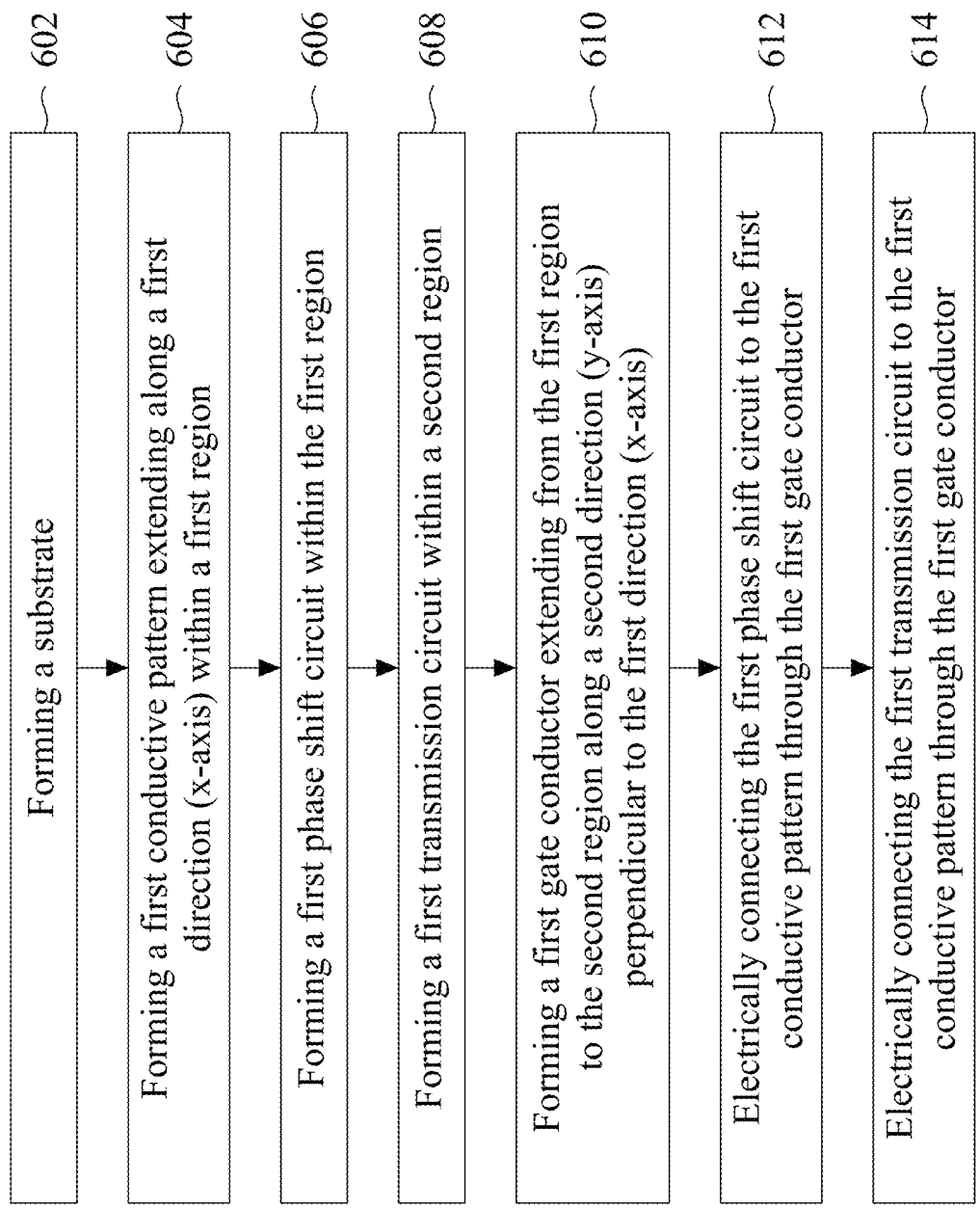
FIGS. 6A and 6B are flowcharts of operations for manufacturing a semiconductor device, in accordance with some embodiments of the present disclosure.
Figure 6B:
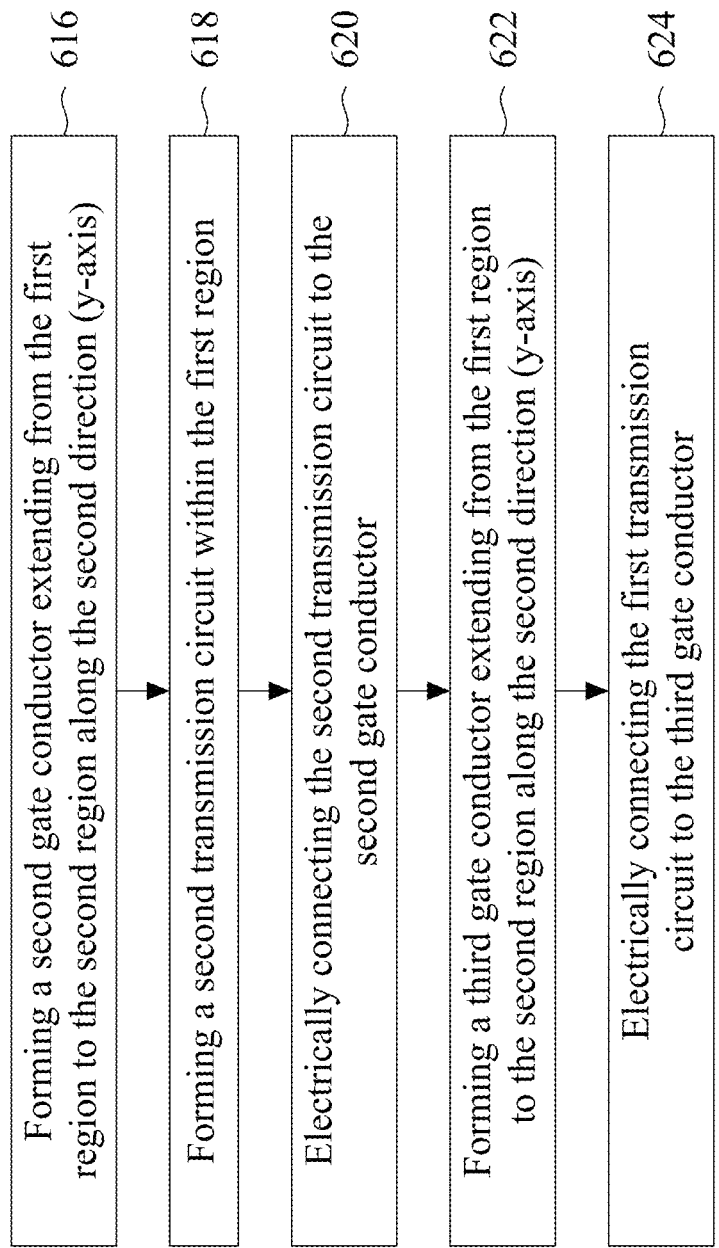

FIGS. 6A and 6B illustrate a flow chart including operations for manufacturing a semiconductor device, in accordance with some embodiments of the present disclosure.

FIGS. 6A and 6B show operations 602, 604, 606, 608, 610, 612, 614, 616, 618, 620, 622 and 624 for manufacturing a semiconductor device. Although the operations 602, 604, 606, 608, 610, 612, 614, 616, 618, 620, 622 and 624 are depicted in sequence in FIGS. 6A and 6B, it can be contemplated that the operations 602, 604, 606, 608, 610, 612, 614, 616, 618, 620, 622 and 624 could alternatively be performed in an order other than that shown in FIGS. 6A and 6B.

In the operation 602, in some embodiments, a substrate is formed. The substrate formed in the operation 602 may include, for example, but is not limited to, silicon (Si), doped Si, silicon carbide (SiC), germanium silicide (SiGe), gallium arsenide (GaAs), or other semiconductor materials. The substrate formed in the operation 602 may include, for example, but is not limited to, sapphire, silicon on insulator (SOI), or other suitable materials. In some embodiments, the substrate formed in the operation 602 includes a silicon material. In some embodiments, the substrate formed in the operation 602 is a silicon substrate.

In the operation 604, a first conductive pattern extending along a first direction (x-axis) is formed on the substrate within a first region. The first conductive pattern formed in the operation 604 can correspond to the conductive pattern 140M4 of FIG. 2A. The first region of the operation 604 can correspond to the regions N2 and P2 of FIG. 2A.

In the operation 606, a first phase shift circuit can be formed within the first region. The first phase shift circuit formed in the operation 606 can correspond to the phase shift circuit 114 of FIG. 2A. The first region of the operation 606 can correspond to the regions N2 and P2 of FIG. 2A.

In the operation 608, a first transmission circuit can be formed on the substrate within a second region. The first transmission circuit formed in the operation 608 can correspond to the transmission circuit TG3 of FIG. 2A. The second region of the operation 608 can correspond to the regions N1 and P1 of FIG. 2A.

In the operation 610, a first gate conductor extending from the first region to the second region can be formed along a second direction (y-axis) perpendicular to the first direction (x-axis). The first gate conductor formed in the operation 610 can correspond to the gate conductor 140P1 of FIG. 2A.

In the operation 612, the first phase shift circuit and the first conductive pattern can be electrically connected through the first gate conductor. Referring to FIG. 2A, the phase shift circuit 114 can be electrically connected to the first conductive pattern 140M4 through the first gate conductor 140P1.

In the operation 614, the first transmission circuit and the first conductive pattern can be electrically connected through the first gate conductor. Referring to FIG. 2A, the transmission circuit TG3 can be electrically connected to the conductive pattern 140M4 through the gate conductor 140P1.

In the operation 616, a second gate conductor extending from the first region to the second region can be formed along the second direction (y-axis). The first region of the operation 616 can correspond to the regions N1 and P1 of FIG. 2L. The second region of the operation 616 can correspond to the regions N2 and P2 of FIG. 2L. The second gate conductor of the operation 616 can correspond to the gate conductor 180P2 of FIG. 2L.

In the operation 618, a second transmission circuit can be formed within the first region. The first region of the operation 618 can correspond to the regions N1 and P1 of FIG. 2L. The second transmission circuit formed in the operation 618 can correspond to the transmission circuit TG2 of FIG. 2L.

In the operation 620, the second transmission circuit can be electrically connected to the second gate conductor. Referring to FIG. 2L, the second transmission circuit TG2 can be electrically connected to the gate conductor 180P2 so as to transmit the feedforward signal mx_ax on the gate conductor 180P2.

In the operation 622, a third gate conductor extending from the first region to the second region can be formed along the second direction (y-axis). The first region of the operation 622 can correspond to the regions N1 and P1 of FIG. 2L. The second region of the operation 622 can correspond to the regions N2 and P2 of FIG. 2L. The third gate conductor of the operation 622 can correspond to the gate conductor 180P3 of FIG. 2L.

In the operation 624, the first transmission circuit can be electrically connected to the third gate conductor. Referring to FIG. 2L, the first transmission circuit TG3 can be electrically connected to the gate conductor 180P3 so as to transmit the feedback signal ml_b on the gate conductor 180P3.

Figure 7:
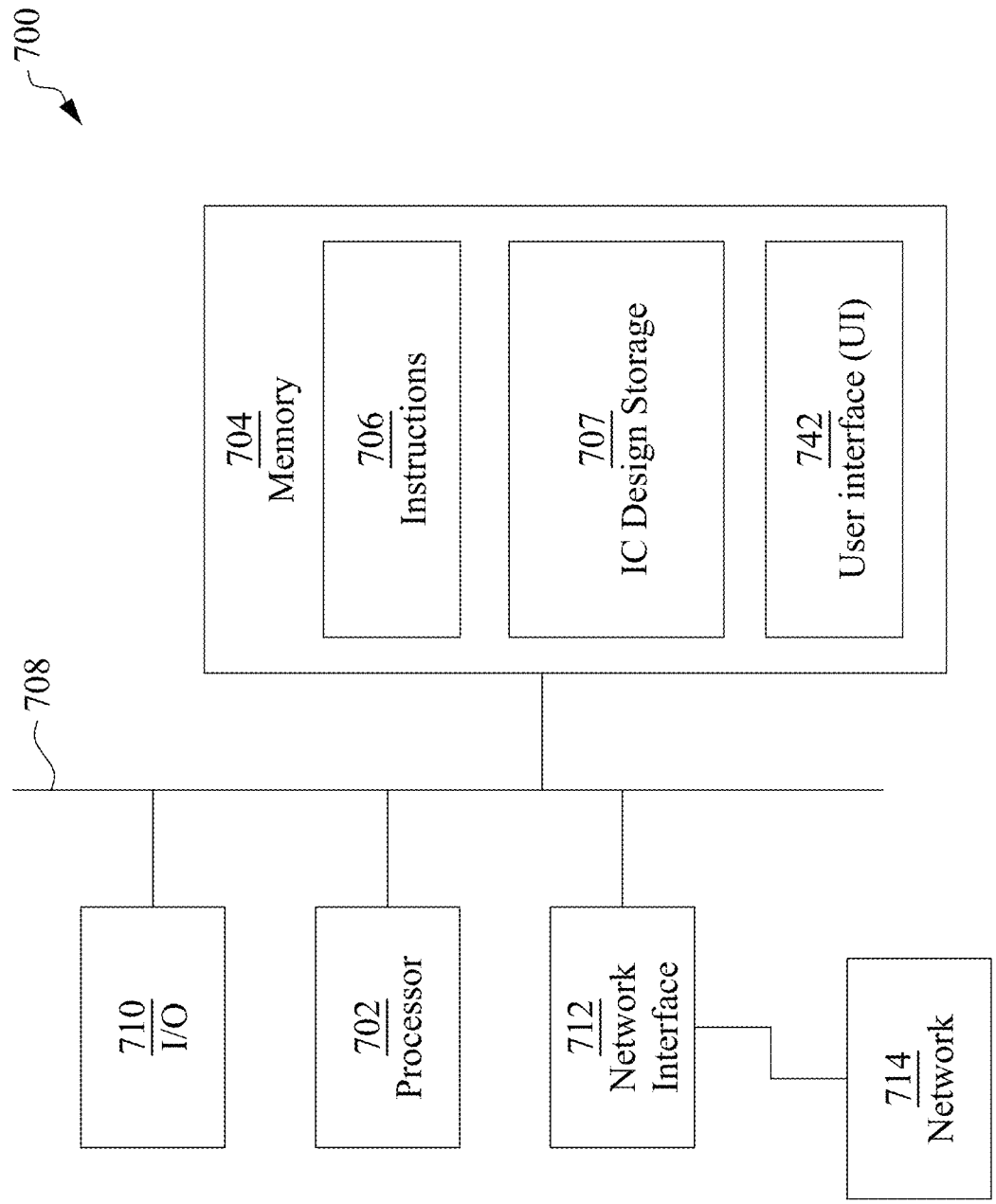
FIG. 7 is a block diagram of an IC layout diagram generation system, in accordance with some embodiments of the present disclosure.

FIG. 7 is a block diagram of IC design system 700, in accordance with some embodiments. Methods described herein of designing IC layout diagrams in accordance with one or more embodiments are implementable, for example, using IC design system 700, in accordance with some embodiments. In some embodiments, IC design system 700 is an APR system, includes an APR system, or is part of an APR system, usable for performing an APR method.

In some embodiments, IC design system 700 is a general purpose computing device including a hardware processor 702 and non-transitory, computer-readable storage medium 704. Storage medium 704, amongst other things, is encoded with, i.e., stores, computer program code 706, i.e., a set of executable instructions. Execution of instructions 706 by hardware processor 702 represents (at least in part) an EDA tool which implements a portion or all of a method, e.g., a method of generating an IC layout diagram described above (hereinafter, the noted processes and/or methods).

Processor 702 is electrically coupled to computer-readable storage medium 704 via a bus 708. Processor 702 is also electrically coupled to an I/O interface 710 by bus 708. Network interface 712 is also electrically connected to processor 702 via bus 708. Network interface 712 is connected to a network 714, so that processor 702 and computer-readable storage medium 704 are capable of connecting to external elements via network 714. Processor 702 is configured to execute computer program code 706 encoded in computer-readable storage medium 704 in order to cause IC design system 700 to be usable for performing a portion or all of the noted processes and/or methods. In one or more embodiments, processor 702 is a central processing unit (CPU), a multi-processor, a distributed processing system, an application specific integrated circuit (ASIC), and/or a suitable processing unit.

In one or more embodiments, computer-readable storage medium 704 is an electronic, magnetic, optical, electromagnetic, infrared, and/or a semiconductor system (or apparatus or device). For example, computer-readable storage medium 704 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 704 includes a compact disk-read only memory (CD-ROM), a compact disk-read/write (CD-R/W), and/or a digital video disc (DVD).

In one or more embodiments, storage medium 704 stores computer program code 706 configured to cause IC design system 700 (where such execution represents (at least in part) the EDA tool) to be usable for performing a portion or all of the noted processes and/or methods. In one or more embodiments, storage medium 704 also stores information which facilitates performing a portion or all of the noted processes and/or methods. In one or more embodiments, storage medium 704 includes IC design storage 707 configured to store one or more IC layout diagrams, e.g., an IC layout diagram discussed above with respect to FIGS. 2A-2P and 5A-5B.

IC design system 700 includes I/O interface 710. I/O interface 710 is coupled to external circuitry. In one or more embodiments, I/O interface 710 includes a keyboard, keypad, mouse, trackball, trackpad, touchscreen, and/or cursor direction keys for communicating information and commands to processor 702.

IC design system 700 also includes network interface 712 coupled to processor 702. Network interface 712 allows IC design system 700 to communicate with network 714, to which one or more other computer systems are connected. Network interface 712 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more IC design systems 700.

IC design system 700 is configured to receive information through I/O interface 710. The information received through I/O interface 710 includes one or more of instructions, data, design rules, libraries of standard cells, and/or other parameters for processing by processor 702. The information is transferred to processor 702 via bus 708. IC design system 700 is configured to receive information related to a UI through I/O interface 710. The information is stored in computer-readable medium 704 as user interface (UI) 742.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by IC design system 700. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 8:
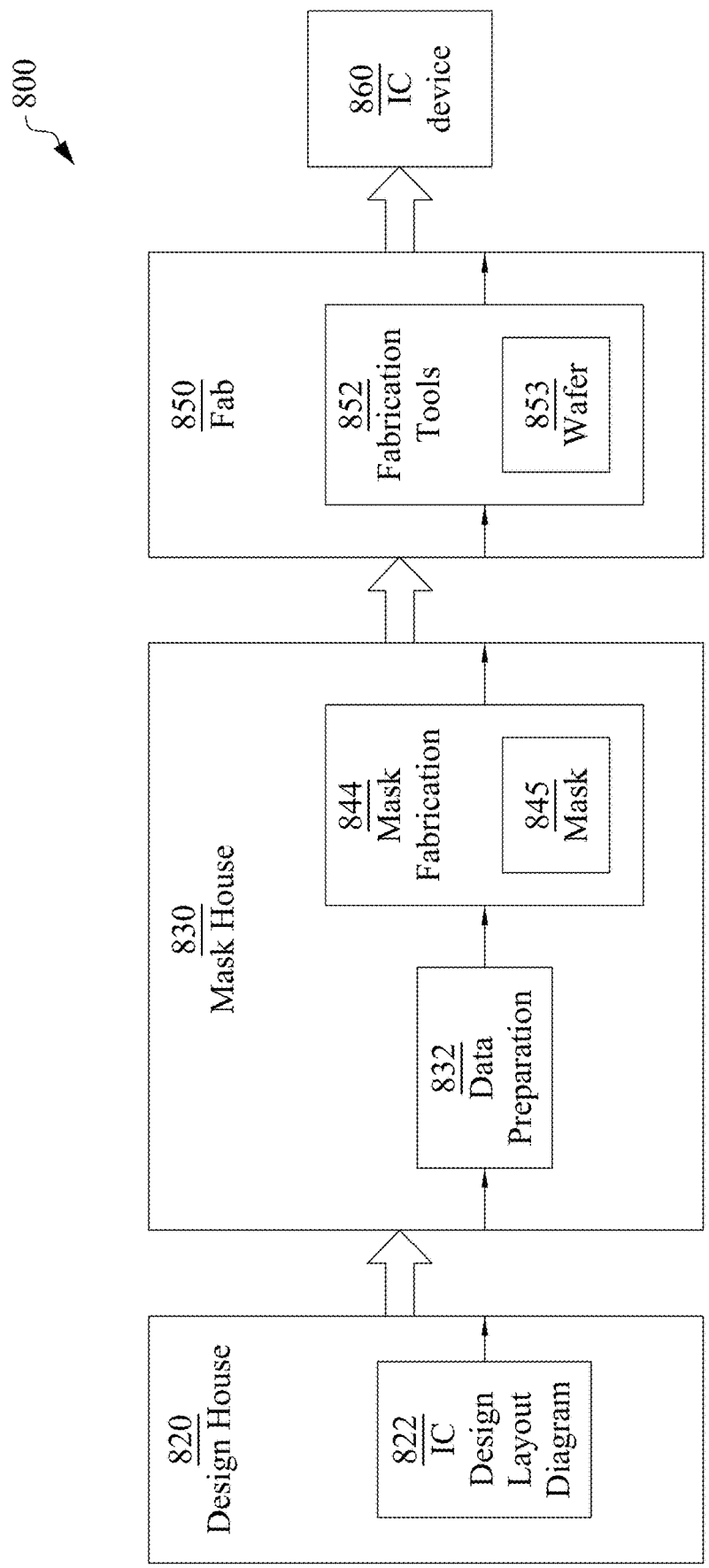
FIG. 8 is a block diagram of an IC manufacturing system, and an IC manufacturing flow associated therewith, in accordance with some embodiments of the present disclosure.

FIG. 8 is a block diagram of IC manufacturing system 800, and an IC manufacturing flow associated therewith, in accordance with some embodiments. In some embodiments, based on an IC layout diagram, at least one of (A) one or more semiconductor masks or (B) at least one component in a layer of a semiconductor integrated circuit is fabricated using manufacturing system 800.

In FIG. 8, IC manufacturing system 800 includes entities, such as a design house 820, a mask house 830, and an IC manufacturer/fabricator ("fab") 850, that interact with one another in the design, development, and manufacturing cycles and/or services related to manufacturing an IC device 860. The entities in system 800 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 820, mask house 830, and IC fab 850 is owned by a single larger company. In some embodiments, two or more of design house 820, mask house 830, and IC fab 850 coexist in a common facility and use common resources.

Design house (or design team) 820 generates an IC design layout diagram 822. IC design layout diagram 822 includes various geometrical patterns, e.g., an IC layout diagram discussed above. The geometrical patterns correspond to patterns of metal, oxide, or semiconductor layers that make up the various components of IC device 860 to be fabricated. The various layers combine to form various IC features. For example, a portion of IC design layout diagram 822 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 820 implements a proper design procedure to form IC design layout diagram 822. The design procedure includes one or more of logic design, physical design or place and route. IC design layout diagram 822 is presented in one or more data files having information of the geometrical patterns. For example, IC design layout diagram 822 can be expressed in a GDSII file format or DFII file format.

Mask house 830 includes data preparation 832 and mask fabrication 844. Mask house 830 uses IC design layout diagram 822 to manufacture one or more masks 845 to be used for fabricating the various layers of IC device 860 according to IC design layout diagram 822. Mask house 830 performs mask data preparation 832, where IC design layout diagram 822 is translated into a representative data file (RDF). Mask data preparation 832 provides the RDF to mask fabrication 844. Mask fabrication 844 includes a mask writer. A mask writer converts the RDF to an image on a substrate, such as mask (reticle) 845 or a semiconductor wafer 853. The design layout diagram 822 is manipulated by mask data preparation 832 to comply with particular characteristics of the mask writer and/or requirements of IC fab 850. In FIG. 8, mask data preparation 832 and mask fabrication 844 are illustrated as separate elements. In some embodiments, mask data preparation 832 and mask fabrication 844 can be collectively referred to as mask data preparation.

In some embodiments, mask data preparation 832 includes optical proximity correction (OPC) which uses lithography enhancement techniques to compensate for image errors, such as those that can arise from diffraction, interference, other process effects and the like. OPC adjusts IC design layout diagram 822. In some embodiments, mask data preparation 832 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 832 includes a mask rule checker (MRC) that checks the IC design layout diagram 822 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 822 to compensate for limitations during mask fabrication 844, which may undo part of the modifications performed by OPC in order to meet mask creation rules.

In some embodiments, mask data preparation 832 includes lithography process checking (LPC) that simulates processing that will be implemented by IC fab 850 to fabricate IC device 860. LPC simulates this processing based on IC design layout diagram 822 to create a simulated manufactured device, such as IC device 860. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 822.

It should be understood that the above description of mask data preparation 832 has been simplified for the purposes of clarity. In some embodiments, data preparation 832 includes additional features such as a logic operation (LOP) to modify the IC design layout diagram 822 according to manufacturing rules. Additionally, the processes applied to IC design layout diagram 822 during data preparation 832 may be executed in a variety of different orders.

After mask data preparation 832 and during mask fabrication 844, a mask 845 or a group of masks 845 are fabricated based on the modified IC design layout diagram 822. In some embodiments, mask fabrication 844 includes performing one or more lithographic exposures based on IC design layout diagram 822. In some embodiments, an electron-beam (e-beam) or a mechanism of multiple e-beams is used to form a pattern on a mask (photomask or reticle) 845 based on the modified IC design layout diagram 822. Mask 845 can be formed in various technologies. In some embodiments, mask 845 is formed using binary technology. In some embodiments, a mask pattern includes opaque regions and transparent regions. A radiation beam, such as an ultraviolet (UV) or EUV beam, used to expose the image sensitive material layer (e.g., photoresist) which has been coated on a wafer, is blocked by the opaque region and transmits through the transparent regions. In one example, a binary mask version of mask 845 includes a transparent substrate (e.g., fused quartz) and an opaque material (e.g., chromium) coated in the opaque regions of the binary mask. In another example, mask 845 is formed using a phase shift technology. In a phase shift mask (PSM) version of mask 845, various features in the pattern formed on the phase shift mask are configured to have proper phase difference to enhance the resolution and imaging quality. In various examples, the phase shift mask can be attenuated PSM or alternating PSM. The mask(s) generated by mask fabrication 844 is used in a variety of processes. For example, such a mask(s) is used in an ion implantation process to form various doped regions in semiconductor wafer 853, in an etching process to form various etching regions in semiconductor wafer 853, and/or in other suitable processes.

IC fab 850 is an IC fabrication business that includes one or more manufacturing facilities for the fabrication of a variety of different IC products. In some embodiments, IC Fab 850 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 850 includes wafer fabrication tools 852 configured to execute various manufacturing operations on semiconductor wafer 853 such that IC device 860 is fabricated in accordance with the mask(s), e.g., mask 845. In various embodiments, fabrication tools 852 include one or more of a wafer stepper, an ion implanter, a photoresist coater, a process chamber, e.g., a CVD chamber or LPCVD furnace, a CMP system, a plasma etch system, a wafer cleaning system, or other manufacturing equipment capable of performing one or more suitable manufacturing processes as discussed herein.

IC fab 850 uses mask(s) 845 fabricated by mask house 830 to fabricate IC device 860. Thus, IC fab 850 at least indirectly uses IC design layout diagram 822 to fabricate IC device 860. In some embodiments, semiconductor wafer 853 is fabricated by IC fab 850 using mask(s) 845 to form IC device 860. In some embodiments, the IC fabrication includes performing one or more lithographic exposures based at least indirectly on IC design layout diagram 822. Semiconductor wafer 853 includes a silicon substrate or other proper substrate having material layers formed thereon. Semiconductor wafer 853 further includes one or more of various doped regions, dielectric features, multi-level interconnects, and the like (formed at subsequent manufacturing steps).

Details regarding an IC manufacturing system (e.g., system 800 of FIG. 8), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and U.S. Pat. No. 7,260,442, granted Aug. 21, 2007, the entireties of each of which are hereby incorporated by reference.

Some embodiments of the present disclosure provide a semiconductor device. The semiconductor device comprises a first conductive pattern disposed within a first row and extending along a first direction, a first phase shift circuit disposed within the first row, a first transmission circuit disposed within a second row, and a first gate conductor extending from the first row to the second row along a second direction perpendicular to the first direction. Wherein each of the first and second rows comprises first and second active regions extending along the first direction, and the first phase shift circuit and the first transmission circuit are electrically connected with the first conductive pattern through the first gate conductor.

Some embodiments of the present disclosure provide a semiconductor device. The semiconductor device comprises a first transmission circuit including a first transistor of a first type disposed within a first region and a second transistor of a second type disposed within a second region. The semiconductor device further comprises a second transmission circuit including a third transistor of the first type disposed within the first region and a fourth transistor of the second type disposed within the second region. The semiconductor device further comprises a first gate conductor extending from the first region to the second region. Wherein the first transmission circuit is configured to provide a first feedback signal to the second transmission circuit through the first gate conductor.

Some embodiments of the present disclosure provide a method for manufacturing a semiconductor device. The method comprises forming a substrate and a first conductive pattern extending along a first direction within a first row, the first row comprising first and second active regions. The method comprises forming a first phase shift circuit within the first row and forming a first transmission circuit within a second row, the second row comprising third and fourth active regions. The method comprises forming a first gate conductor extending from the first row to the second row along a second direction perpendicular to the first direction. The method comprises electrically connecting the first phase shift circuit to the first conductive pattern through the first gate conductor. The method further comprises electrically connecting the first transmission circuit to the first conductive pattern through the first gate conductor.

The foregoing outlines structures of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A semiconductor device, comprising:
   a first conductive pattern disposed within a first row from a top view perspective and extending along a first direction;
   a first phase shift circuit disposed within the first row;
   a first transmission circuit disposed within a second row from the top view perspective; and
   a first gate conductor extending from the first row to the second row along a second direction perpendicular to the first direction, wherein
   each of the first and second rows comprises first and second active regions extending along the first direction, and
   the first phase shift circuit and the first transmission circuit are electrically connected with the first conductive pattern through the first gate conductor.

2. The semiconductor device of claim 1, further comprising a second conductive pattern disposed within the first row and extending along the first direction; wherein
   the first conductive pattern is configured to transmit a first periodic signal, and
   the second conductive pattern is configured to transmit a second periodic signal.

3. The semiconductor device of claim 2, wherein a first phase of the first periodic signal is different from a second phase of the second periodic signal.

4. The semiconductor device of claim 2, further comprising:
   a third transmission circuit disposed within the first row; and
   a fourth transmission circuit disposed within the first row; wherein
   the third transmission circuit and the fourth transmission circuit are electrically connected to the first conductive pattern and the second conductive pattern.

5. The semiconductor device of claim 1, further comprising a second transmission circuit disposed within the second row and spaced apart from the first transmission circuit by a first distance, wherein the first distance is equal to or greater than two contact poly pitches.

6. The semiconductor device of claim 5, wherein the first transmission circuit is configured to provide a first feedback signal to the second transmission circuit.

7. The semiconductor device of claim 1, further comprising:
- a second gate conductor extending from the first row to the second row along the second direction; and
- a second transmission circuit disposed within the first row; wherein
- the first transmission circuit is configured to provide a first feedback signal to the second transmission circuit through the second gate conductor.

8. The semiconductor device of claim 7, further comprising a third gate conductor extending from the first row to the second row along the second direction, wherein the second transmission circuit is configured to provide a first feedforward signal on the third gate conductor.

9. The semiconductor device of claim 1, wherein the first active region of the first row comprises transistors of a first type and the second active region of the first row comprises transistors of a second type.

10. The semiconductor device of claim 9, wherein the first active region of the second row comprises transistors of the first type and the second active region of the second row comprises transistors of the second type.

11. A semiconductor device, comprising:
- a first transmission circuit including a first transistor of a first type disposed within a first region from a top view perspective and a second transistor of a second type disposed within a second region from the top view perspective;
- a second transmission circuit including a third transistor of the first type disposed within the first region and a fourth transistor of the second type disposed within the second region; and
- a first gate conductor extending from the first region to the second region, wherein
- the first transmission circuit is configured to provide a first feedback signal to the second transmission circuit through the first gate conductor.

12. The semiconductor device of claim 11, further comprising:
- a second gate conductor disposed in parallel with the first gate conductor; and
- a first conductive pattern extending perpendicular to the second gate conductor and configured to transmit a first periodic signal, wherein
- the first transmission circuit is configured to receive the first periodic signal through the second gate conductor.

13. The semiconductor device of claim 12, further comprising a first phase shift circuit disposed between the first transistor and the second transistor, wherein the first phase shift circuit is configured to receive the first periodic signal through the second gate conductor.

14. The semiconductor device of claim 13, further comprising a third conductive pattern extending perpendicular to the second gate conductor and configured to transmit the second periodic signal, wherein the first phase shift circuit is configured to receive the second periodic signal through the third conductive pattern.

15. The semiconductor device of claim 12, wherein the first region is spaced apart from the second region.

16. The semiconductor device of claim 12, further comprising a second conductive pattern extending perpendicular to the second gate conductor and configured to transmit a second periodic signal, wherein the first transmission circuit is configured to receive the second periodic signal through the second conductive pattern.

17. The semiconductor device of claim 12, further comprising:
- a third gate conductor disposed in parallel with the first gate conductor, wherein
- the second transmission circuit is configured to provide a first feedforward signal on the third gate conductor.

18. A method of manufacturing a semiconductor device, the method comprising:
- forming a first conductive pattern extending along a first direction within a first row from a top view perspective, the first row comprising first and second active regions;
- forming a first phase shift circuit within the first row;
- forming a first transmission circuit within a second row from the top view perspective, the second row comprising third and fourth active regions;
- forming a first gate conductor extending from the first row to the second row along a second direction perpendicular to the first direction;
- electrically connecting the first phase shift circuit to the first conductive pattern through the first gate conductor; and
- electrically connecting the first transmission circuit to the first conductive pattern through the first gate conductor.

19. The method of claim 18, further comprising:
- forming a second gate conductor extending from the first row to the second row along the second direction;
- forming a second transmission circuit within the first row; and
- electrically connecting the second transmission circuit to the second gate conductor.

20. The method of claim 19, further comprising:
- forming a third gate conductor extending from the first row to the second row along the second direction; and
- electrically connecting the first transmission circuit to the third gate conductor.

* * * * *